United States Patent
Minamino et al.

(10) Patent No.: US 9,496,005 B2
(45) Date of Patent: Nov. 15, 2016

(54) ELECTRONIC APPARATUS, DISPLAY CONTROL METHOD AND PROGRAM FOR DISPLAYING AN IMAGE FOR SELECTING A CONTENT ITEM TO BE REPRODUCED

(75) Inventors: Takanori Minamino, Kanagawa (JP); Mitsuo Okumura, Tokyo (JP)

(73) Assignee: Sony Corporation, Tokyo (JP)

(*) Notice: Subject to any disclaimer, the term of this patent is extended or adjusted under 35 U.S.C. 154(b) by 163 days.

(21) Appl. No.: 13/333,260

(22) Filed: Dec. 21, 2011

(65) Prior Publication Data

US 2012/0162251 A1 Jun. 28, 2012

(30) Foreign Application Priority Data

Dec. 27, 2010 (JP) ................................ 2010-289522

(51) Int. Cl.
- *G09G 5/00* (2006.01)
- *G06T 1/00* (2006.01)
- *G11B 27/34* (2006.01)
- *G06F 3/038* (2013.01)
- *G06F 3/00* (2006.01)

(52) U.S. Cl.
CPC ................. *G11B 27/34* (2013.01); *G06F 3/00* (2013.01); *G06F 3/038* (2013.01)

(58) Field of Classification Search
CPC ....................................................... G11B 27/34
See application file for complete search history.

(56) References Cited

U.S. PATENT DOCUMENTS

| | | | |
|---|---|---|---|
| 2005/0091596 A1* | 4/2005 | Anthony et al. | 715/712 |
| 2006/0071942 A1* | 4/2006 | Ubillos et al. | 345/619 |
| 2007/0035551 A1* | 2/2007 | Ubillos | 345/581 |
| 2007/0081088 A1 | 4/2007 | Gotoh et al. | |

(Continued)

FOREIGN PATENT DOCUMENTS

| | | |
|---|---|---|
| CN | 101036110 A | 9/2007 |
| CN | 101452366 A | 6/2009 |

(Continued)

OTHER PUBLICATIONS

Wikipedia page, "Aqua (user interface)", from Wikipedia, the free encyclopedia, last modified on May 31, 2008. The page was downloaded from http://www.cs.odu.edu/~salam/wsdl/inforet/wikihtml/Aqua_(user_interface).html on Sep. 1, 2015.*

(Continued)

*Primary Examiner* — Kee M Tung
*Assistant Examiner* — Yi Wang
(74) *Attorney, Agent, or Firm* — Chip Law Group

(57) ABSTRACT

An electronic apparatus includes an operation reception unit that receives a switching operation for switching between a list display screen where index images for selecting content items belonging to one or a plurality of groups are disposed on a display surface of a display unit, and a group display screen where the index images are disposed on the display surface, and a display control unit that displays one of the list display screen and the group display screen on the display unit based on the switching operation, moves the index images with content item units from predetermined positions on one screen of the list display screen and the group display screen, displayed at the time of receiving the corresponding switching operation to predetermined positions on the other screen displayed after the corresponding switching operation is received, and displays the index images by animation during the movement.

24 Claims, 33 Drawing Sheets

(56) References Cited

U.S. PATENT DOCUMENTS

| | | | |
|---|---|---|---|
| 2008/0034381 A1* | 2/2008 | Jalon et al. | 719/329 |
| 2009/0150775 A1 | 6/2009 | Miyazaki et al. | |
| 2010/0053206 A1* | 3/2010 | Ohnishi | 345/619 |
| 2010/0107068 A1* | 4/2010 | Butcher et al. | 715/702 |
| 2010/0238176 A1* | 9/2010 | Guo et al. | 345/440 |
| 2010/0245651 A1 | 9/2010 | Minamino | |
| 2011/0064317 A1 | 3/2011 | Ubillos | |
| 2011/0102421 A1 | 5/2011 | Minamino et al. | |
| 2012/0084689 A1* | 4/2012 | Ledet et al. | 715/769 |

FOREIGN PATENT DOCUMENTS

| | | |
|---|---|---|
| EP | 1 645 950 A1 | 4/2006 |
| EP | 1 770 599 A2 | 4/2007 |
| EP | 2 068 237 A2 | 6/2009 |
| JP | 2006-139846 | 6/2006 |
| JP | 2010-257153 | 11/2010 |
| JP | 2013-512508 | 4/2013 |

OTHER PUBLICATIONS

U.S. Appl. No. 13/299,487, filed Nov. 18, 2011, Minamino, et al.
Extended European Search Report issued May 25, 2012, in European Patent Application No. 11194226.4.
Richard Mander, et al., "A 'Pile' Metaphor for Supporting Casual Organization of Information", Striking a Balance, vol. 3, XP-000426843, May 3, 1992, pp. 627-634.
Japanese Office Action issued Jul. 29, 2014, in Japan Patent Application No. 2010-289522.
Chinese Office Action issued on Jul. 3, 2015 in patent application No. 201110428422.5.

* cited by examiner

ANIMATION DISPLAY OF THUMBNAIL IMAGE

ANIMATION DISPLAY OF THUMBNAIL IMAGE

353

⬇ ANIMATION DISPLAY OF THUMBNAIL IMAGE

354

⬇ ANIMATION DISPLAY OF THUMBNAIL IMAGE

ANIMATION DISPLAY OF THUMBNAIL IMAGE

ANIMATION DISPLAY OF THUMBNAIL IMAGE

ANIMATION DISPLAY OF THUMBNAIL IMAGE

ANIMATION DISPLAY OF THUMBNAIL IMAGE

⇩ DISPLAY OF EVENT DISPLAY SCREEN

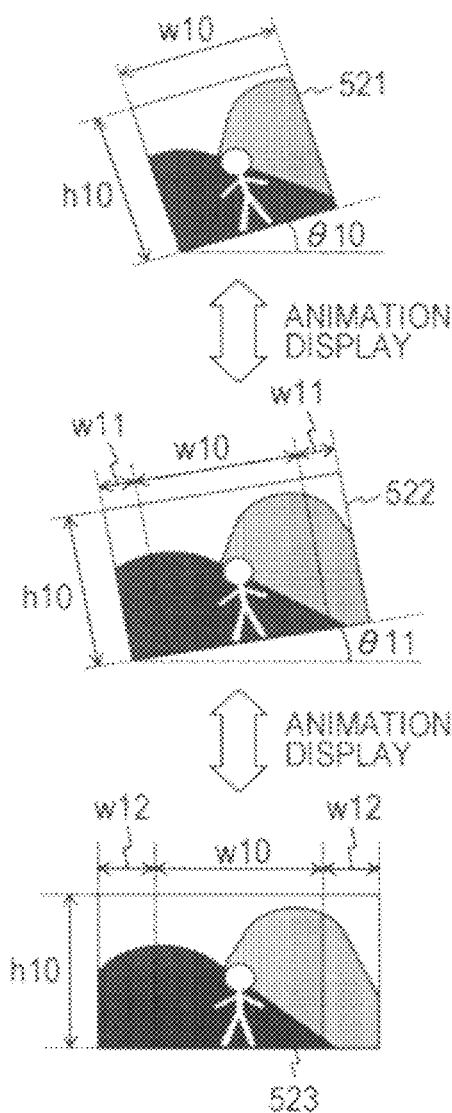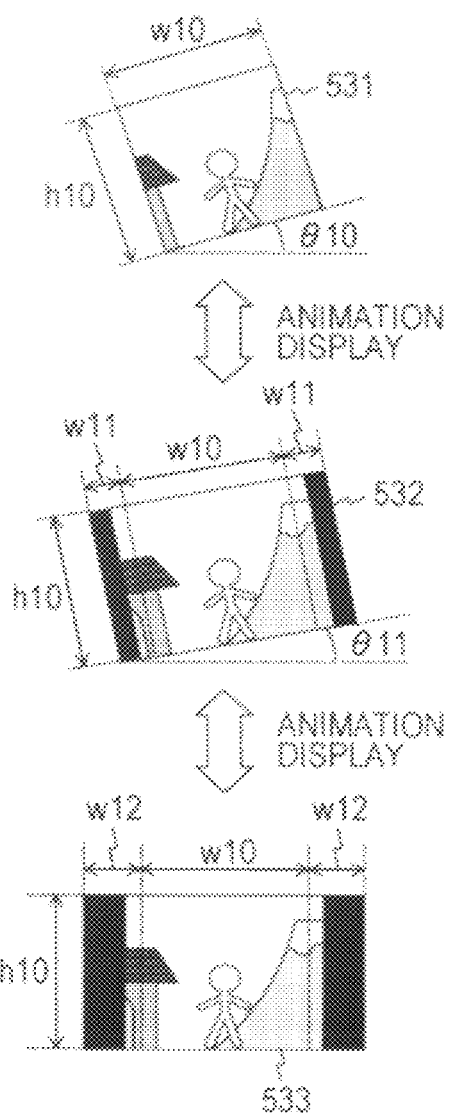

351 ⬇ ANIMATION DISPLAY OF THUMBNAIL IMAGE

352 ⬇ ANIMATION DISPLAY OF THUMBNAIL IMAGE

353 ⇩ ANIMATION DISPLAY OF THUMBNAIL IMAGE

354 ⇩ ANIMATION DISPLAY OF THUMBNAIL IMAGE

⬇ DISPLAY OF LIST DISPLAY SCREEN

373    ⬇ ANIMATION DISPLAY OF THUMBNAIL IMAGE

374    ⬇ ANIMATION DISPLAY OF THUMBNAIL IMAGE

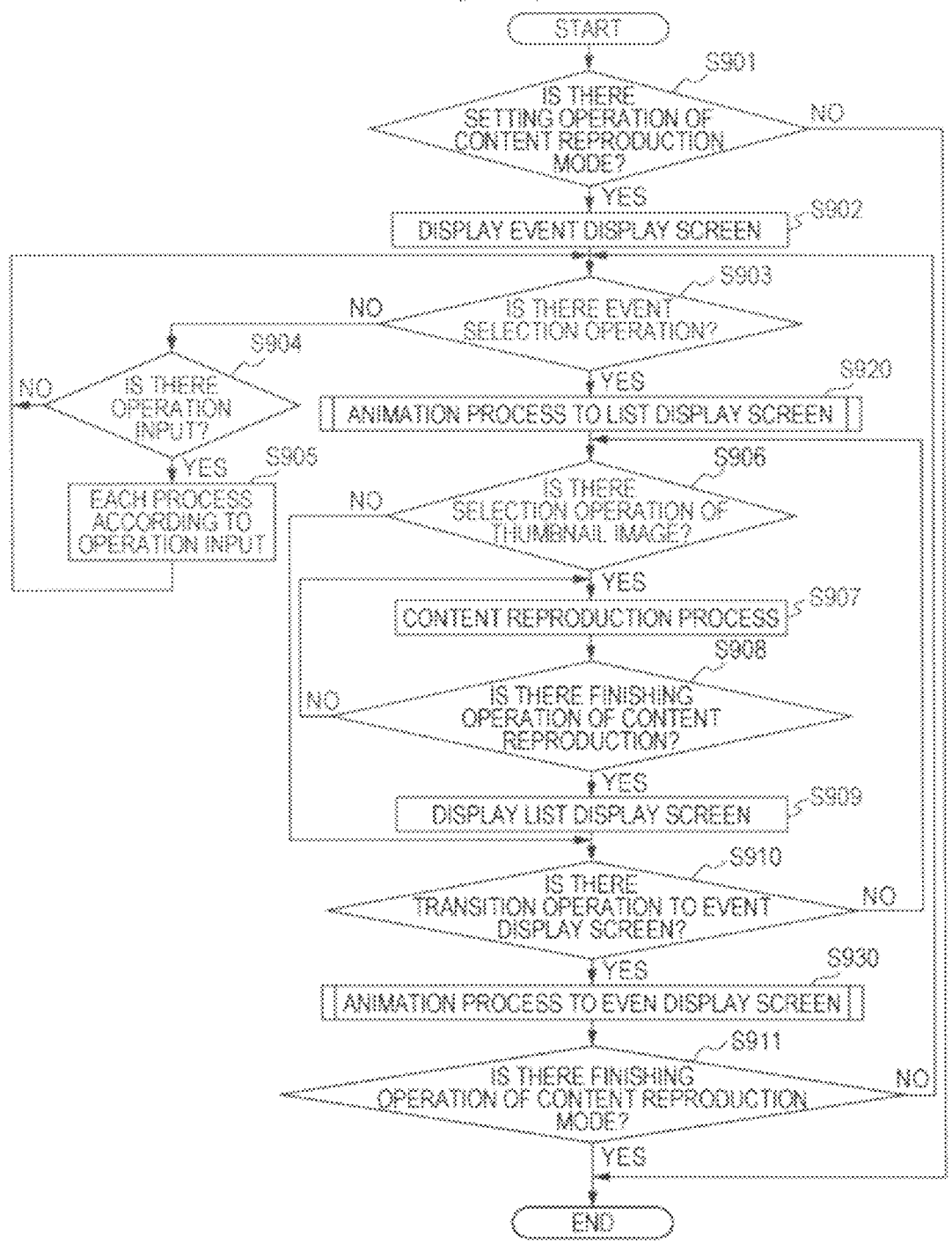

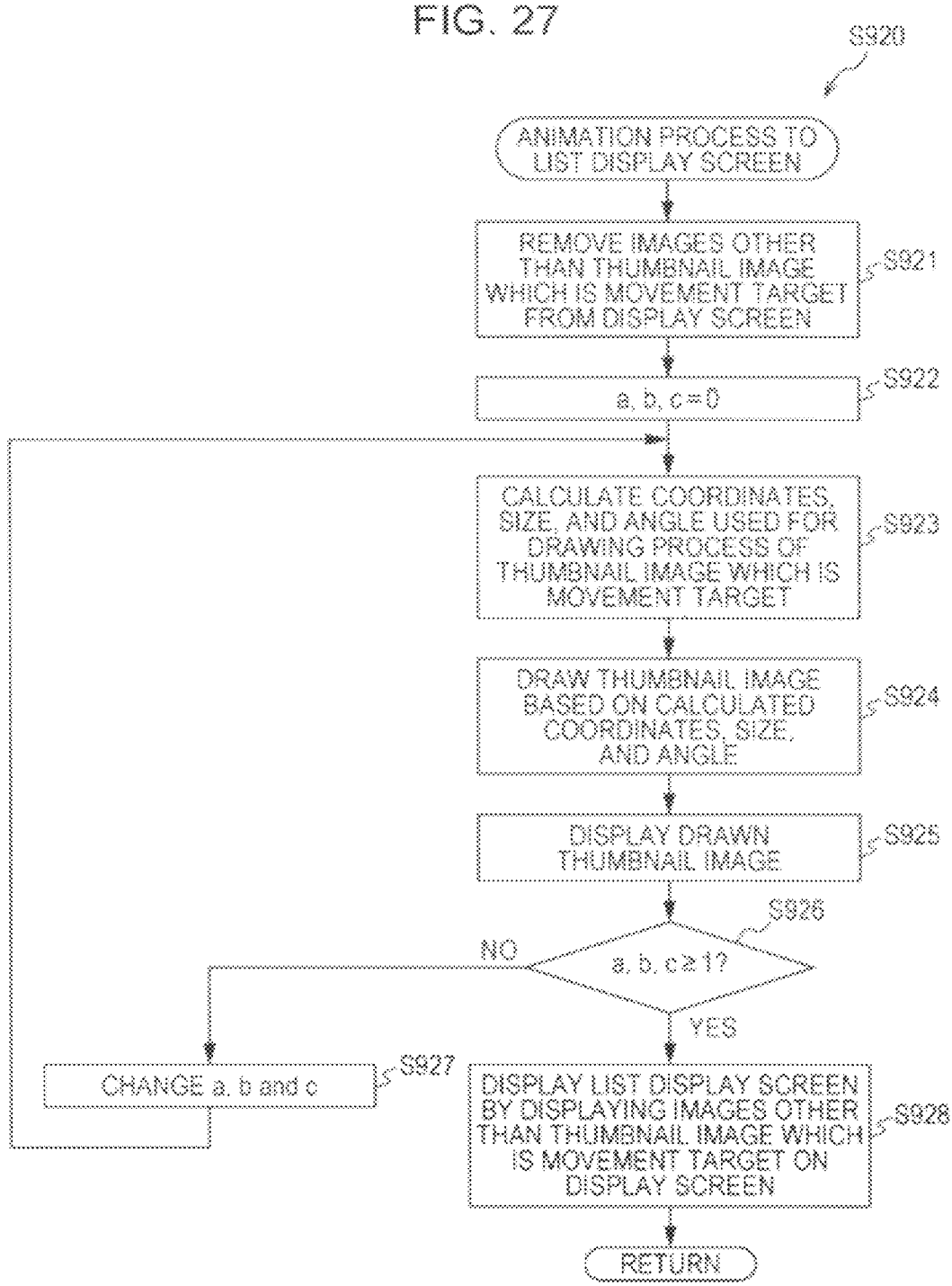

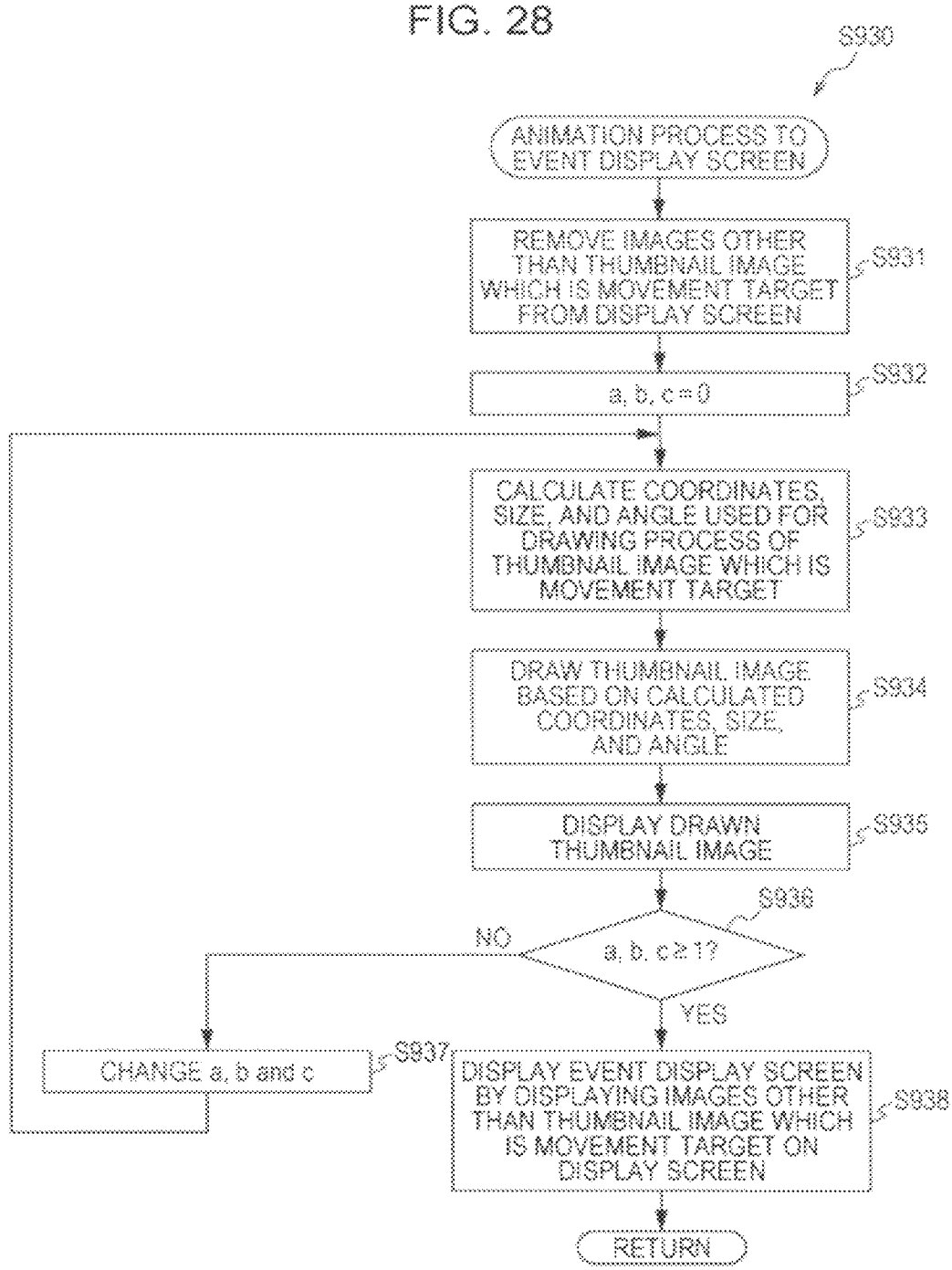

⇩ SELECTION OPERATION OF CENTRAL EVENT IMAGES

⇩ ANIMATION DISPLAY OF THUMBNAIL IMAGE

FIG. 30A
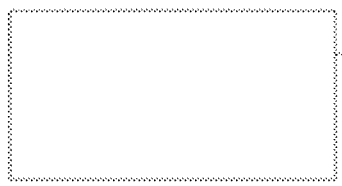 ~750  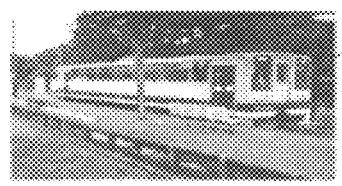 ~760
 CHANGE TO BLACK
FIG. 30B
 ~750  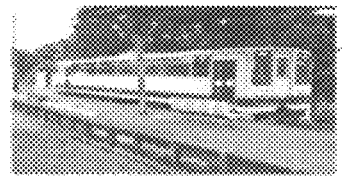 ~760
OVERWRITE SYNTHESIS OF IMAGE AT α=1
FIG. 30C
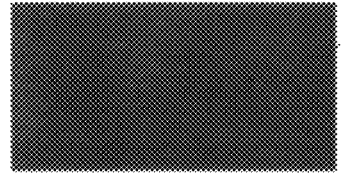 ~750  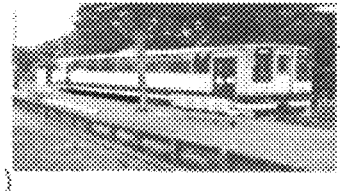 ~760
OVERWRITE SYNTHESIS OF IMAGE AT α=a (0<a<1)
FIG. 30D
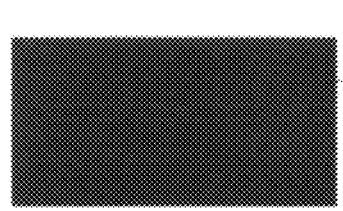 ~750  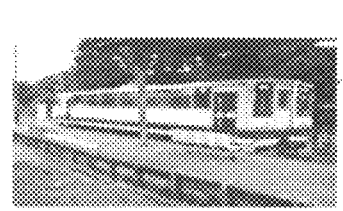 ~760
OVERWRITE SYNTHESIS OF IMAGE AT α=0

ELECTRONIC APPARATUS, DISPLAY CONTROL METHOD AND PROGRAM FOR DISPLAYING AN IMAGE FOR SELECTING A CONTENT ITEM TO BE REPRODUCED

The present disclosure contains subject matter related to that disclosed in Japanese Priority Patent Application JP 2010-289522 filed in the Japan Patent Office on Dec. 27, 2010, the entire contents of which are hereby incorporated by reference.

BACKGROUND

The present disclosure relates to an electronic apparatus, and more particularly to an electronic apparatus which displays an index image for selecting a content item to be reproduced, a display control method thereof, and a program enabling a computer to execute the method.

In recent years, there has been widespread use of digital still cameras or digital video cameras (for example, camera-integrated recorders) which capture an image of a figure or a landscape so as to generate image data, and record the image data as content items (still image content items or moving image content items). In addition, there have been proposed reproduction devices which can select and reproduce the content items recorded in this way, through a user's operation.

For example, there has been proposed a reproduction device in which thumbnail images, arranged in a matrix state, corresponding to moving images, are displayed in a list view, a desired thumbnail image is selected from the thumbnail images displayed in the list view, and a desired moving image is reproduced (for example, refer to Japanese Unexamined Patent Application Publication No. 2006-139846).

SUMMARY

According to the related art described above, it is possible to reproduce the desired content item by selecting the desired index image from the displayed list of the index images (thumbnail images).

Here, if the number of content items to be reproduced is large, a case is assumed in which index images of the content items are displayed in a list view and a desired content item is selected from the index images displayed in the list view. In this case, since the number of content items to be selected is large, it may be difficult for a user to find desired content items.

Therefore, the content items to be reproduced are classified for each event (for example, journey, sports day, or the like), images (event images) indicating the events are displayed in a list view, and a desired event image may be selected from the event images displayed in the list view. That is to say, the images related to the content items (event images) may be displayed in a list view with group units, and a desired event image may be selected therefrom. In this case, a desired content item can be selected from content items belonging to the selected event (event image). Therefore, even if the number of content items to be reproduced is large, a user may relatively easily find a desired content item.

As such, a case is assumed in which a desired event is selected, and then a desired content item is selected from content items belonging to the selected event. In this case, for example, a display state of a display unit may be switched from an event display screen displaying the event images in a list view to a list display screen displaying index images in a list view.

When the display screen is switched as such, a position of the event image on the event display screen (a position on the display surface) and a position of the index image on the list display screen (a position on the display surface) may be different from each other. As such, if the position of the event image and the position of the index image on the list display screen are different from each other, there is concern that the correspondence relationship between an event selected by a user and a content item (index image) belonging to the selected event becomes unclear. For this reason, it may be assumed that the user selects a desired event, and then it is difficult for the user to confirm the content item belonging to the selected event.

In addition, when the list display screen is displayed, a case is assumed in which, in order to select other events, a display state of the display unit is switched from the list display screen to the event display screen. In a similar manner, in the case of switching the display screen as such, a position of the index image on the list display screen and a position of the event image on the event display screen may be different from each other. In this case, there is concern that the correspondence relationship between the index image displayed on the list display screen and the event image displayed on the event display screen becomes unclear. For this reason, it may be difficult to confirm event images of an event to which the index image displayed on the list display screen belongs.

It is desirable to easily grasp the correspondence relationship between images related to content items displayed in a list view with content item units and images related to content items displayed with group units.

According to an embodiment of the present disclosure, there is provided an electronic apparatus including an operation reception unit that receives a switching operation for switching between a list display screen where index images for selecting content items belonging to one or a plurality of groups are disposed at predetermined positions on a display surface of a display unit with content item units, and a group display screen where the index images are disposed at predetermined positions on the display surface with group units; and a display control unit that displays one of the list display screen and the group display screen on the display unit based on the switching operation, moves the index images with content item units from predetermined positions on one screen of the list display screen and the group display screen, displayed at the time of receiving the corresponding switching operation to predetermined positions on the other screen displayed after the corresponding switching operation is received in a case of receiving the switching operation, and displays the index images which are movement targets by animation during the movement, and a display control method thereof, and a program enabling a computer to execute the method. This produces an operation where one of the list display screen and the group display screen on the display unit is displayed based on the switching operation for switching the list display screen and the group display screen, the index images are moved with content item units from predetermined positions on one screen of the list display screen and the group display screen, displayed at the time of receiving the corresponding switching operation to predetermined positions on the other screen displayed after the corresponding switching operation is received in a case of receiving the switching operation, and the index images which are movement targets are displayed by animation during the movement.

In addition, according to the embodiment of the present disclosure, the display control unit may display a screen where the index images are arranged side by side in a matrix as the list display screen, set synthesized images formed by superimposition synthesis of the index images corresponding to the respective content items forming one group as group images indicating the corresponding group, and display a screen where the group images are disposed at predetermined positions with group units as the group display screen. This produces an operation where a screen where the index images are arranged side by side in a matrix is displayed as the list display screen, synthesized images (group images) formed by superimposition synthesis of the index images corresponding to the respective content items forming one group, and a screen where the group images are disposed at predetermined positions with group units is displayed as the group display screen.

Further, according to the embodiment of the present disclosure, the display control unit may move the index images such that the rates of change of movement speeds per unit time of the respective index images adjacent in a specific direction on the list display screen are different from each other, in a case of receiving the switching operation. This produces an operation where the index images are moved such that the rates of change of movement speeds per unit time of the respective index images adjacent in a specific direction on the list display screen are different from each other, in a case of receiving the switching operation.

According to the embodiment of the present disclosure, in a case of receiving the switching operation for switching from the group display screen to the list display screen, the display control unit may move the index images which are displayed at an upper side as the group images from the corresponding display positions to predetermined positions on the list display screen, and move the index images which are not displayed at the upper side as the group images from predetermined positions in the corresponding group images to predetermined positions on the list display screen. This produces an operation where, in a case of receiving the switching operation for switching from the group display screen to the list display screen, the index images which are displayed at an upper side as the group images are moved from the corresponding display positions to predetermined positions on the list display screen, and the index images which are not displayed at the upper side as the group images are moved from predetermined positions in the corresponding group images to predetermined positions on the list display screen.

According to the embodiment of the present disclosure, the display control unit may display a screen where the index images corresponding to respective content items forming one group are continuously arranged side by side, as the list display screen. This produces an operation where a screen where the index images corresponding to respective content items forming one group are continuously arranged side by side is displayed as the list display screen.

Further, the display control unit may display a screen where the index images are arranged side by side such that a longer direction of the index image is a specific direction, as the list display screen, and display a screen where at least one of the index images is rotated by a predetermined angle and is disposed at a predetermined position on the display surface, as the group display screen. This produces an operation where a screen where the index images are arranged side by side such that a longer direction of the index image is a specific direction is displayed as the list display screen, and a screen where at least one of the index images is rotated by a predetermined angle and is disposed at a predetermined position on the display surface is displayed as the group display screen.

In addition, according to the embodiment of the present disclosure, the display control unit may perform animation display while changing an angle of the corresponding index image during the movement between a movement source and a movement destination such that the index image which is the rotation target has an angle at the movement destination. This produces an operation where animation display is performed while changing an angle of the corresponding index image during the movement between a movement source and a movement destination such that the index image which is the rotation target has an angle at the movement destination.

Further, according to the embodiment of the present disclosure, the display control unit may perform the animation display by correlating the rate of change of a rotation speed per unit time of the index image which is the rotation target with the rate of change of a movement speed per unit time of the corresponding index time between the movement source and the movement destination. This produces an operation where the animation display is performed by correlating the rate of change of a rotation speed per unit time of the index image which is the rotation target with the rate of change of a movement speed per unit time of the corresponding index time between the movement source and the movement destination.

Moreover, according to the embodiment of the present disclosure, in a case of receiving the switching operation for switching from the group display screen to the list display screen, the display control unit may display by animation only the index images related to group images disposed at a specific position among the group images included in the group display screen, displayed at the time of receiving the switching operation. This produces an operation where, in a case of receiving the switching operation for switching from the group display screen to the list display screen, only the index images related to the group images disposed at a specific position among the group images included in the group display screen, displayed at the time of receiving the switching operation, are displayed by animation.

According to the embodiment of the present disclosure, the display control unit may display an index image included in the group display screen and an index image included in the list display screen in different sizes, and perform animation display while changing the size of the index image which is the movement target such that the size of the index image included in one screen has the size of the index image included in the other screen during the movement between a movement source and a movement target in a case of receiving the switching operation. This produces an operation where an index image included in the group display screen and an index image included in the list display screen are displayed in different sizes, and animation display is performed while changing the size of the index image which is the movement target such that the size of the index image included in one screen has the size of the index image included in the other screen during the movement between a movement source and a movement target in a case of receiving the switching operation.

According to the embodiment of the present disclosure, the index image may be in a substantially rectangular shape, and the index image included in the group display screen may be a trim image of which both ends in the longer direction of the index image are included in the list display screen. In addition, in a case of receiving the switching operation for switching from the group display screen to the list display screen, the display control unit may perform animation display while adding an original image to the trim image between the movement source and the movement destination, and, in a case of receiving the switching operation for switching from the list display screen to the group display screen, performs animation display while removing both ends of the index image in the longer direction between the movement source and the movement destination. This produces an operation where, in a case of receiving the switching operation for switching from the group display screen to the list display screen, animation display is performed while adding an original image to the trim image between the movement source and the movement destination, and, in a case of receiving the switching operation for switching from the list display screen to the group display screen, animation display is performed while removing both ends of the index image in the longer direction between the movement source and the movement destination.

According to the embodiment of the present disclosure, the display control unit may perform animation display by correlating the rate of change of an addition ratio per unit time of the original image with the rate of change of a movement speed per unit time of the corresponding index image between the movement source and the movement destination. This produces an operation where animation display is performed by correlating the rate of change of an addition ratio per unit time of the original image with the rate of change of a movement speed per unit time of the corresponding index image between the movement source and the movement destination.

According to the embodiment of the present disclosure, in a case of receiving the switching operation for switching from the list display screen to the group display screen, the display control unit may display by animation only index images related to content items forming a group related to the index images disposed at a specific position among the index images included in the list display screen, displayed at the time of receiving the switching operation. This produces an operation where, in a case of receiving the switching operation for switching from the list display screen to the group display screen, only index images related to content items forming a group related to the index images disposed at a specific position among the index images included in the list display screen, displayed at the time of receiving the switching operation, are displayed by animation.

According to the embodiment of the present disclosure, it is possible to achieve the excellent result of easily grasping the correspondence relationship between images related to content items displayed in a list view with content item units and images related to content items displayed with group units.

BRIEF DESCRIPTION OF THE DRAWINGS

FIGS. 17A and 17B are diagrams illustrating a transition example of a thumbnail image displayed by the display control unit according to the first embodiment of the present disclosure.

FIG. 26 is a flowchart illustrating an example of process procedures of a display control process performed by the image capturing device according to the first embodiment of the present disclosure.

FIG. 27 is a flowchart illustrating an animation process to a list display screen among the process procedures of the display control process performed by the image capturing device according to the first embodiment of the present disclosure.

FIG. 28 is a flowchart illustrating an animation process to an event display screen among the process procedures of the display control process performed by the image capturing device according to the first embodiment of the present disclosure.

FIGS. 30A to 30D are schematic diagrams illustrating a fade-in method of fading in a thumbnail image moved by the display control unit according to the modified example of the first embodiment of the present disclosure.

DETAILED DESCRIPTION OF EMBODIMENTS

Hereinafter, embodiments of the present disclosure will be described. The description will be made in the following order.

1. First Embodiment (display control: an example of performing animation display while moving a thumbnail image at the time of a switching operation between an event display screen and a list display screen)

2. Modified Example

1. First Embodiment

Internal Configuration Example of Image Capturing Device

Figure 1:
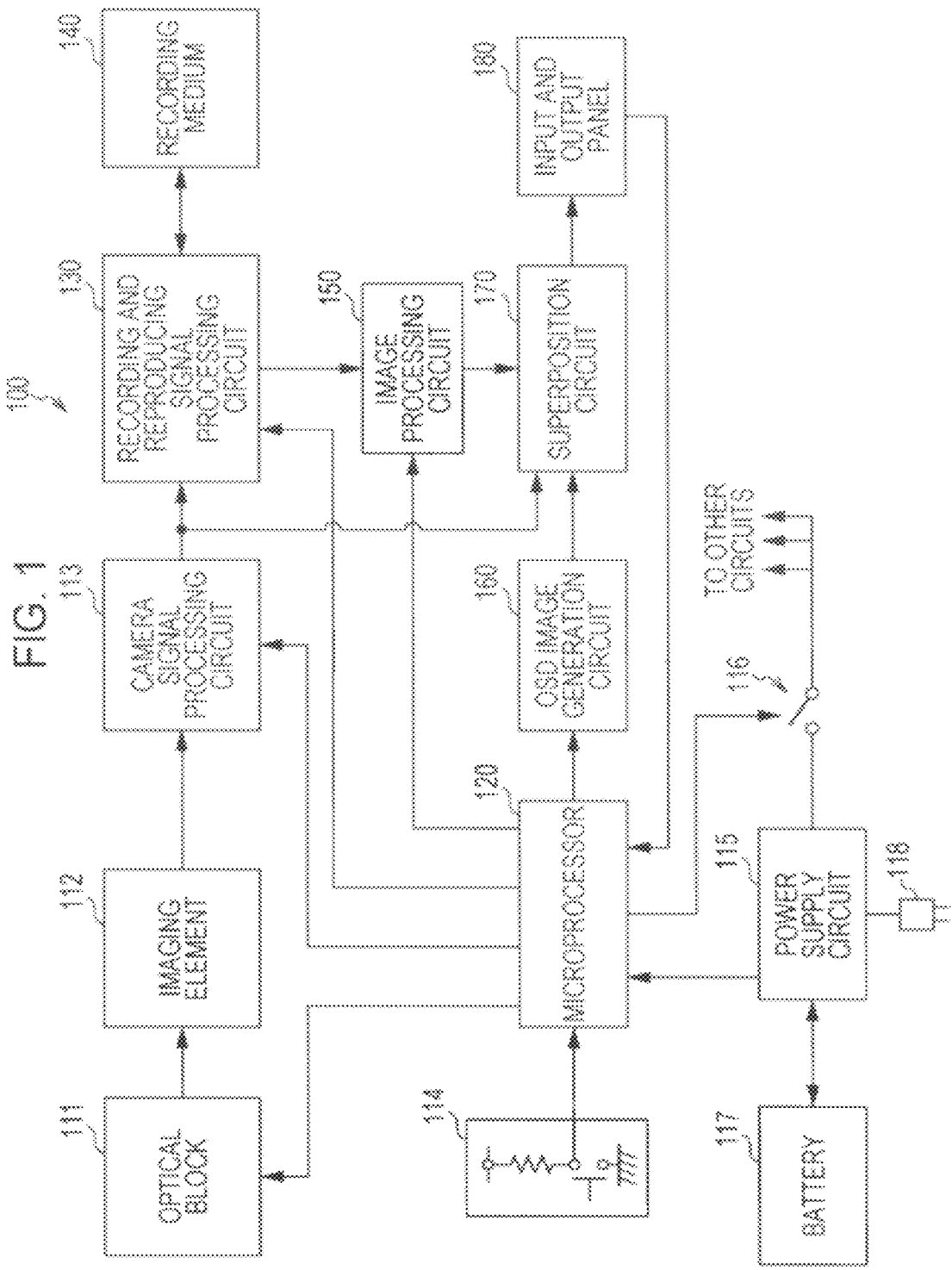
FIG. 1 is a block diagram illustrating an internal configuration example of an image capturing device according to a first embodiment of the present disclosure.

FIG. 1 is a block diagram illustrating an internal configuration example of an image capturing device 100 according to a first embodiment of the present disclosure.

The image capturing device 100 includes an optical block 111, an imaging element 112, a camera signal processing circuit 113, a key input circuit 114, a power supply circuit 115, a power supply control circuit 116, a battery 117, and an AC cable 118. In addition, the image capturing device 100 includes a microprocessor 120, a recording and reproducing signal processing circuit 130, a recording medium 140, an image processing circuit 150, an OSD (On-Screen Display) image generation circuit 160, a superposition circuit 170, and an input and output panel 180. The image capturing device 100 can be implemented by, for example, a digital video camera which can capture an image of a subject so as to generate image data, and perform various kinds of image processes for the image data.

The optical block 111 collects ambient light and outputs the collected light to the imaging element 112. Further, the optical block 111 performs a focus control or an adjustment of an aperture value based on a control signal output from the microprocessor 120.

The imaging element 112 converts an optical signal input via the optical block 111 into an electric signal, and outputs the converted electric signal to the camera signal processing circuit 113. As the imaging element, for example, a CCD (Charge Coupled Device), a CMOS (Complementary Metal-Oxide Semiconductor), or the like may be used.

The camera signal processing circuit 113 performs an appropriate signal process for the electric signal output from the imaging element 112 based on a control signal output from the microprocessor 120. The camera signal processing circuit 113 outputs the electric signal having undergone the signal process to the recording and reproducing signal processing circuit 130 and the superposition circuit 170 as a picture signal.

The key input circuit 114 is a circuit which includes a plurality of external operation members and outputs an electric signal according to an operation of the external operation members to the microprocessor 120. The external operation members are, for example, hardware keys which may be provided in the image capturing device 100.

The power supply circuit 115 supplies power to the microprocessor 120 and the other circuits. A power source is the battery 117 or the AC cable 118.

The power supply control circuit 116 controls whether or not power is supplied to other circuits based on a control signal output from the microprocessor 120.

The battery 117 supplies electricity to the power supply circuit 115. In addition, the power supply circuit 115 charges the battery 117 using electricity supplied from the AC cable 118. The AC cable 118 supplies electricity to the power supply circuit 115.

The microprocessor 120 controls the respective parts of the image capturing device 100 based on a control program stored in a memory (not shown). In addition, the microprocessor 120 determines a pressed state of the input and output panel 180 or the key input circuit 114 based on an electric signal output from the input and output panel 180 or the key input circuit 114. Further, the microprocessor 120 outputs commands to the recording and reproducing signal processing circuit 130, the image processing circuit 150, the OSD image generation circuit 160, and the like, based on the determined result.

The recording and reproducing signal processing circuit 130 performs recording or reading for the recording medium 140 based on a control signal output from the microprocessor 120. Specifically, the recording and reproducing signal processing circuit 130 encodes and records a picture signal output from the camera signal processing circuit 113 in the recording medium 140 as a moving image file (moving image content item) during recording of moving images. In addition, when recording of still images is instructed (a so-called shutter operation), the recording and reproducing signal processing circuit 130 encodes and records a picture signal output from the camera signal processing circuit 113 in the recording medium 140 as a still image file (still image content item). Further, content management information for managing the moving image content items or the still image content items is correlated with each of the content items and is recorded in the recording medium 140. In a case where a content reproduction mode is set, the recording and reproducing signal processing circuit 130 reads and decodes the moving image files or the still image files stored in the recording medium 140, and outputs the files to the image processing circuit 150. In addition, in a case where the content reproduction mode is set, the recording and reproducing signal processing circuit 130 reads the content management information stored in the recording medium 140 and the outputs the information to the image processing circuit 150. An event display screen (for example, an event display screen 300 shown in FIG. 5A) and a list display screen (for example, a list display screen 330 shown in FIG. 5B) are displayed based on the content management information.

The image processing circuit 150 performs various kinds of image processes such as enlargement and reduction processes of an image corresponding to a content item output from the recording and reproducing signal processing circuit 130, based on a control signal output from the microprocessor 120. In addition, the image processing circuit 150 outputs the picture signal having undergone the image process to the superposition circuit 170.

The OSD image generation circuit 160 includes a VRAM (Video Random Access Memory) which holds various kinds of images displayed on the input and output panel 180, and generates various kinds of images displayed on the input and output panel 180. The OSD image generation circuit 160 outputs a display signal corresponding to the generated image to the superposition circuit 170. For example, the OSD image generation circuit 160 generates respective operation images (for example, a transition button 301 to a menu screen, a battery remaining amount icon 302, arrow buttons 303 and 304, and the like shown in FIG. 5A) on the event display screen. In addition, for example, the OSD image generation circuit 160 generates respective operation images (for example, a battery remaining amount icon 302, arrow buttons 331 and 332, a scroll bar 333, and the like shown in FIG. 5B) on the list display screen.

The superposition circuit 170 superposes the respective signals output from the camera signal processing circuit 113, the OSD image generation circuit 160 and the image processing circuit 150 so as to generate an image signal, and outputs the superposed image signal to the input and output panel 180. For example, if a monitoring mode is set, the superposition circuit 170 superposes a picture signal output from the camera signal processing circuit 113 and a display signal output from the OSD image generation circuit 160, and generates an image signal used to display a captured image. Further, for example, if the content reproduction mode is set, the superposition circuit 170 superposes a display signal output from the OSD image generation circuit 160 and a picture signal output from the image processing circuit 150, and generates an image signal for displaying each display screen. A display screen when setting the content reproduction mode is, for example, the list display screen or the event display screen.

The input and output panel 180 receives an operation input from a user as well as displaying each image, and outputs the received operation input to the microprocessor 120. Specifically, the input and output panel 180 displays an image corresponding to an image signal output from the superposition circuit 170 on a display panel (for example, an LCD (liquid crystal display) panel, an organic EL (Electro Luminescence) panel). In addition, when detecting an object (for example, a finger of the user, or the like) approaching or touching the display panel, the input and output panel 180 converts the detection state into an electric signal, and outputs the converted electric signal to the microprocessor 120. The input and output panel 180 is formed by, for example, overlapping transparent touch panels on the display surface of the display panel.

Functional Configuration Example of Image Capturing Device

Figure 2:
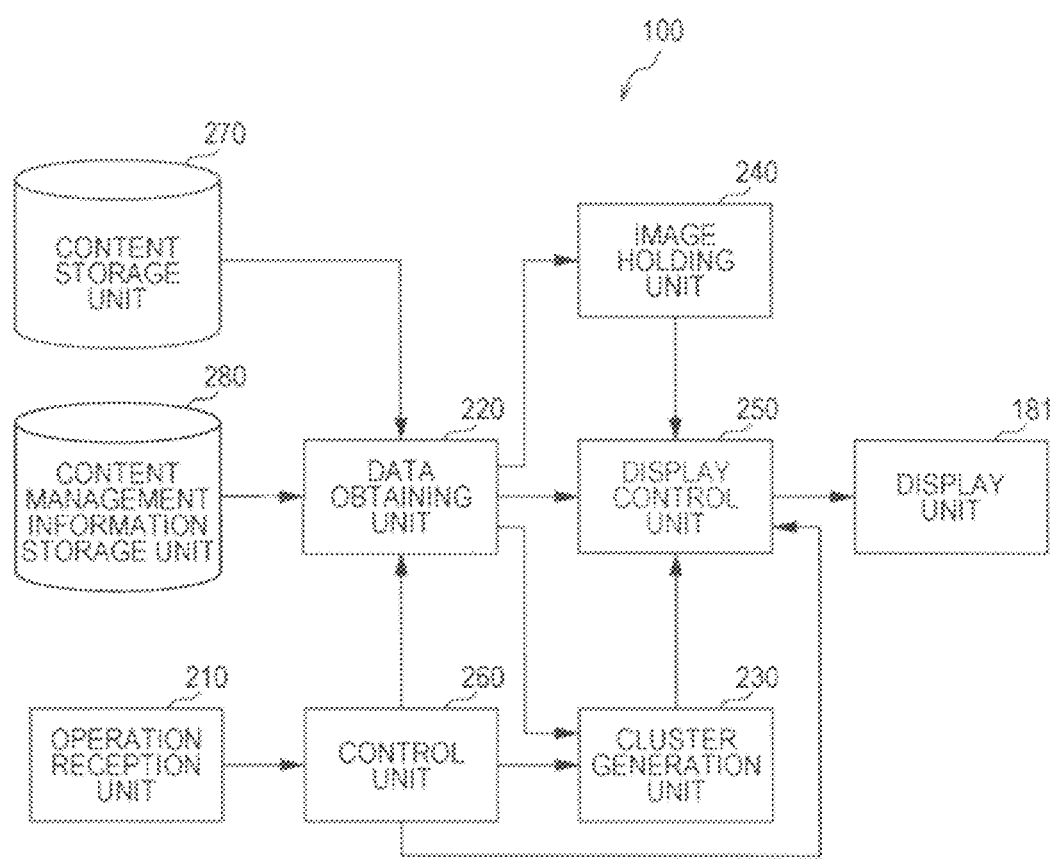
FIG. 2 is a block diagram illustrating a functional configuration example of the image capturing device according to the first embodiment of the present disclosure.

FIG. 2 is a block diagram illustrating a functional configuration example of the image capturing device 100 according to the first embodiment of the present disclosure.

The image capturing device 100 includes a display unit 181, an operation reception unit 210, a data obtaining unit 220, a cluster generation unit 230, an image holding unit 240, a display control unit 250, a control unit 260, a content storage unit 270, and a content management information storage unit 280.

The content storage unit 270 stores still image content items or moving image content items, and supplies the stored still image content items or moving image content items to the data obtaining unit 220. In addition, the content storage unit 270 corresponds to the recording medium 140 shown in FIG. 1.

The content management information storage unit 280 stores content management information for managing the content items stored in the content storage unit 270 for each content item so as to be correlated with each content item. In addition, the content management information storage unit 280 supplies the stored content management information to the data obtaining unit 220. The content management information includes a thumbnail image (index image) indicating a still image content item or a moving image content item. In addition, the content management information storage unit 280 corresponds to the recording medium 140 shown in FIG. 1.

The display unit 181 displays a variety of images under the control of the display control unit 250. The display unit 181 corresponds to the input and output panel 180 shown in FIG. 1.

The operation reception unit 210 receives an operation input from a user and outputs operation contents according to the received operation input to the control unit 260. In addition, the operation reception unit 210 corresponds to the key input circuit 114 or the input and output panel 180 shown in FIG. 1.

The data obtaining unit 220 obtains data stored in the content storage unit 270 or the content management information storage unit 280 and supplies the obtained data to the respective parts under the control of the control unit 260. In addition, the data obtaining unit 220 holds a part of the obtained data (for example, a thumbnail image which is a movement target by animation display) in the image holding unit 240. Further, the data obtaining unit 220 corresponds to the recording and reproducing signal processing circuit 130 shown in FIG. 1.

The cluster generation unit 230 generates a cluster (that is, performs clustering) based on the content management information output from the data obtaining unit 220 under the control of the control unit 260. The cluster generation unit 230 outputs information regarding the generated cluster (cluster information) to the display control unit 250. In addition, a method of generating the event cluster will be described in detail with reference to FIG. 4.

The image holding unit 240 holds the image output from the data obtaining unit 220 and supplies the held images to the display control unit 250. In addition, the image holding unit 240 corresponds to the recording and reproducing signal processing circuit 130 shown in FIG. 1.

The display control unit 250 displays the images output from the data obtaining unit 220 or the images held in the image holding unit 240 on the display unit 181 under the control of the control unit 260. For example, the display control unit 250 performs a variety of image processes for the images output from the data obtaining unit 220 or the images held in the image holding unit 240. In addition, the display control unit 250 draws event images (group images) displayed on the event display screen based on the content management information output from the data obtaining unit 220 and the cluster information output from the cluster generation unit 230. The event display screen is the event display screen 300 shown in FIG. 5A. In addition, the display control unit 250 draws thumbnail images (index images) displayed on the list display screen (for example, the list display screen 330 shown in FIG. 5B) based on the content management information output from the data obtaining unit 220. The display control unit 250 displays either the list display screen or the event display screen on the display unit 181 based on a changing operation of the event display screen (group display screen) and the list display screen. Further, the display control unit 250 moves a thumbnail image from a predetermined position on the display screen (the list display screen or the event display screen) which is displayed at the time of receiving the changing operation to a predetermined position on the other screen which is displayed after the changing operation is received, with content item units. The display control unit 250 displays by animation a thumbnail image which is a movement target during the movement. Examples of such display will be described in detail with reference to FIGS. 5A to 25B. In addition, the display control unit 250 corresponds to the image processing circuit 150, the OSD image generation circuit 160, and the superposition circuit 170 shown in FIG. 1.

The control unit 260 controls the overall image capturing device 100. For example, the control unit 260 performs a control in response to an operation input from a user, received by the operation reception unit 210. In addition, the control unit 260 corresponds to the microprocessor 120 shown in FIG. 1.

Figure 3:
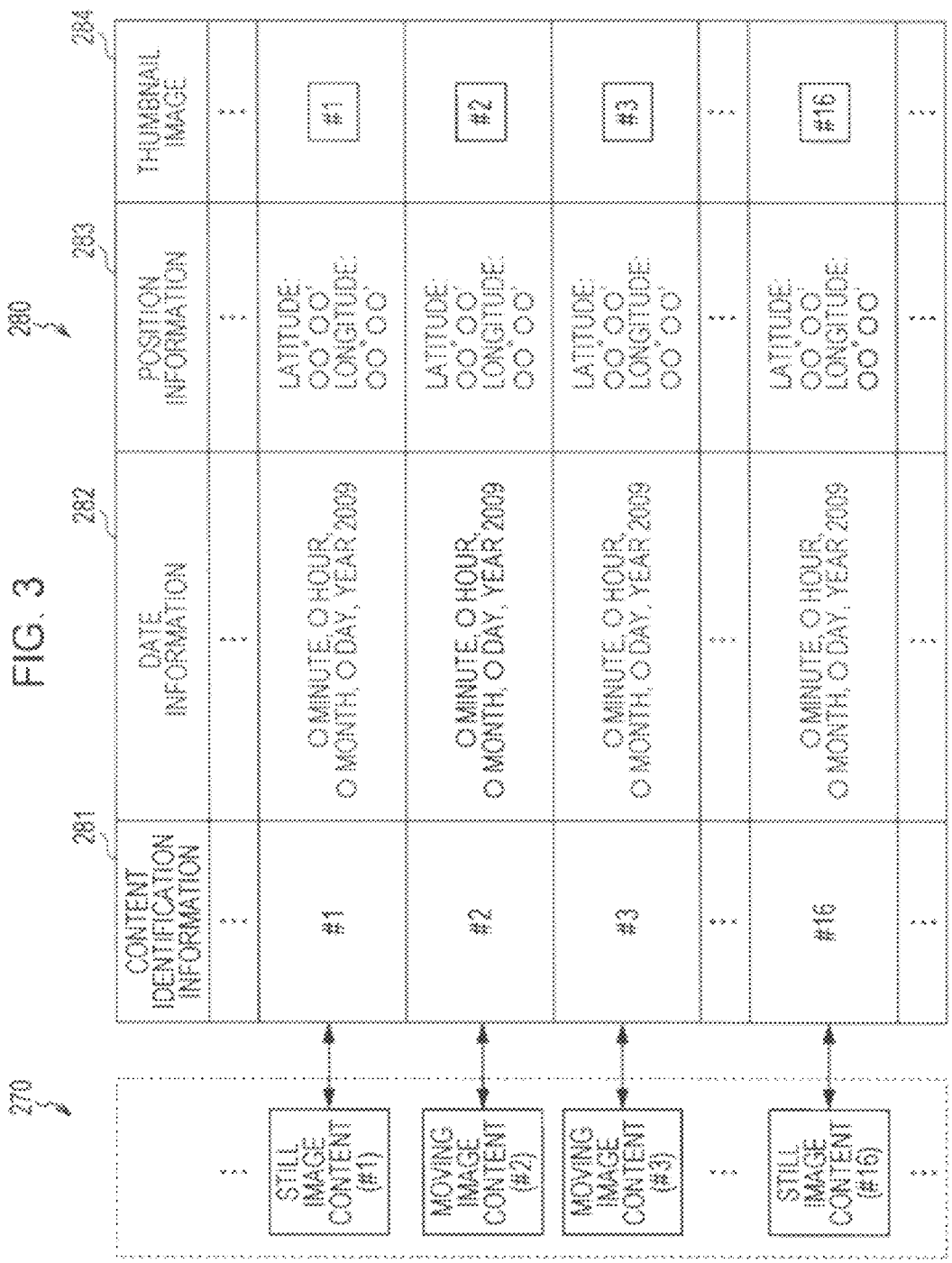
FIG. 3 is a schematic diagram illustrating an example of contents stored in a content storage unit and a content management storage unit according to the first embodiment of the present disclosure.

Example of Storage Contents of Content Storage Unit and Content Management Information Storage Unit FIG. 3 is a schematic diagram illustrating an example of storage contents of content storage unit 270 and the content management information storage unit 280 according to the first embodiment of the present disclosure.

The content storage unit 270 stores one or a plurality of content items (still image content item (#1), moving image content item (#2), moving image content item (#3), . . . , and still image content item (#16)). In addition, in the example shown in FIG. 3, the content item is schematically represented in a rectangular shape.

The content management information storage unit 280 stores content identification information 281, date information 282, position information 283, and thumbnail image 284, so as to be correlated with each other. In addition, in FIG. 3, the correspondence relationship between the content item stored in the content storage unit 270 and the content management information stored in the content management information storage unit 280 is shown by the arrow, and a corresponding content item and content management information (thumbnail image or the like) are given the same number.

The content identification information 281 identification information (#1 to #3, . . . , and #16) for corresponding content items.

The date information 282 stores date information (photographing time) when a corresponding content item is generated (when an image capturing operation is performed).

The position information 283 stores position information (photographing position) obtained when a corresponding content item is generated (when an image is captured). This position information is obtained by, for example, a GPS (Global Positioning System) unit (a built-in device or an external device). The GPS unit calculates position information based on a GPS signal received by a GPS signal reception antenna. In addition, the calculated position information includes data regarding a position such as latitude, longitude, elevation, and the like. In addition, in FIG. 3, the date information stored in the date information 282 and the position information stored in the position information 283 are denoted by "O" or the like as a simplification.

The thumbnail image 284 stores thumbnail images (index images) generated for corresponding content items. For example, if a corresponding content item is a still image content item, a thumbnail image corresponding to the still image content item is stored in the thumbnail image 284. In addition, if a corresponding content item is a moving image content item, thumbnail images corresponding to one or a plurality of frames (representative image) among frames forming the moving image content item are stored in the thumbnail image 284. As the representative image, a leading frame or a frame having the maximum feature amount (for example, a frame where the smile score is the maximum) may be used. In the example shown in FIG. 3, a thumbnail image is schematically represented by a rectangular shape whose inside has identification information for a corresponding content item.

Example of Generating Cluster

Figure 4:
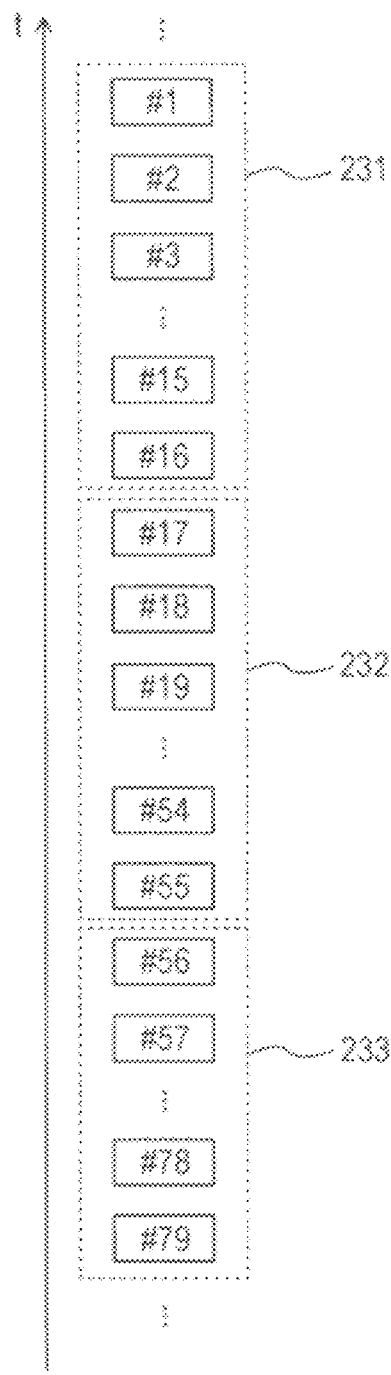
FIG. 4 is a schematic diagram illustrating in a time series content items stored in the content storage unit according to the first embodiment of the present disclosure.

FIG. 4 is a schematic diagram illustrating in a time series the content items stored in the content storage unit 270 according to the first embodiment of the present disclosure. In FIG. 4, for convenience of description, only corresponding signs (#1 to #79) are shown inside the rectangular shapes indicating the content items (#1 to #79). In FIG. 4, the content items (#1 to #79) are shown to be arranged in a time series based on the date information (photographing time) recorded in correlation with the respective content items (#1 to #79). In addition, the longitudinal axis represents a time axis; however, the time axis is schematic, and does not represent an exact time interval between the content items.

For example, it is assumed that the content items (#1 to #16) are generated at OO journey (OO journey 231) which a user of the image capturing device 100 has made, and the content items (#17 to #55) are generated at a wedding (wedding 232) which the user of the image capturing device 100 has attended. In addition, it is assumed that the content items (#56 to #79) are generated at the year 2009 sports day (the year 2009 sports day) 233 for a child of the user of the image capturing device 100.

Next, a clustering method of clustering a plurality of content items (hierarchy clustering) will be described. Here, the clustering indicates that a plurality of pieces of data where a distance therebetween is short are gathered and grouped (classified) with respect to a set of data. In addition, a content item (still image content item and moving image content item) is used as data in the first embodiment of the present disclosure. In addition, the distance between the content items indicates a distance between two points (geographical positions, positions on the time axis, or the like) corresponding to content items. The cluster is a unit where content items are collected through the clustering.

Figure 5A:
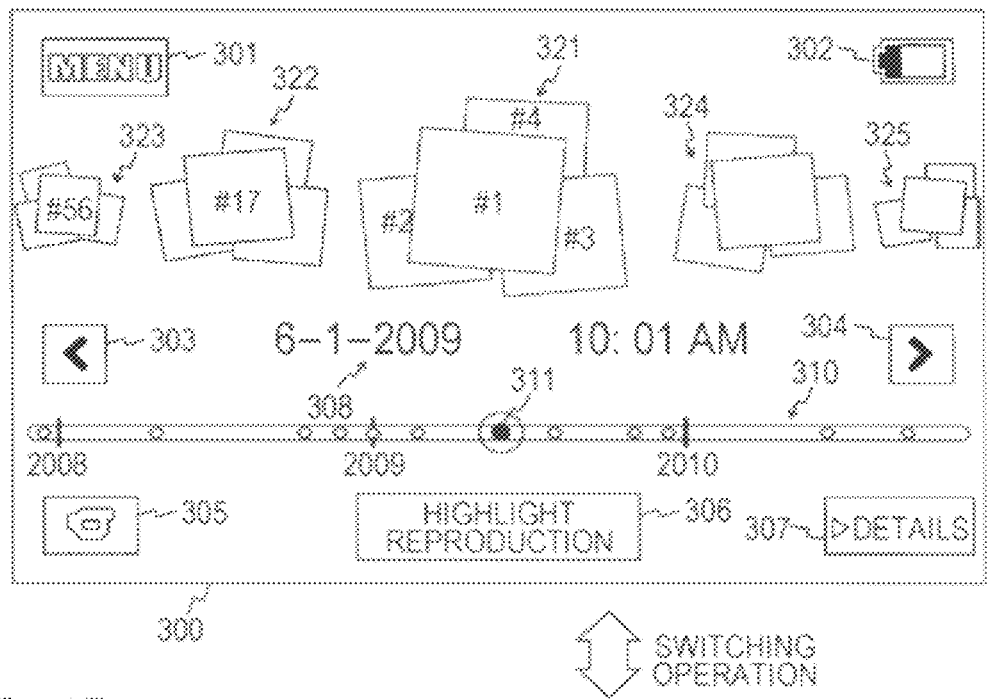
FIGS. 5A and 5B are diagrams illustrating examples of an event display screen and a list display screen displayed by a display control unit according to the first embodiment of the present disclosure.

For example, if a distance on the time axis is used as the distance between content items, the cluster generation unit 230 generates a binary tree data based on the content management information (date information) output from the data obtaining unit 220. The cluster generation unit 230 generates event clusters (clusters based on the date information) based on the binary tree structure (for example, refer to Japanese Unexamined Patent Application Publication No. 2007-94762). The event cluster is generated based on an user operation (for example, a user operation using a setting screen displayed after a detail button 307 shown in FIG. 5A is pressed) output from the operation reception unit 210.

In addition, if a geographical distance is used as the distance between the content items, the cluster generation unit 230 generates a binary tree structure based on the content management information (position information) output from the data obtaining unit 220. The cluster generation unit 230 generates event clusters (clusters based on the position information) based on the binary tree structure (for example, refer to Japanese Unexamined Patent Application Publication No. 2008-250605).

In FIG. 4, the content items forming each cluster corresponding to the event cluster generated by the cluster generation unit 230 are denoted by the dotted rectangular shape (the OO journey 231, the wedding 232, and the year 2009 sports day 233).

Display Example of Event Display Screen and List Display Screen

Figure 5B:
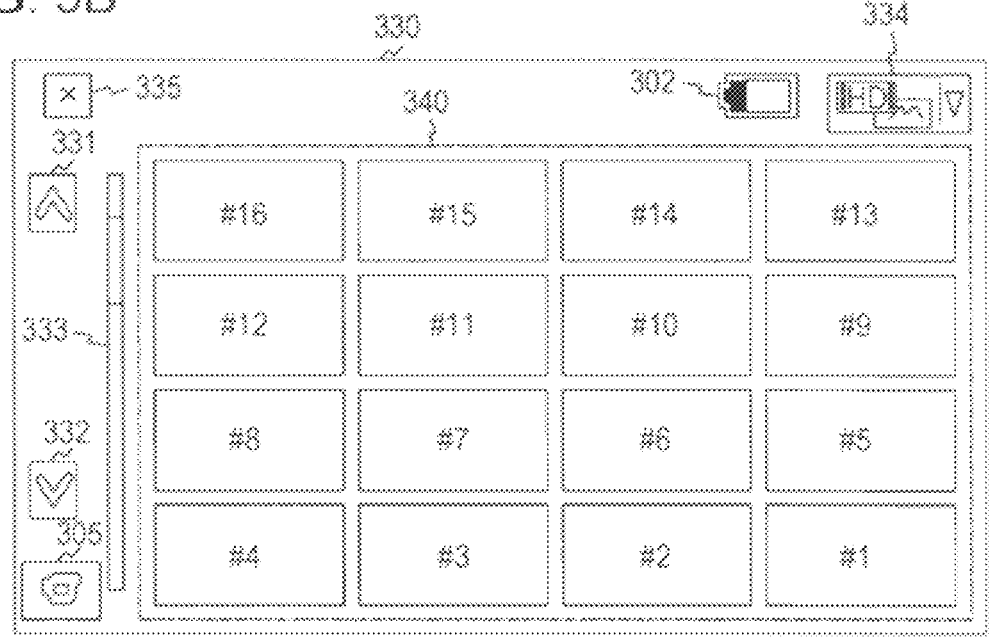

FIGS. 5A and 5B are diagrams illustrating examples of the event display screen (group display screen) and the list display screen displayed by the display control unit 250 according to the first embodiment of the present disclosure.

FIG. 5A shows the event display screen 300 displayed by the display control unit 250. The event display screen 300 is a group display screen where thumbnail images (index images) are arranged predetermined positions on the display surface of the display unit 181 with event units (group units). Specifically, the event display screen 300 displays the event images 321 to 325, the transition button 301 to a menu screen, the battery remaining amount icon 302, and the arrow buttons 303 and 304. In addition, the event display screen 300 displays a transition button 305 to the image capturing mode, a highlight reproduction button 306, a detail button 307, an event information display region 308, and a time line bar 310. Further, the event display screen 300 is displayed, for example, immediately after the content reproduction mode is set.

The event images 321 to 325 are synthesized images (group images) formed by performing superimposition synthesis for thumbnail images (index images) corresponding to the respective content items forming one event (group). For example, the event images 321 are formed by performing the superimposition synthesis for the thumbnail images (#1 to #16) corresponding to the respective content items (#1 to #16) forming the cluster (the OO journey 231) shown in FIG. 4. For example, the thumbnail image (#1 to #16) are synthesized by superimposition in a time series, and the four thumbnail images (#1 to #4) located at the upper side (the upper side in the gaze direction) form the event images 321. In this case, images of which both end portions in the longer direction are trimmed are used as the thumbnail images which are synthesized. In other words, in the event images, it is necessary to display the images related to the event in a relatively large quantity in a small region in order for a user to grasp the event images. For this reason, the trim images (for example, square shape) are used as the thumbnail images to be synthesized, and the trimmed images are synthesized so as to overlap each other. In contrast, in the list display screen 330 shown in FIG. 5B, the original thumbnail images (for example, rectangular shape) are displayed instead of the trimmed images such that the thumbnail images are correctly viewed.

In addition, the trimmed images (thumbnail images) are tilted with respect to the horizontal direction by rotation of a predetermined angle. In FIGS. 5A and 5B, for convenience of description, only corresponding signs (#1 to #4 and the like) are shown inside the rectangular shapes indicating the content items (#1 to #4 and the like). A synthesized pattern of the event images (synthesized positions of the respective thumbnail images to be synthesized and rotation angles) may be in a plurality (for example, about five patterns). The synthesized pattern may be set in advance from the viewpoint of design, or may be set through a user operation.

The event images 321 to 325 are disposed at predetermined positions on the event display screen 300 with event units (group units). The predetermined positions are positions on the display surface of the display unit 181 (the event display screen 300) in a specific direction (horizontal direction). For example, the predetermined positions are five positions (a central position (that is, the position of the event images 321), and four positions from the central position to the end portions (that is, the positions of the event images 322 to 325)). In this case, for example, the event images located at the central position are made to be larger than the other event images, and the event images are made to become smaller toward the end portions.

In addition, if a selection operation of the event images 321 to 325 is performed, the list display screen 330 shown in FIG. 5B is displayed on the display unit 181. The selection operation is performed, for example, by pressing the event images 321 located at the central position on the event display screen 300 in the specific direction (horizontal direction). In addition, a transition from the event display screen 300 to the list display screen 330 performed when the selection operation (change operation) is performed will be described in detail with reference to FIGS. 6A to 9B, and the like.

The transition button 301 to a menu screen is an icon pressed in order to be transitioned to the menu screen. That is to say, when the transition button 301 to the menu screen is pressed, the menu screen is displayed on the display unit 181.

The battery remaining amount icon 302 is an icon indicating a remaining amount of a battery embedded in the image capturing device 100. In addition, this is also the same for the battery remaining amount icon 302 shown in FIG. 5B.

The arrow buttons 303 and 304 are icons used to move the event images 321 to 325 displayed on the event display screen 300 in the horizontal direction. For example, if the arrow button 303 is pressed once, the event images 321 to 325 are moved in the horizontal direction by one. Through the movement, the event images 324 are disposed at the central position, the event images 323 are removed, and new event images are displayed at the right end portion. The movement of the event images in the right direction using the arrow button 304 can be also performed in the same manner. In addition, the event images 321 to 325 can be moved in the horizontal direction by a flick operation for moving the event images 321 to 325 in the horizontal direction. The flick operation indicates that the finger flips in a desired direction and by a movement amount in a state where the finger touches the display surface of the input and output panel 180. If one of the event images 322 to 325 is pressed, the event images 321 to 325 are moved such that the pressed event images come to the central position.

The transition button 305 to the image capturing mode is an icon pressed in order to be transitioned to the image capturing mode for starting image-capturing. In other words, if the transition button 305 to the image capturing mode is pressed, there can be a transition from the content reproduction mode to the image capturing mode. This is also the same for the transition button 305 to the image capturing mode shown in FIG. 5B.

The highlight reproduction button 306 is an icon pressed when each content item belonging to the event corresponding to the event image displayed on the event display screen 300 is reproduced by highlight. For example, when the highlight reproduction button 306 is pressed, each content item corresponding to the event images 321 which are disposed at the central position on the event display screen 300 in the horizontal direction is reproduced by highlight. The highlight reproduction is a function where a part of scenes (for example, exciting scenes) of the content items to be reproduced are automatically extracted and reproduced.

The detail button 307 is an icon pressed in order to be transitioned to a setting screen for changing the size of the event cluster corresponding to the event images displayed on the event display screen 300. With this, the event cluster can be easily changed, and it is possible to easily display the event images appropriate to a user's taste.

The event information display region 308 is a region which displays information regarding the event cluster corresponding to the event images displayed on the event display screen 300. For example, among the thumbnail images forming the event images 321 disposed at the central position on the event display screen 300 in the horizontal direction, date information for the content item corresponding to the thumbnail image disposed at the uppermost part (the uppermost part in the gaze direction) is displayed.

The time line bar 310 is a display region having a bar shape indicating the time axis, and, a mark is disposed at a position (a position on the time axis) corresponding to the event images which are display targets on the display region. For example, in the time line bar 310, a black circle mark 311 is disposed at the position corresponding to the event images 321 which are located at the central position on the event display screen 300 in the horizontal direction. In addition, in the time line bar 310, white rhomboid marks are disposed at the positions corresponding to the event images other than the event images 321. For example, as the position corresponding to the event images, date information for the content item corresponding to the thumbnail image disposed at the uppermost part among the thumbnail images forming the event images is used in a manner similar to the event information display region 308.

FIG. 5B shows the list display screen 330 displayed by the display control unit 250. The list display screen 330 is a screen where the thumbnail images (index images) for selecting the content items (content items to be reproduced) belonging to one or a plurality of groups are disposed at predetermined positions on the display surface of the display unit 181 with content item units.

Specifically, the list display screen 330 is provided with the battery remaining amount icon 302, arrow buttons 331 and 332, a scroll bar 333, a transition button 334 to a reproduction mode setting screen, an "X" button 335, and a thumbnail image display region 340.

The arrow buttons 331 and 332 and the scroll bar 333 are used to perform a scroll operation for displaying other thumbnail images by moving the thumbnail images displayed on the thumbnail image display region 340 in the vertical direction.

The transition button 334 to a reproduction mode setting screen is an icon pressed in order to be transitioned to a setting screen for performing a variety of settings related to the content reproduction mode. For example, if the transition button 334 to the reproduction mode setting screen is pressed, a setting screen for the kind of content items to be reproduced is displayed. In the setting screen, one of the moving image content items, the still image content items, and MIX (mixture of the moving image content items and still image content items) is selected and set through a user operation. Only thumbnail images corresponding to the content items (the moving image content items, the still image content items, or MIX) set on the setting screen are displayed on the thumbnail image display region 340. The display form of the transition button 334 to a reproduction mode setting screen is changed depending on the setting contents in the setting screen. FIG. 5B shows the transition button 334 to a reproduction mode setting screen when MIX is selected in the setting screen.

The "X" button 335 is an icon pressed when a display state of the display unit 181 is switched from the list display screen 330 to the event display screen 300. In other words, if the "X" button 335 is pressed, the event display screen 300 shown in FIG. 5A is displayed on the display unit 181. In addition, a transition from the list display screen 330 to the event display screen 300 when the pressing operation (switching operation) is performed will be described in detail with reference to FIGS. 10A to 13B.

The thumbnail image display region 340 is a region displaying the thumbnail images stored in the content management information storage unit 280, and, for example, displays the thumbnail images in a list view in a 4×4 matrix. That is to say, the thumbnail images for selecting the content items stored in the content storage unit 270 is displayed in a list view on the thumbnail image display region 340. The thumbnail images are disposed continuously in a time series at the thumbnail image display region 340. In addition, the thumbnail image is selected from the list of the thumbnail images displayed on the thumbnail image display region 340, thereby reproducing the content item corresponding to the selected thumbnail image. Here, the selection operation for selecting the thumbnail image may be performed by a touch operation in the input and output panel 180, or may be performed by an operation input from the key input circuit 114. For example, in a case where the selection operation is performed in the input and output panel 180, the finger touches a display region of a desired thumbnail image among the thumbnail images displayed on the thumbnail image display region 340 in a list. In addition, for example, in a case of performing the selection operation by the operation input from the key input circuit 114, the selection operation is performed using a cross-key and an enter key. In the example shown in FIG. 5B, for convenience of description, the same character as in each of the thumbnail images shown in FIG. 3 and the like is added to the inside of the rectangular shape indicating each of the thumbnail images.

As such, the display control unit 250 displays the screen (the list display screen 330) where the thumbnail images (index images) corresponding to the respective content items forming one event (group) are continuously arranged side by side, on the display unit 181. On the list display screen 330, the thumbnail images are arranged side by side such that the longer direction of the thumbnail image is a specific direction.

Here, for example, it is assumed that the list display screen 330 is displayed immediately after an event image is selected on the event display screen 300. In this case, the thumbnail images of the content items belonging to the event corresponding to the selected event image are displayed on the list display screen 330 regardless of the position of the selected event image (position on the display surface). For this reason, the correspondence relationship between the event image and the thumbnail image corresponding thereto may not be grasped intuitively.

In addition, for example, it is assumed that the event display screen 300 is displayed immediately after the switching operation from the list display screen 330 to the event display screen 300 is performed. In this case, the event display screen 300 is displayed regardless of the position of the thumbnail image (position on the display surface) displayed on the list display screen 330. For this reason, the correspondence relationship between the thumbnail image and the event image corresponding thereto may not be grasped intuitively. Therefore, a thumbnail image (index image) is moved and displayed by animation at the time of the switching operation between the event display screen and the list display screen in the first embodiment of the present disclosure. Hereinafter, examples of the display transition will be described.

Transition Example from Event Display Screen to List Display Screen

FIGS. 6A to 9B are diagrams illustrating a transition example of the display screen displayed by the display control unit 250 in the first embodiment of the present disclosure. FIGS. 6A to 9B show a transition example when the switching operation from the event display screen to the list display screen is performed.

Figure 6A:
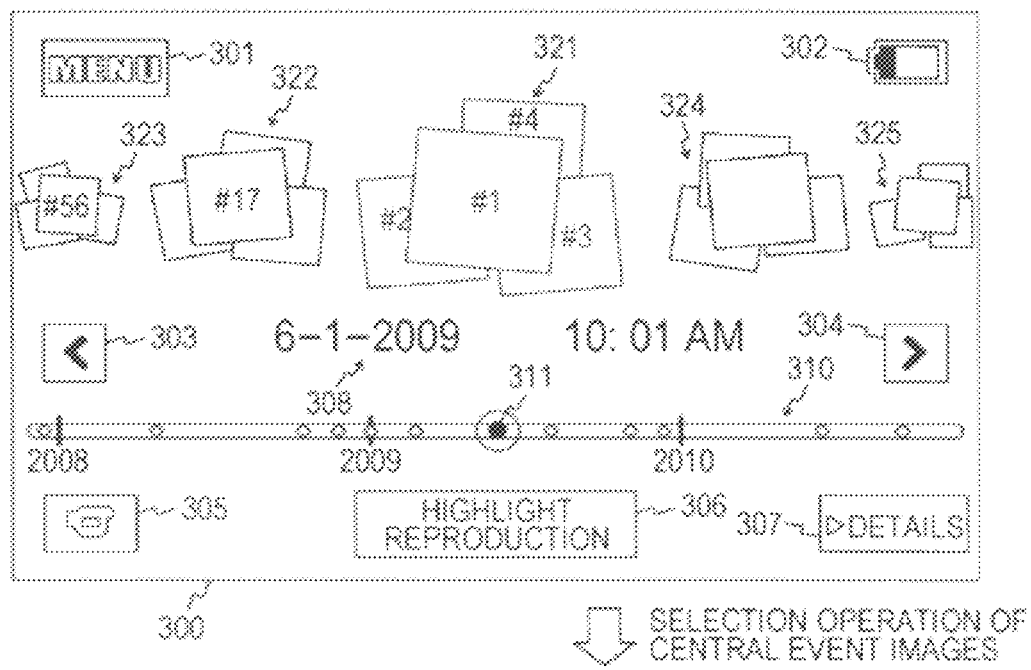
FIGS. 6A and 6B are diagrams illustrating a transition example of a display screen displayed by the display control unit according to the first embodiment of the present disclosure.

FIG. 6A shows the event display screen 300 displayed by the display control unit 250. The event display screen 300 shown in FIG. 6A is the same as in FIG. 5A. Here, it is assumed that a selection operation for selecting the event images 321 displayed on the event display screen 300 is performed. The selection operation is a switching operation from the event display screen to the list display screen, and is performed by a user touching some part of the event images 321 on the display surface of the input and output panel 180. An example of a display screen displayed after the selection operation is shown in FIG. 6B.

Figure 6B:
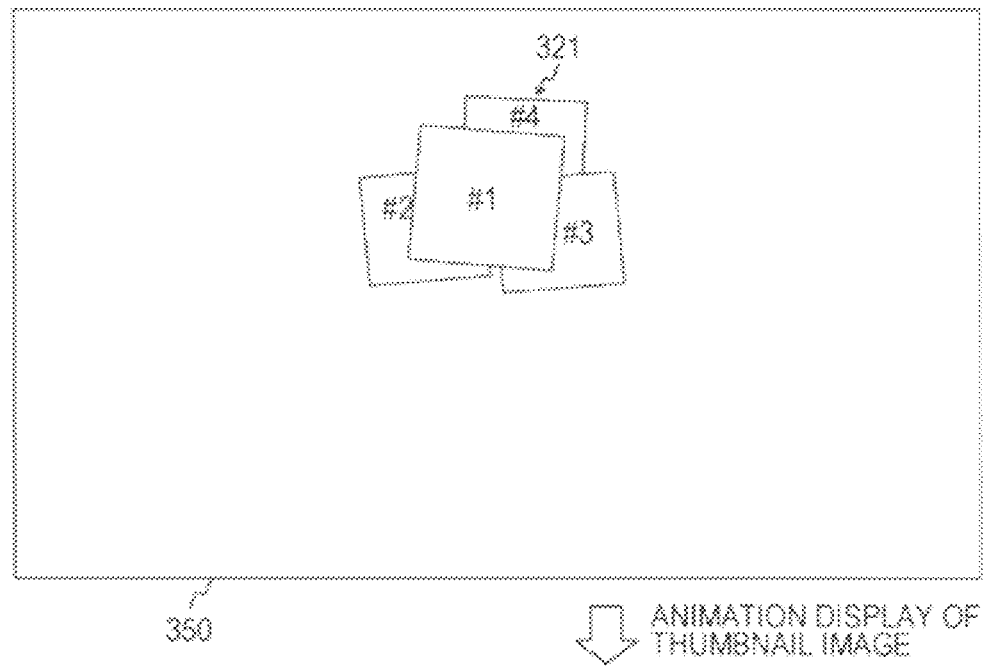
Figure 7A:
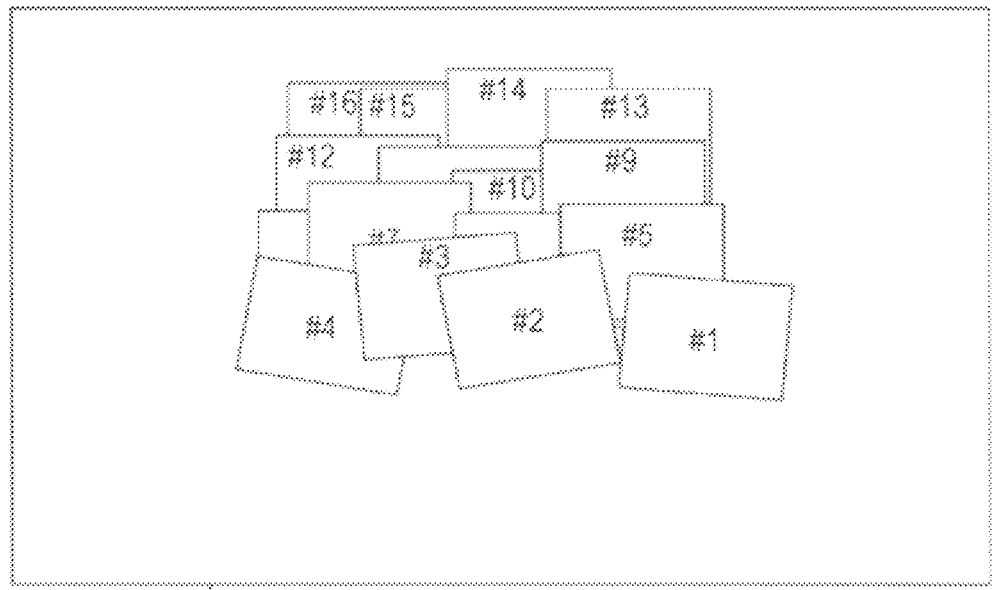
FIGS. 7A and 7B are diagrams illustrating a transition example of a display screen displayed by the display control unit according to the first embodiment of the present disclosure.
Figure 7B:
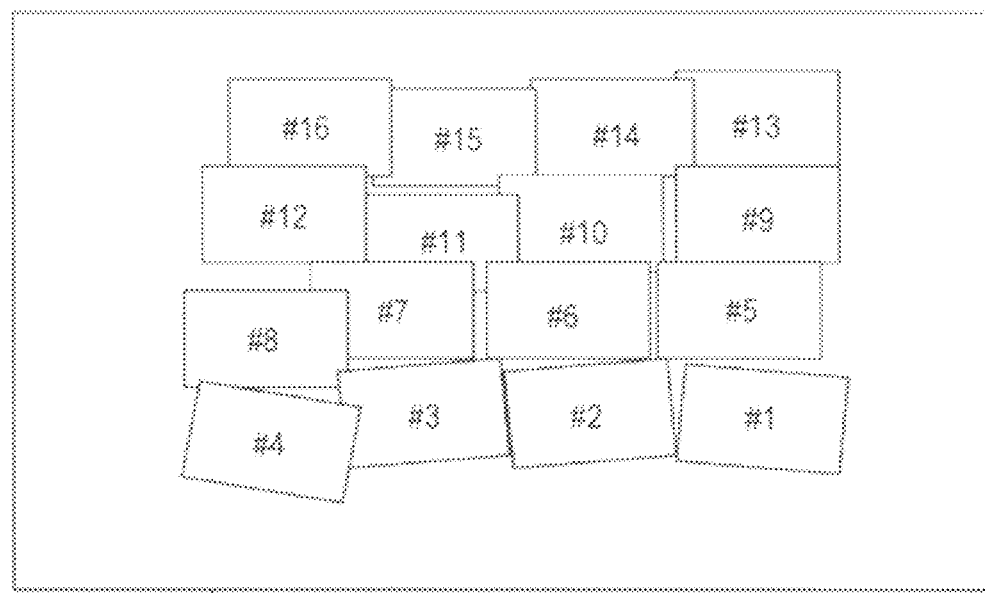
Figure 8A:
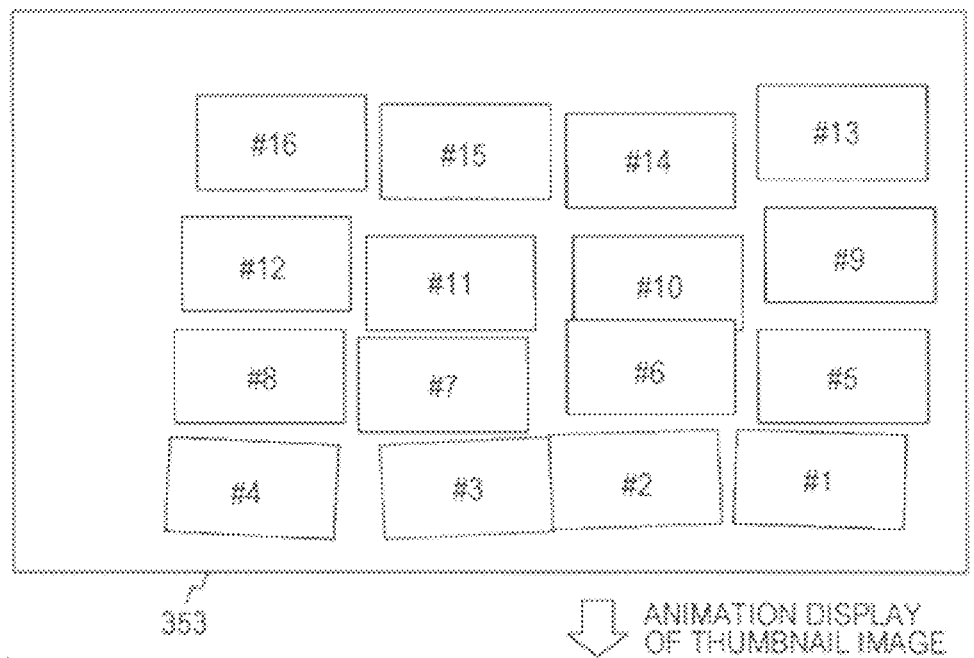
FIGS. 8A and 8B are diagrams illustrating a transition example of a display screen displayed by the display control unit according to the first embodiment of the present disclosure.
Figure 8B:
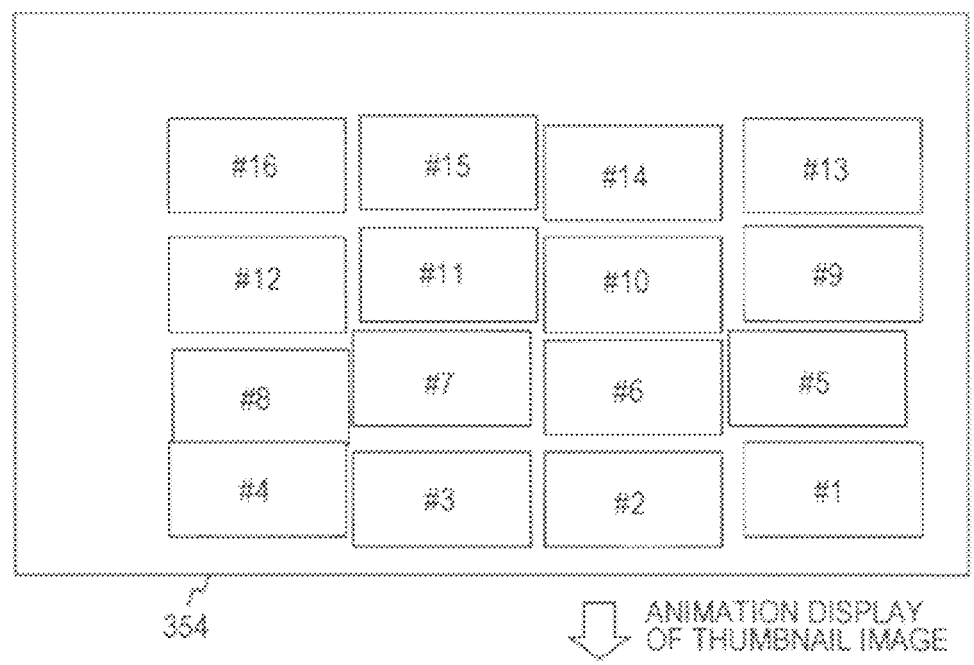

FIG. 6B shows a transition screen 350 displayed by the display control unit 250. The transition screen 350 is a display screen which displayed immediately after the selection operation for selecting the event images 321 is performed in the event display screen 300 shown in FIG. 6A, and is a transition screen which is displayed while the event display screen is switched to the list display screen.

Figure 29A:
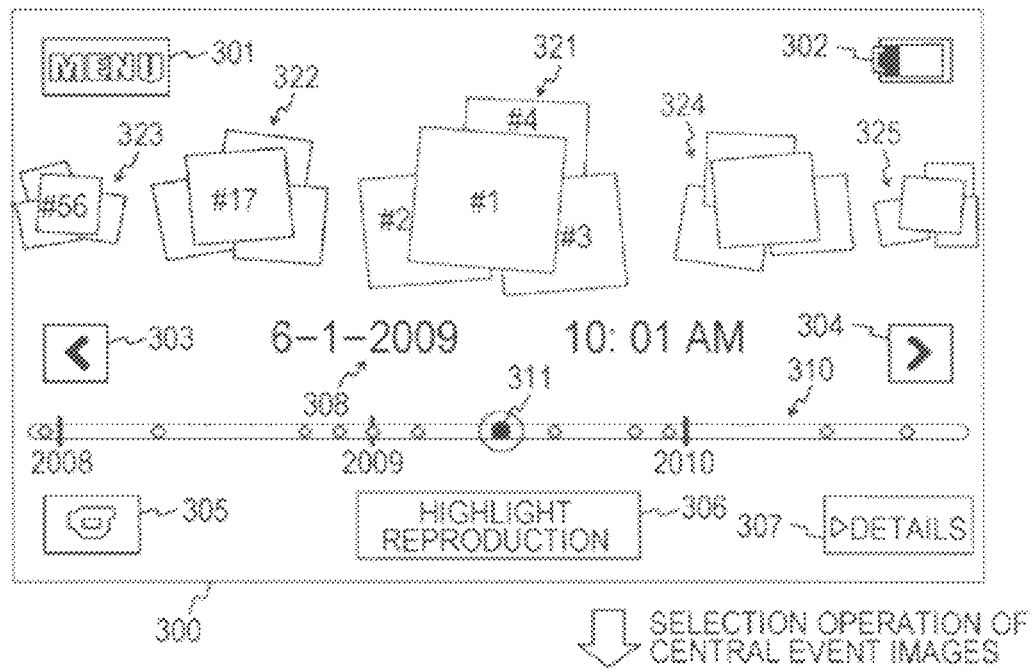
FIGS. 29A and 29B are diagrams illustrating a transition example of a display screen displayed by the display control unit according to a modified example of the first embodiment of the present disclosure.
Figure 29B:
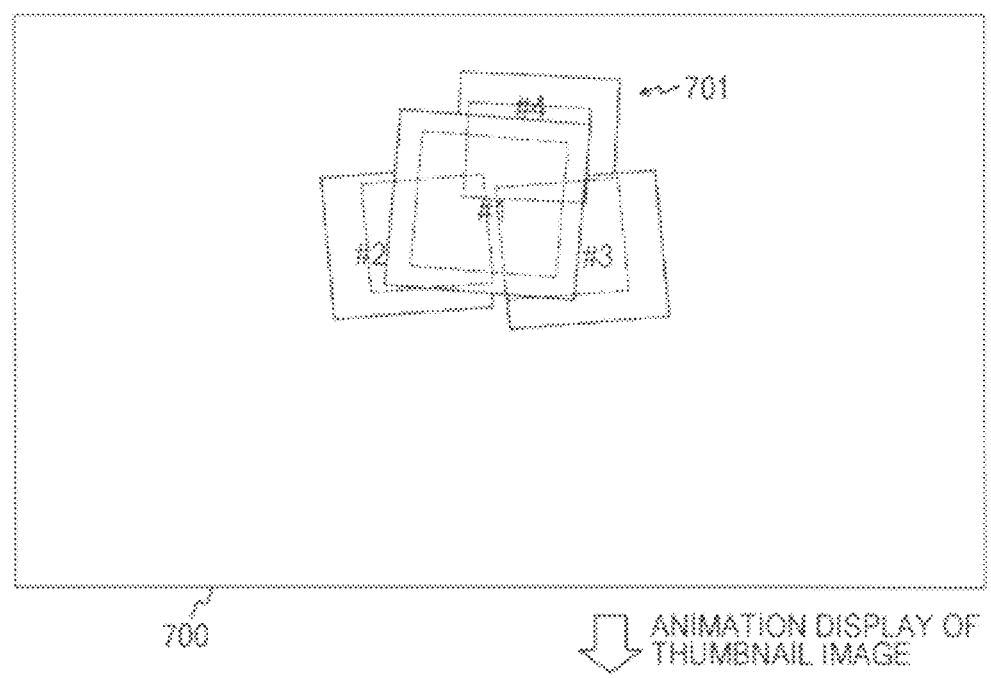

As shown in FIG. 6B, the images other than the event images 321 are removed immediately after the selection operation for selecting the event images 321 is performed. The respective images to be removed may be removed through animation display so as to be moved outside the display screen (so as to be moved substantially in a radial fashion). As such, only the selected event images are displayed such that the other images are removed, and thereby it is possible for a user to easily recognize the selected event images. In addition, the selected event images may be displayed so as to be enlarged and virtually floated. This example is shown in FIGS. 29A and 29B.

FIGS. 7A to 9A show transition screens 351 to 355 displayed by the display control unit 250. In this example, for convenience of description, only the transition screens 351 to 355 are representatively displayed as animation display of the thumbnail images. The transition screens 351 to 355 are transition screens displayed while a transition occurs from the transition screen 350 shown in FIG. 6B to the list display screen 330 shown in FIG. 9B, and are transition images which indicate spreading out to the corresponding positions on the list display screen 330 through the animation display.

In other words, the thumbnail images (#1 to #16) are displayed by animation such that the thumbnail images (#1 to #16) belonging to the event corresponding to the event images 321 displayed on the transition screen 350 shown in FIG. 6B are moved substantially in a radial fashion. In this case, the thumbnail images (#5 to #16) other than the thumbnail images (#1 to #4) synthesized by the superimposition are displayed so as to appear one by one from the rear side of the event images 321.

As such, the display control unit 250 moves the thumbnail images (#1 to #4) displayed at the upper side as the event images 321 from the positions to predetermined positions on the list display screen 330. In addition, the display control unit 250 moves the thumbnail images (#5 to #16) which are not displayed at the upper side as the event images 321 from predetermined positions in the event images 321 to predetermined positions on the list display screen 330. Further, the display control unit 250 displays by animation only the thumbnail images related to the event images 321 which are disposed at the specific position (central position) among the event images 321 to 325 included in the event display screen 300.

Figure 9A:
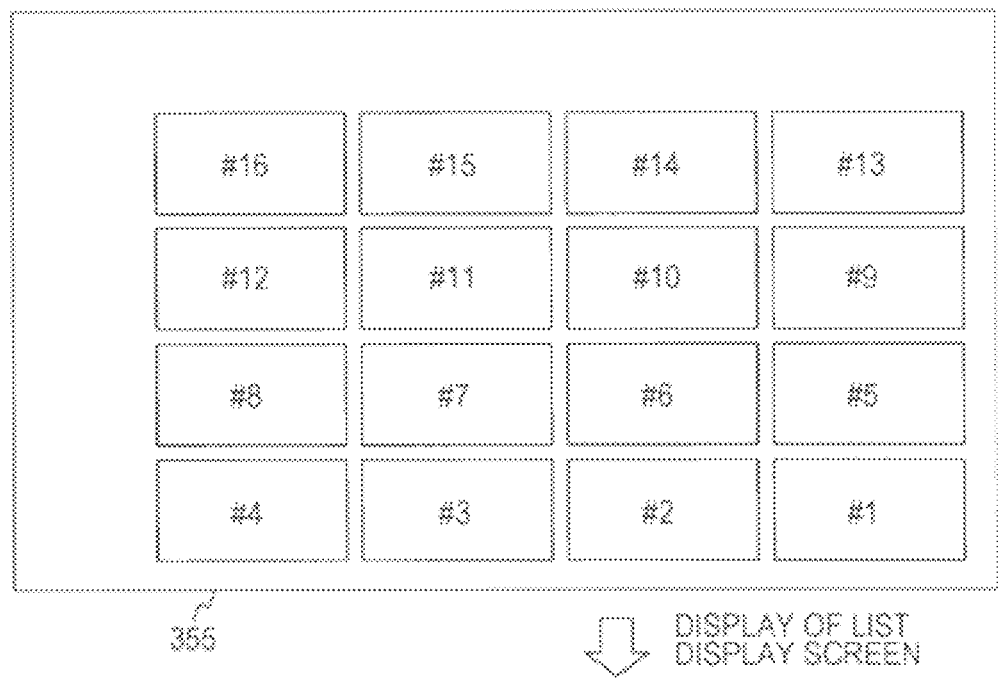
FIGS. 9A and 9B are diagrams illustrating a transition example of a display screen displayed by the display control unit according to the first embodiment of the present disclosure.
Figure 9B:
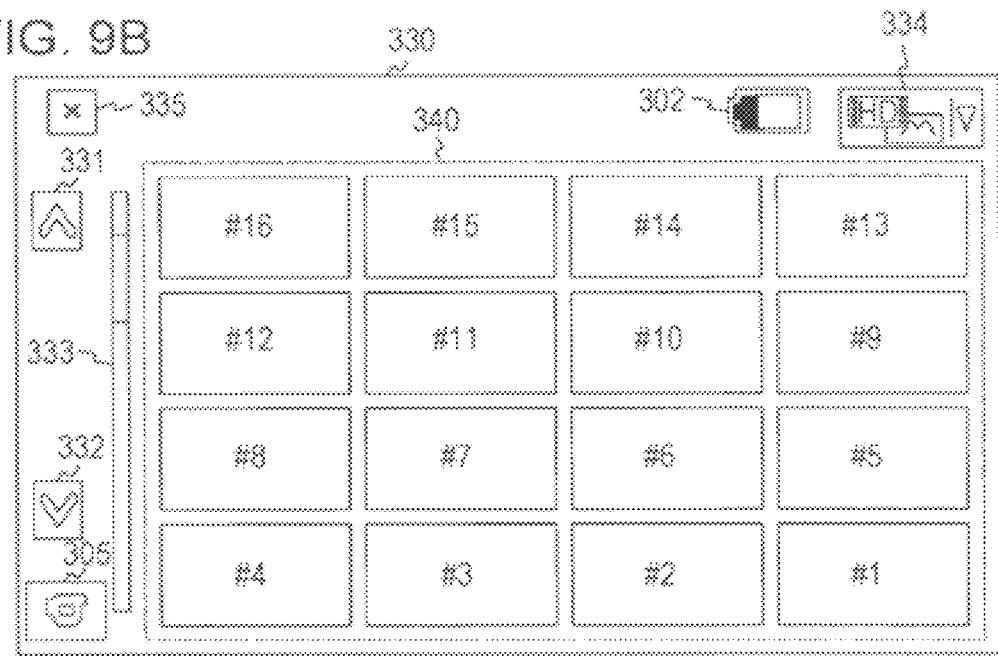

FIG. 9B shows the light blocking shutter 300 displayed by the display control unit 250. The list display screen 330 is the same as that in FIG. 5B. As such, the display control unit 250 displays the list display screen 330 when moving the thumbnail images (#1 to #16) from the predetermined positions on the event display screen 300 to the predetermined positions on the list display screen 330. That is to say, the list display screen 330 where images other than the thumbnail images (#1 to #16) are added is displayed. If the selection operation for selecting a desired thumbnail image is performed in the list display screen 330, a content item corresponding to the selected thumbnail image is reproduced.

Example of Transition from List Display Screen to Event Display Screen

FIGS. 10A to 13B are diagrams illustrating a transition example of the display screen displayed by the display control unit 250 in the first embodiment of the present disclosure. FIGS. 10A to 13B show a transition example when the switching operation from the event display screen to the list display screen is performed.

Figure 10A:
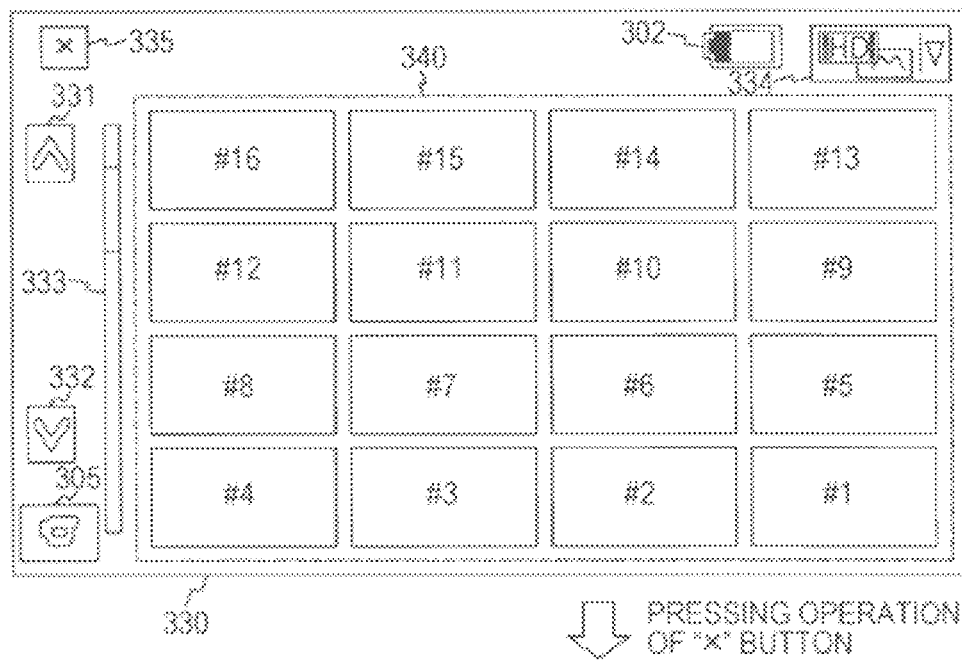
FIGS. 10A and 10B are diagrams illustrating a transition example of a display screen displayed by the display control unit according to the first embodiment of the present disclosure.

FIG. 10A shows the light blocking shutter 300 displayed by the display control unit 250. The list display screen 330 shown in FIG. 10A is the same as that in FIG. 5B. Here, it is assumed that a pressing operation (switching operation) for pressing the "X" button 335 displayed on the list display screen 330 is performed. The pressing operation is a switching operation from the list display screen to the event display screen, and is performed by a user touching the "X" button 335 portion on the display surface of the input and output panel 180. An example of the display screen displayed after the pressing operation is performed is shown in FIG. 10B.

Figure 10B:
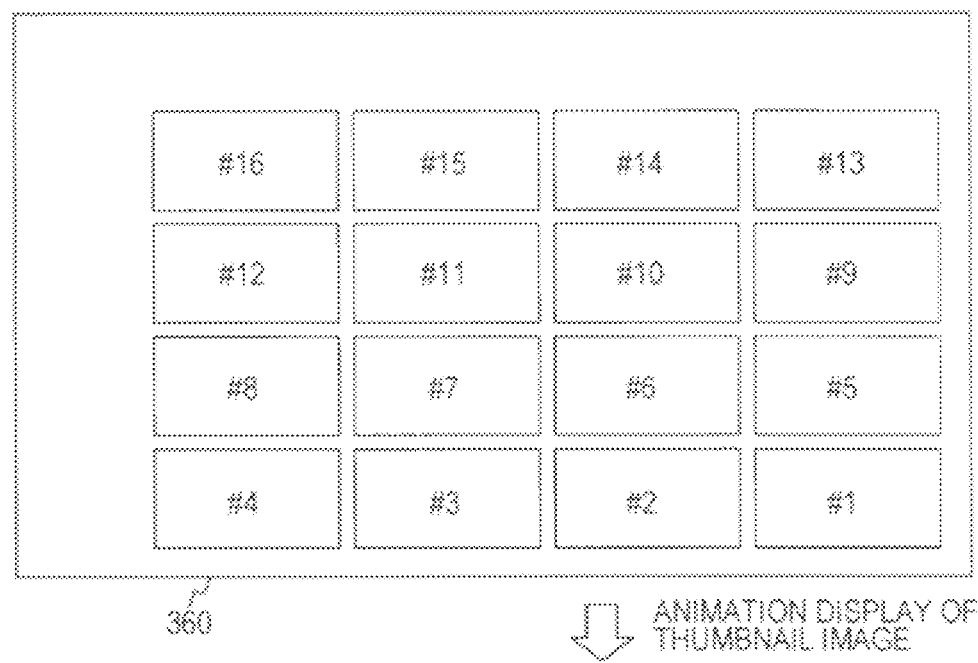
Figure 11A:
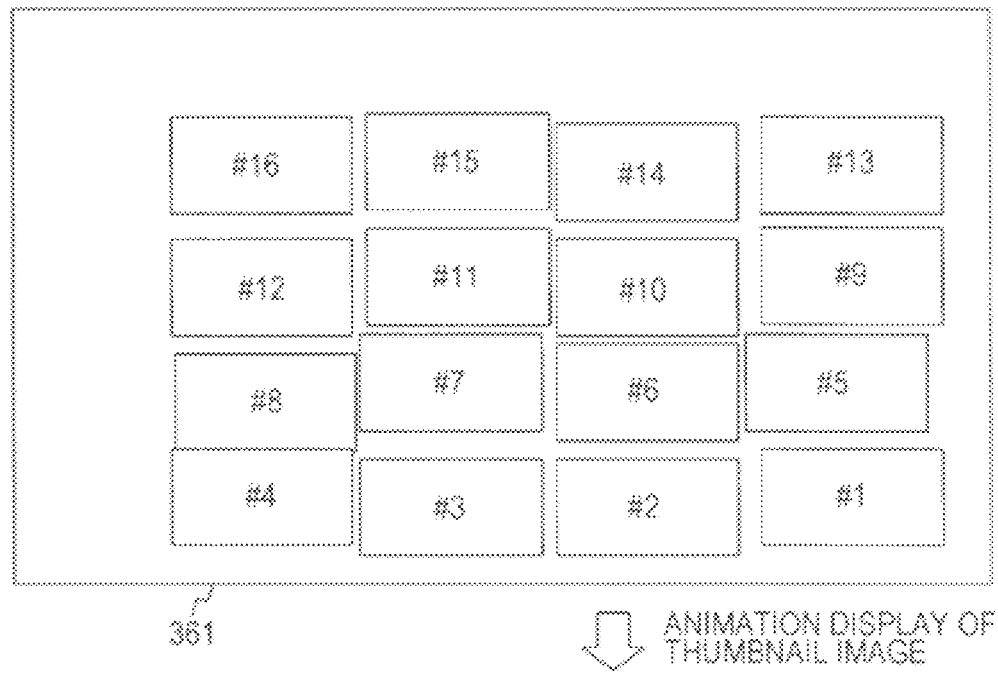
FIGS. 11A and 11B are diagrams illustrating a transition example of a display screen displayed by the display control unit according to the first embodiment of the present disclosure.
Figure 11B:
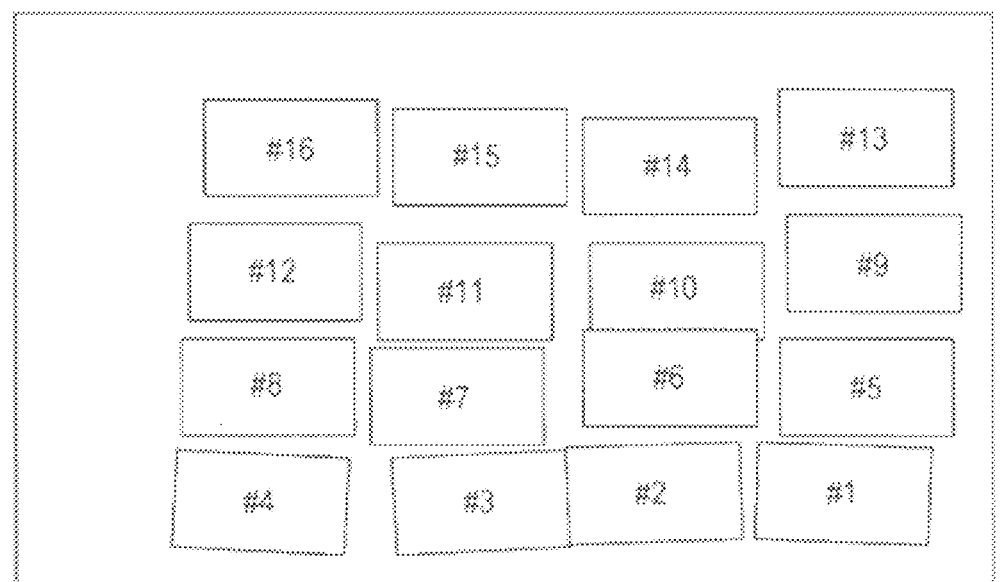
Figure 12A:
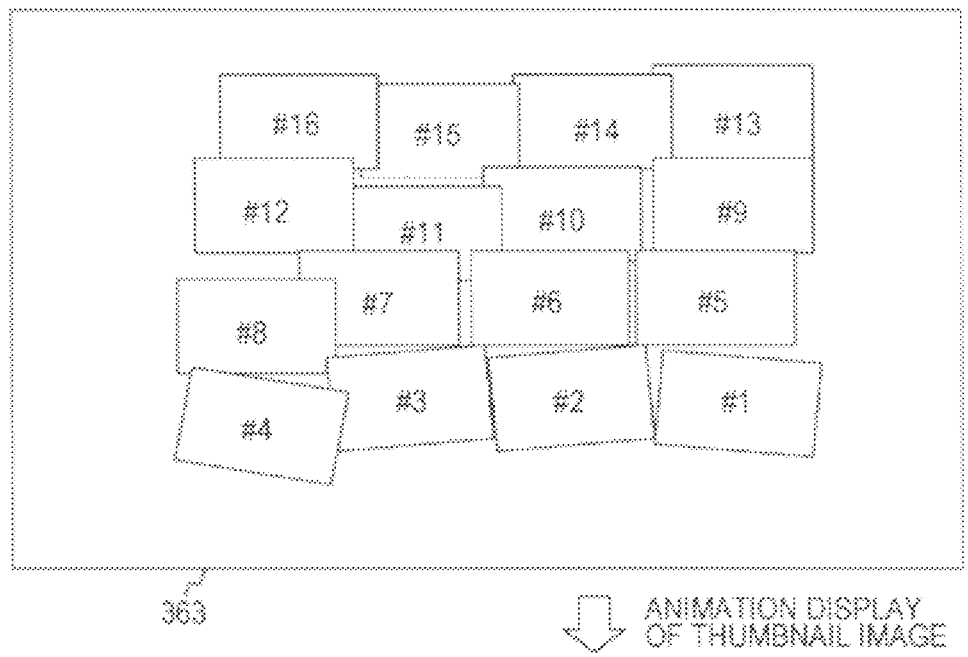
FIGS. 12A and 12B are diagrams illustrating a transition example of a display screen displayed by the display control unit according to the first embodiment of the present disclosure.
Figure 12B:
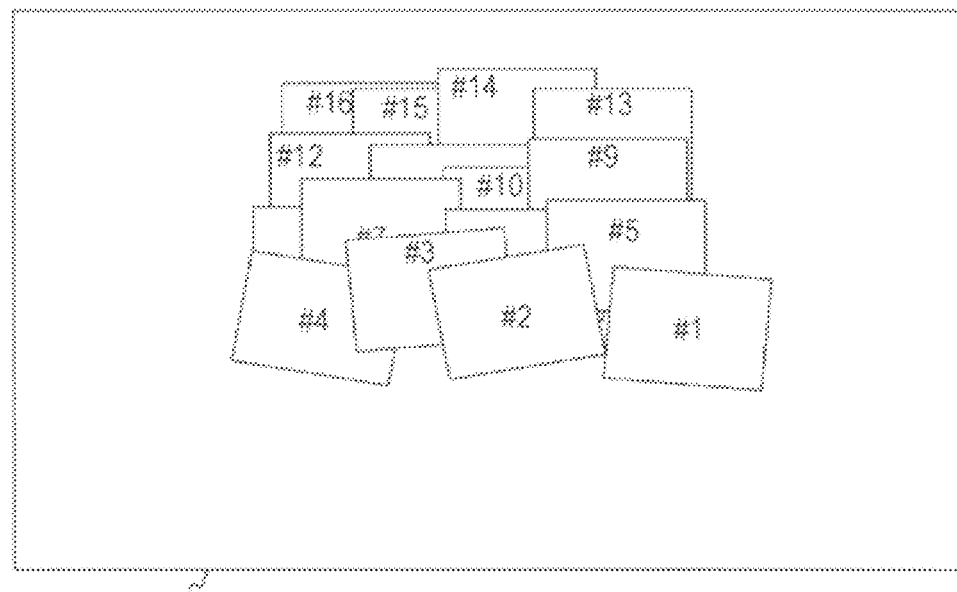

FIG. 10B shows a display screen 360 displayed by the display control unit 250. The transition screen 360 is a display screen displayed immediately after the pressing operation for pressing the "X" button 335 on the list display screen 330 shown in FIG. 10A is performed, and is a transition screen displayed while the list display screen is switched to the event display screen.

As shown in FIG. 10B, immediately after the pressing operation for pressing the "X" button 335 is performed, the images other than the thumbnail images (#1 to #16) included in the thumbnail image display region 340 are removed. In a similar to the example shown in FIG. 6B, the respective images to be removed may be removed through animation display so as to be moved outside the display screen (so as to be moved substantially in a radial fashion). As such, only the thumbnail images which are targets of the animation process are displayed such that the other images are removed, and thereby it is possible for a user to easily recognize the thumbnail images which are targets of the animation process.

FIGS. 11A to 13A show transition screens 361 to 365 displayed by the display control unit 250. In this example, for convenience of description, only the transition screens 361 to 365 are representatively displayed as animation display of the thumbnail images. The transition screens 361 to 365 are transition screens displayed while a transition occurs from the transition screen 360 shown in FIG. 10B to the event display screen 300 shown in FIG. 13B, and are transition images which indicate collection up to the corresponding positions on the event display screen 300 through the animation.

In other words, the thumbnail images (#1 to #16) are displayed by animation such that the thumbnail images (#1 to #16) displayed on the transition screen 360 shown in FIG. 10B are moved to the disposed position (central position) of the event images. In this case, the thumbnail images (#5 to #16) other than the thumbnail images (#1 to #4) synthesized by superimposition are displayed by animation so as to be hidden on the rear side of the event images 321.

Figure 13A:
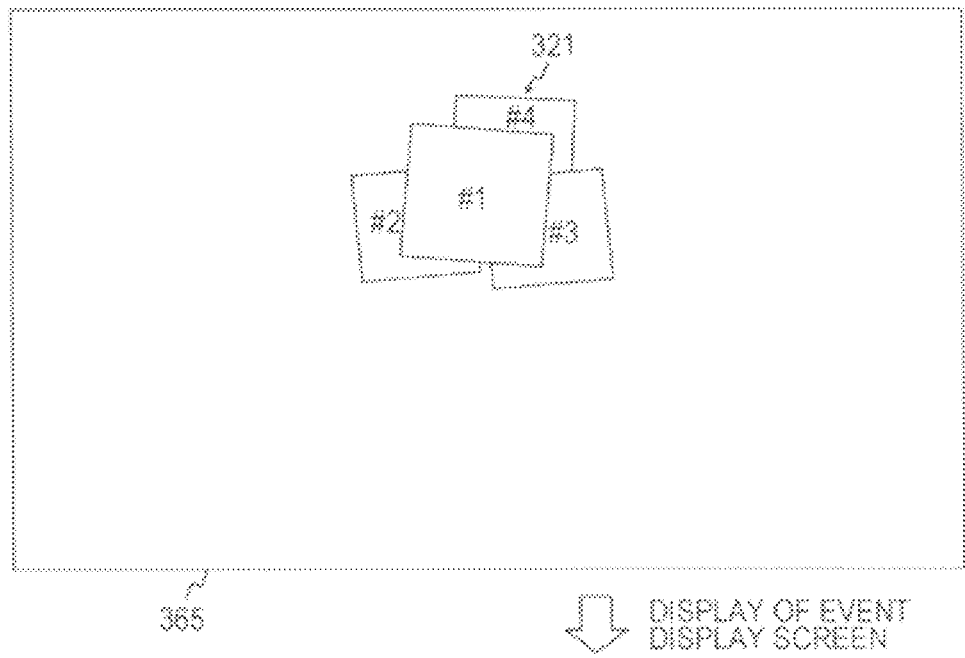
FIGS. 13A and 13B are diagrams illustrating a transition example of a display screen displayed by the display control unit according to the first embodiment of the present disclosure.
Figure 13B:
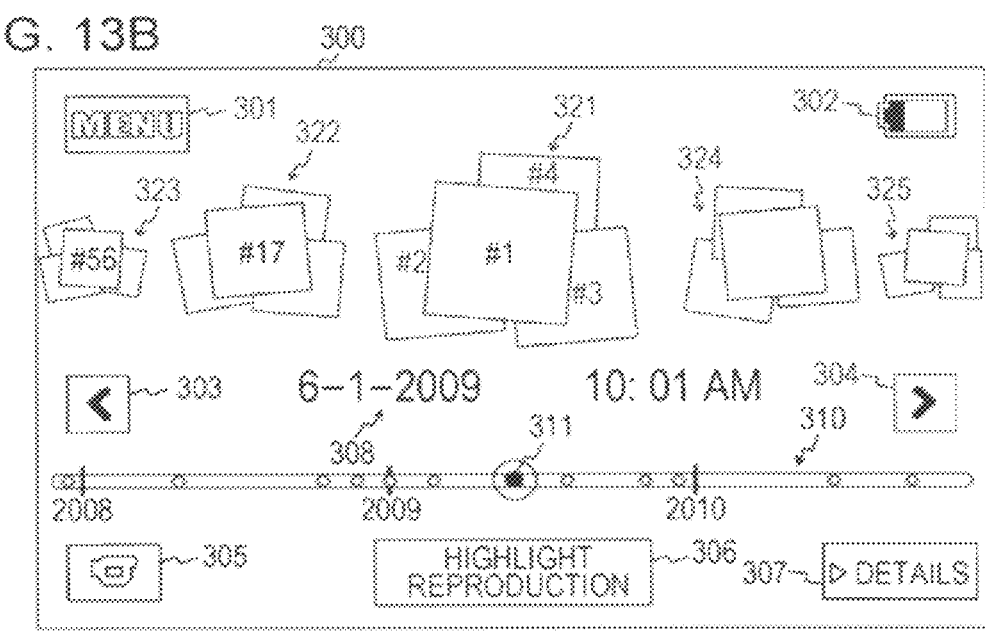

FIG. 13B shows the event display screen 300 displayed by the display control unit 250. The event display screen 300 is the same as the event display screen 300 shown in FIG. 5A. As such, the display control unit 250 displays the event display screen 300 when moving the thumbnail images (#1 to #16) from the predetermined positions on the list display screen 330 to the predetermined positions on the event display screen 300. That is to say, the event display screen 300 where images other than the thumbnail images (#1 to #16) are added is displayed. If a movement operation for moving the event images is performed in the event display screen 300, the event images are moved according to the movement operation.

Transition Example of Thumbnail Image which is Movement Target

FIGS. 14A to 15B are diagrams illustrating a relationship between the display screen of the display unit 181 and a thumbnail image which is a movement target on the display screen according to the first embodiment of the present disclosure. In FIGS. 14A to 15B, for example, if the display screen of the display unit 181 is a rectangular shape, a case will be described in which a thumbnail image is moved on xy coordinates where the top left corner is set to the origin (0, 0), the transverse axis is an x axis, and the longitudinal axis is a y axis. In addition, in FIGS. 14A to 15B, for example, a case will be described in which a thumbnail image capable of being overlapped on the uppermost part among the thumbnail images forming the event images displayed on the event display screen is moved.

Figure 14A:
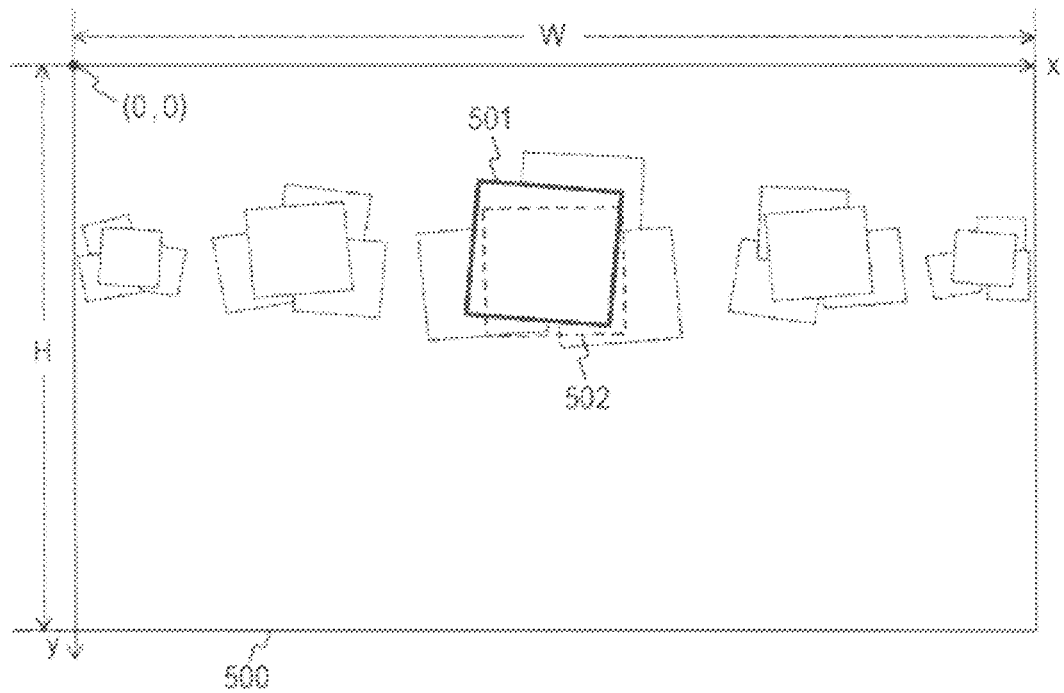
FIGS. 14A and 14B are diagrams illustrating a relationship between a display screen of a display unit and a thumbnail image which is a movement target on the display screen according to the first embodiment of the present disclosure.

FIG. 14A shows a rectangular shape 500 corresponding to the event display screen. In the rectangular shape 500, the respective event images disposed on the event display screen (for example, the event display screen 300 shown in FIG. 5A) are denoted by the dotted lines (however, only a rectangular shape 501 is denoted by the solid line). Further, a dotted rectangular shape 502 is a rectangular shape indicating a reference position when a thumbnail image which is not synthesized on the upper side, among the thumbnail images of the content items belonging to the event related to the event images disposed at the center.

Figure 14B:
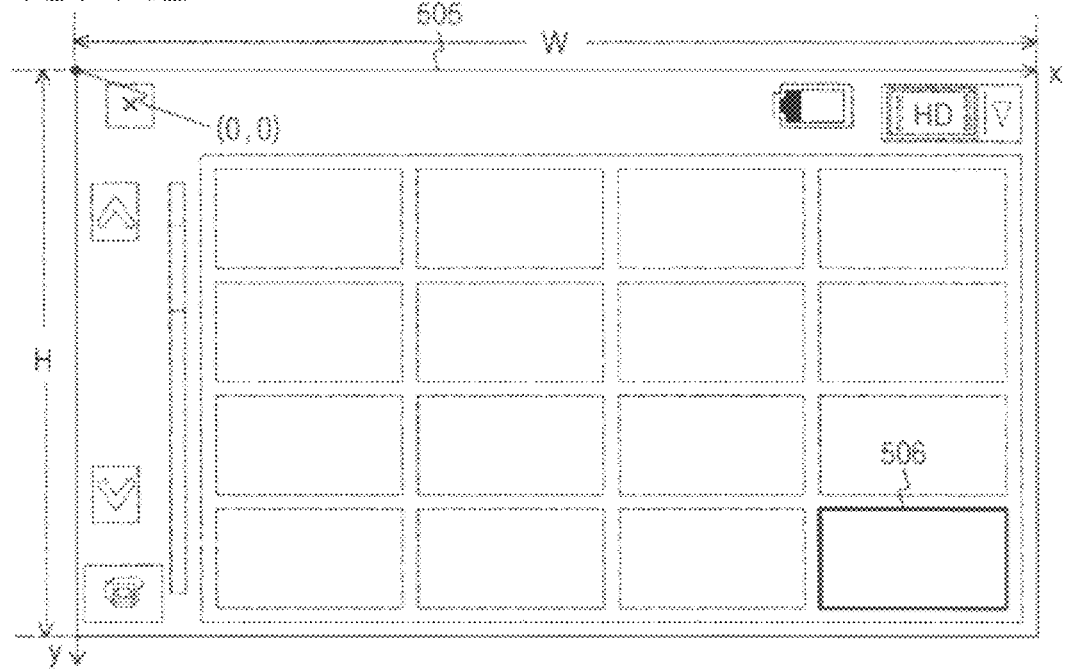

FIG. 14B shows a rectangular shape 505 corresponding to the list display screen. In the rectangular shape 505, the thumbnail images, the arrow buttons, the scroll bar, and the like disposed on the list display screen (for example, the list display screen 330 shown in FIG. 5B) are denoted by the dotted lines (however, only a rectangular shape 506 is denoted by the solid line). Here, the length of the rectangular shapes 500 and 505 in the x axis direction is W, and the length thereof in the y axis direction is H.

Figure 15A:
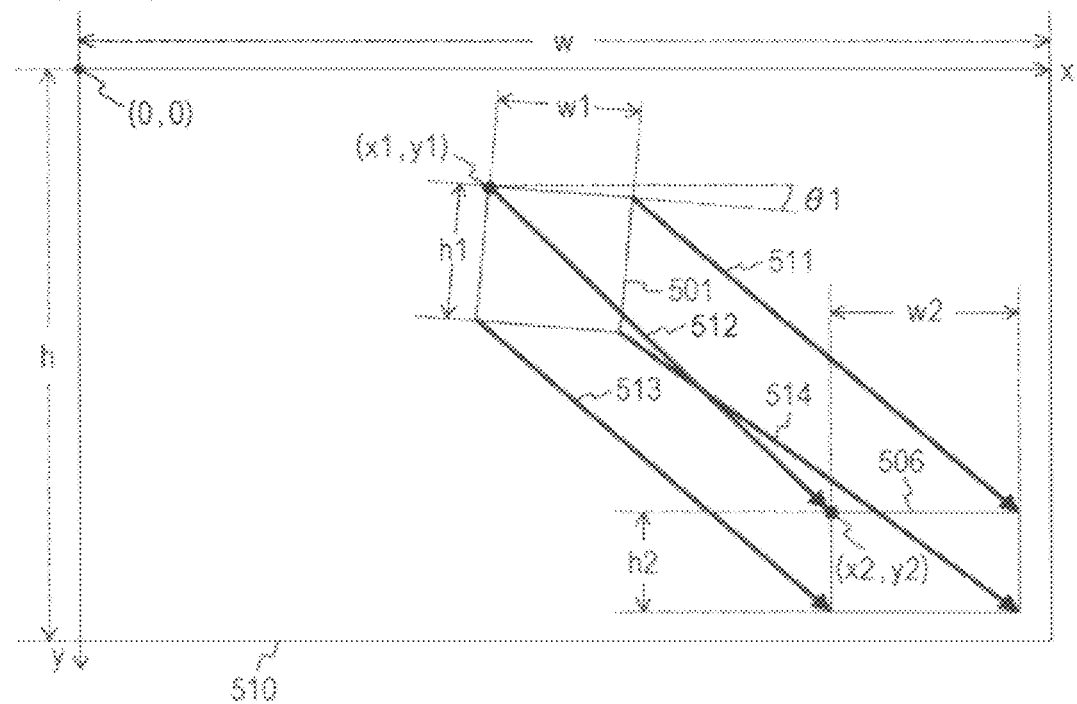
FIGS. 15A and 15B are diagrams illustrating a relationship between a display screen of a display unit and a thumbnail image which is a movement target on the display screen according to the first embodiment of the present disclosure.
Figure 15B:
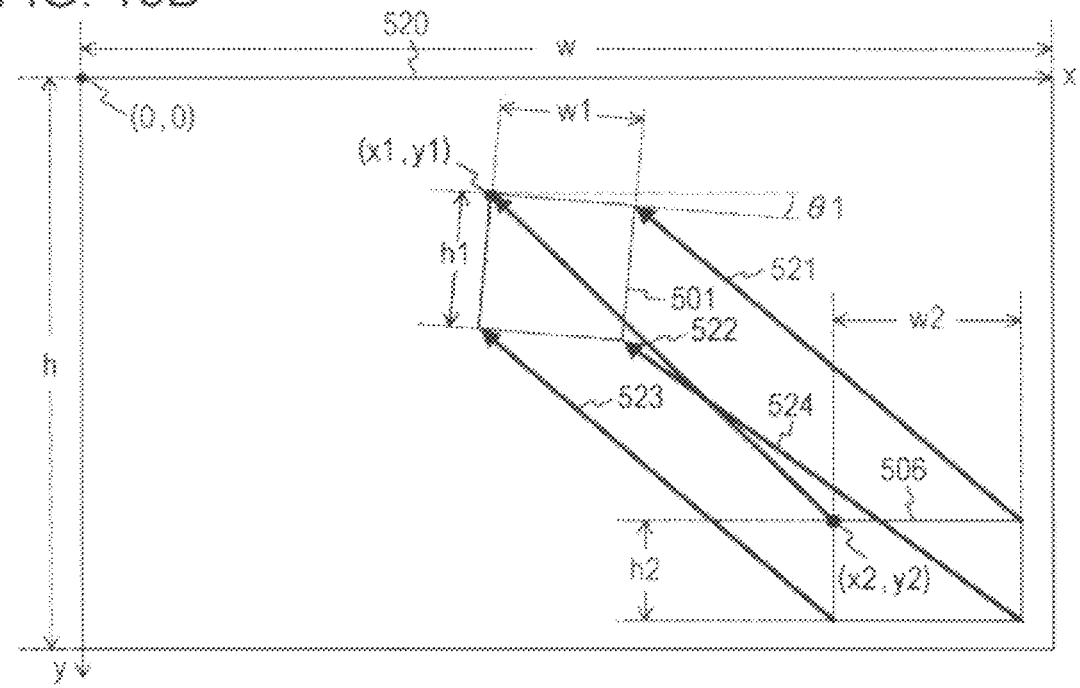

In FIGS. 15A and 15B, a case where the thumbnail image disposed at the position of the rectangular shape 501 is moved to the position of the rectangular shape 506 and a case where the thumbnail image disposed at the position of the rectangular shape 506 is moved to the position of the rectangular shape 501 will be described as an example.

FIG. 15A schematically shows an example of transition of the thumbnail image in the case where the thumbnail image disposed at the position of the rectangular shape 501 is moved to the position of the rectangular shape 506.

FIG. 15A shows the rectangular shape 510 when the dotted lines denoting the thumbnail images and the like are removed in the rectangular shapes 500 and 505 shown in FIGS. 14A and 14B, and only the rectangular shapes 501 and 506 are disposed. In the rectangular shape 510 shown in FIG. 15A, it is assumed that a point of the top left corner of the rectangular shape 501 is the coordinate (x1, y1), a side of the rectangular shape 501 corresponding to the x axis direction is w1, a side thereof corresponding to the y axis direction is h1, and a rotation angle of the rectangular shape 501 with respect to the horizontal direction is θ1. In addition, it is assumed that a point of the top left corner of the rectangular shape 506 is the coordinate (x2, y2), a side of the rectangular shape 506 corresponding to the x axis direction is w2, a side thereof corresponding to the y axis direction is h2, and a rotation angle of the rectangular shape 506 with respect to the horizontal direction is 0 degree. Further, in FIG. 15A, as movement trajectories from the rectangular shape 501 to the rectangular shape 506, movement trajectories of the respective vertices of the rectangular shape are denoted by arrows 511 to 514 of heavy lines.

First, a case will be described in which the position of the rectangular shape 501 is used as a reference position, and the animation process is performed by sequentially moving the thumbnail image starting from the reference position. Here, the point of the top left corner of the rectangular shape corresponding to the thumbnail image which is a target of the animation target is set to the coordinates (x, y), the length of a side of the rectangular shape corresponding to the x axis direction is set to w, the length of a side thereof corresponding to the y axis direction is set to h, and a rotation angle thereof with respect to the horizontal direction is set to θ. In this case, the position, the size, and the rotation angle of the thumbnail image which is a target of the animation process are obtained by the following Equations 1 to 5.

$$x = x1 + (x2 - x1) \times a \quad \text{Equation 1}$$

$$y = y1 + (y2 - y1) \times a \quad \text{Equation 2}$$

$$w = w1 + (w2 - w1) \times a \quad \text{Equation 3}$$

$$h = h1 + (h2 - h1) \times a \quad \text{Equation 4}$$

$$\theta = \theta1 - \theta1 \times a \quad \text{Equation 5}$$

Figure 16A:
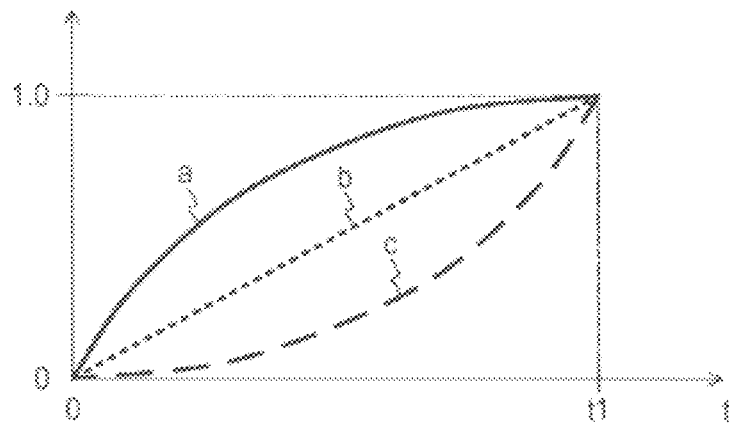
FIGS. 16A and 16B are diagrams illustrating a relationship between parameters used when a thumbnail image is moved by the display control unit and a time axis according to the first embodiment of the present disclosure.

Here, a is a parameter which varies with the passage of time, and, for example, the parameter a is sequentially determined depending on the curve on the graph shown in FIG. 16A.

Here, in the first embodiment of the present disclosure, an example will be described in which the respective thumbnail images are moved such that the rates of change of the movement speed per unit time of the respective thumbnail images adjacent in a specific direction (for example, the horizontal direction and the vertical direction) on the list display screen is different from each other. For this reason, different parameters are used for the respective thumbnail images adjacent in the specific direction on the list display screen. For example, one of the parameters a, b and c shown in FIG. 16A may be used. That is to say, the rates of change of the movement speed per unit time of the respective thumbnail images can be made to be different from each other by using the parameters b and c instead of the parameter a in Equations 1 to 5. In addition, relationships between the positions of the thumbnail images (positions on the display surface) and the parameters a, b and c used in the movement are shown in FIG. 16B.

Figure 16B:
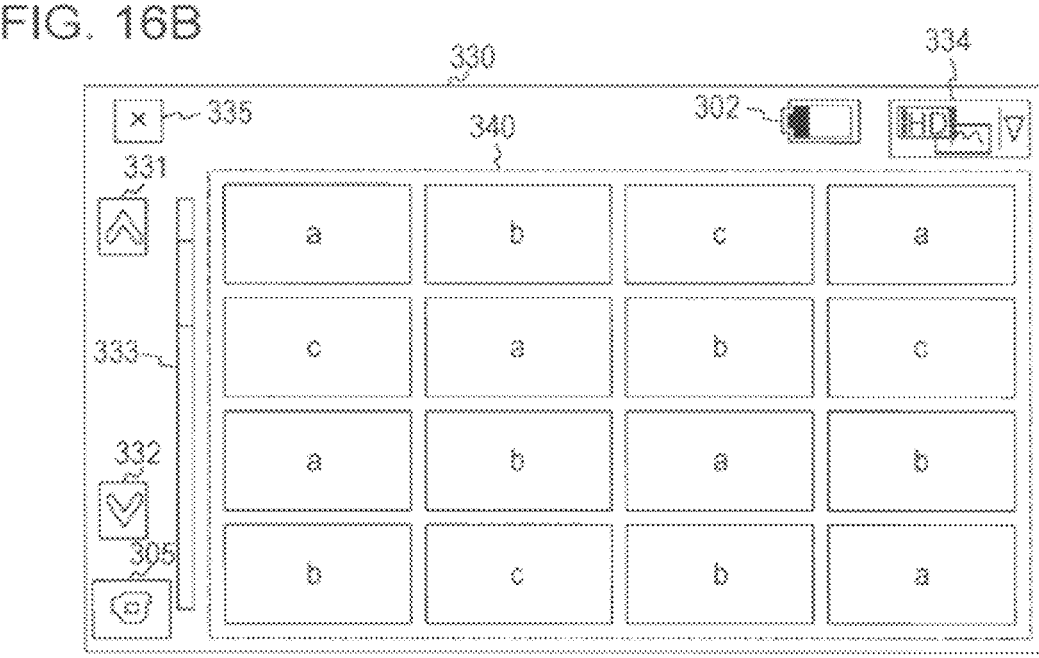
Figure 18A:
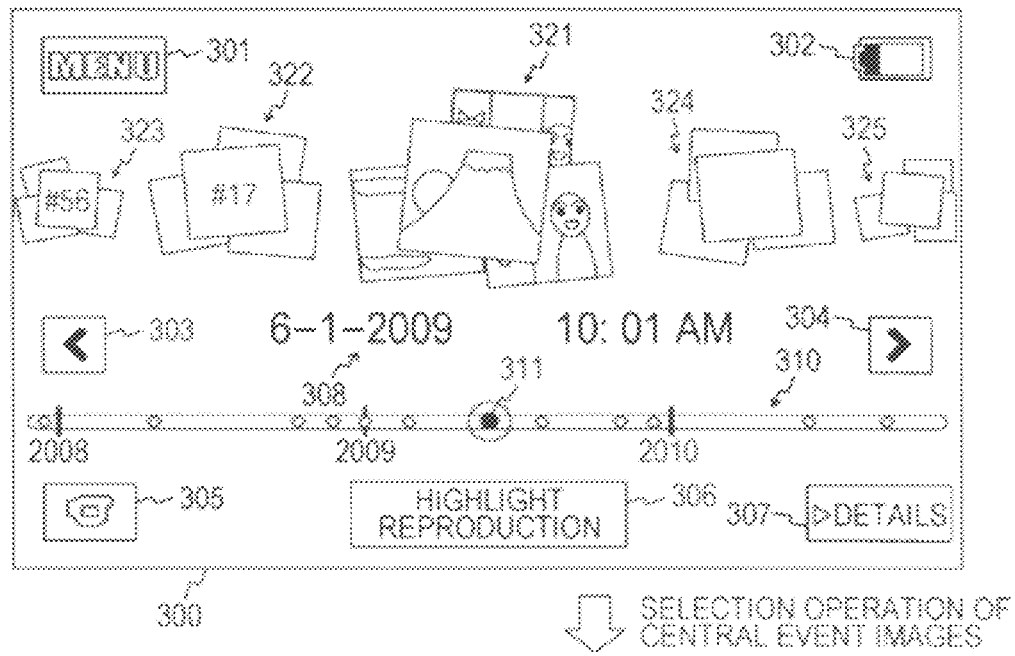
FIGS. 18A and 18B are diagrams illustrating a transition example of a display screen displayed by the display control unit according to the first embodiment of the present disclosure.
Figure 18B:
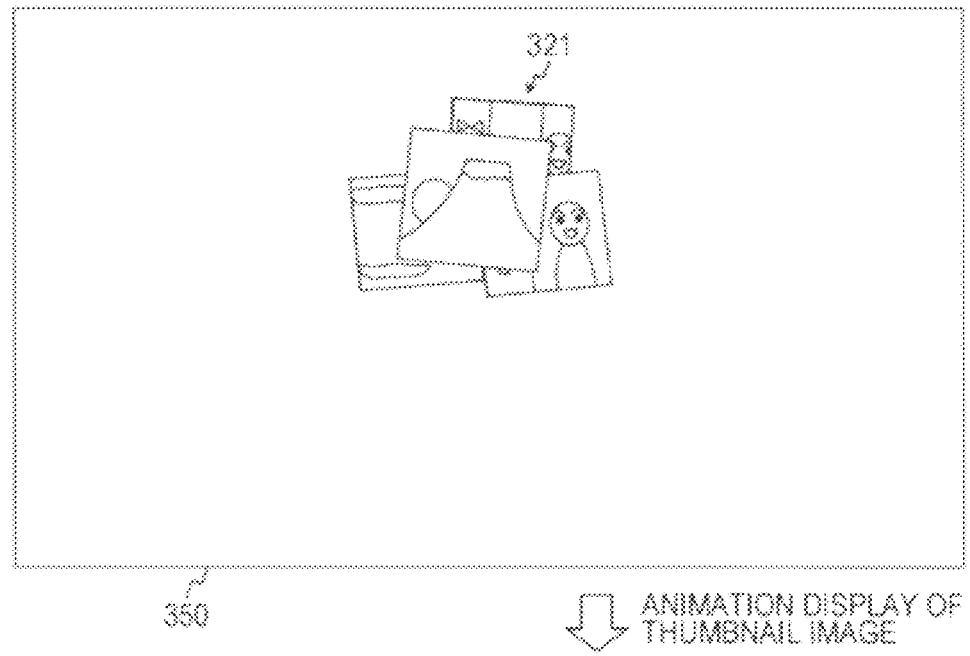
Figure 19A:
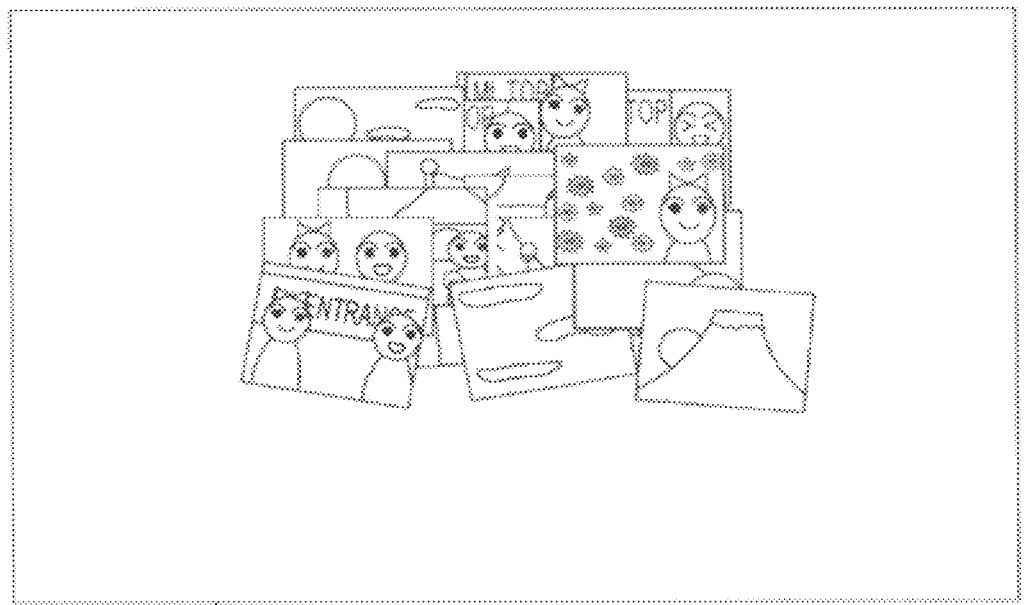
FIGS. 19A and 19B are diagrams illustrating a transition example of a display screen displayed by the display control unit according to the first embodiment of the present disclosure.
Figure 19B:
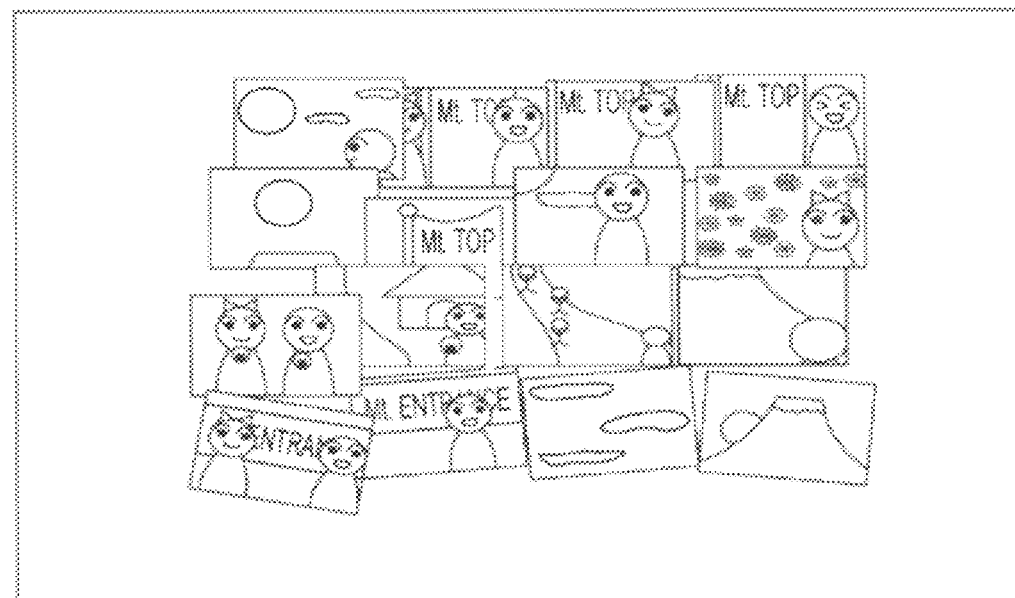
Figure 20A:
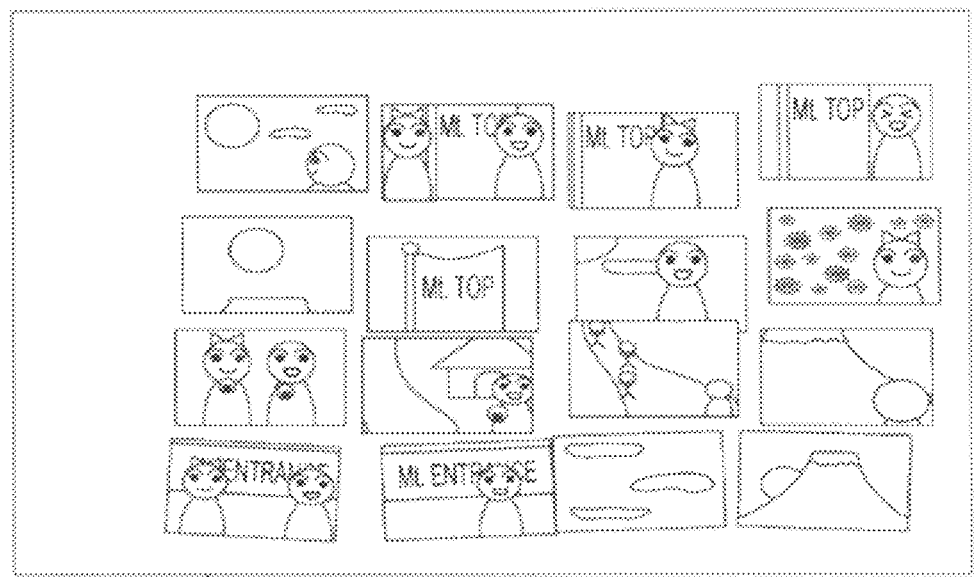
FIGS. 20A and 20B are diagrams illustrating a transition example of a display screen displayed by the display control unit according to the first embodiment of the present disclosure.
Figure 20B:
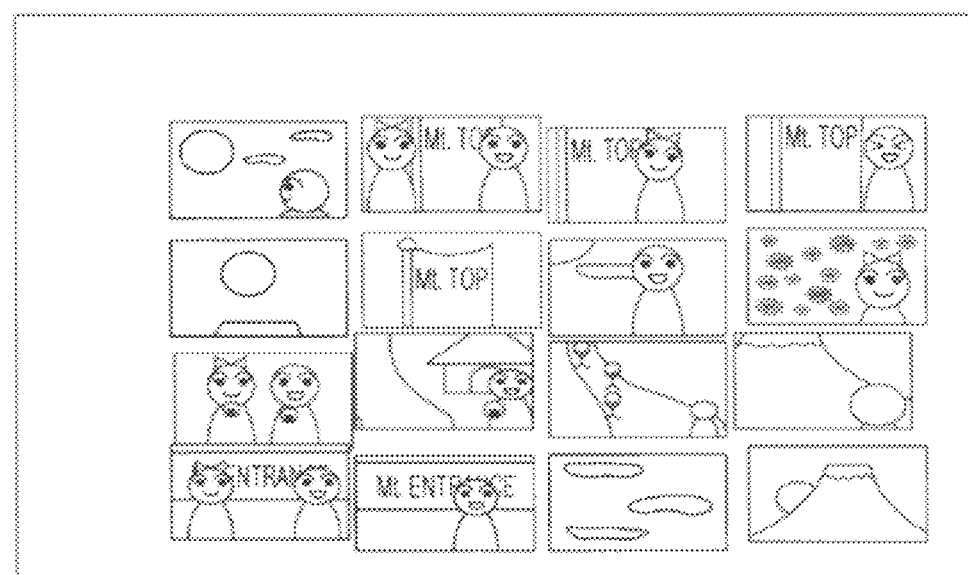
Figure 21A:
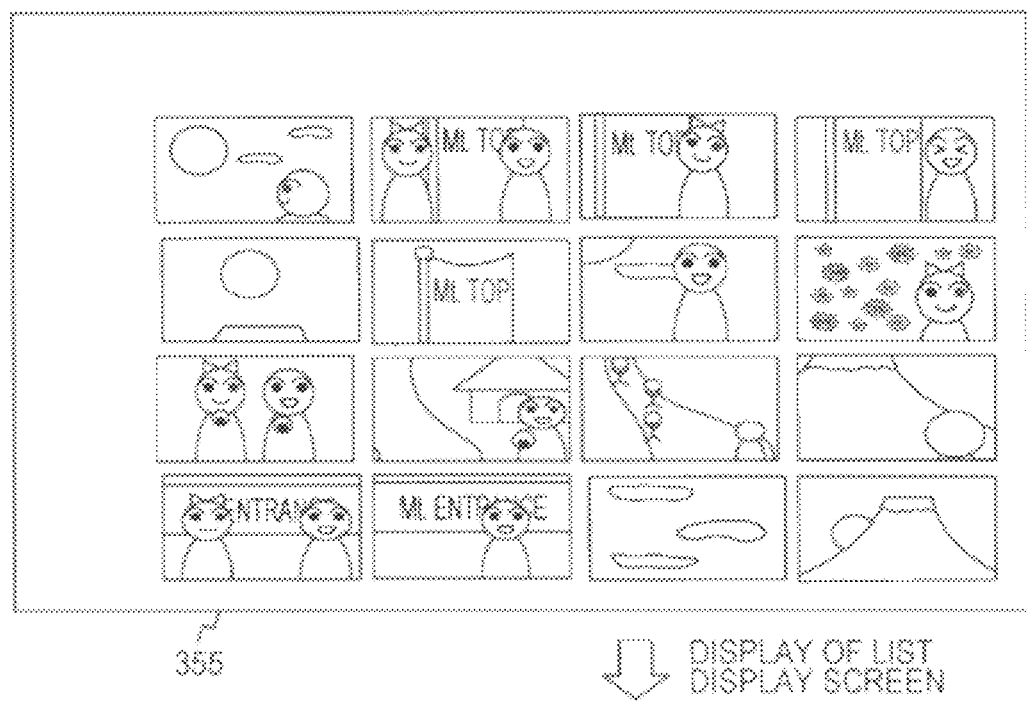
FIGS. 21A and 21B are diagrams illustrating a transition example of a display screen displayed by the display control unit according to the first embodiment of the present disclosure.
Figure 21B:
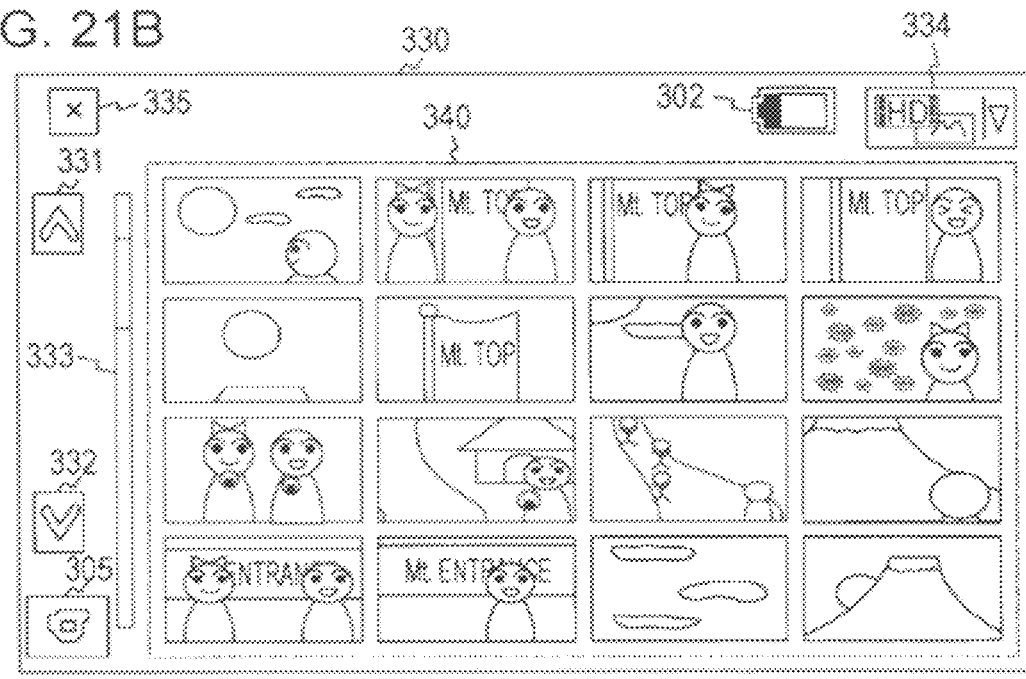
Figure 22A:
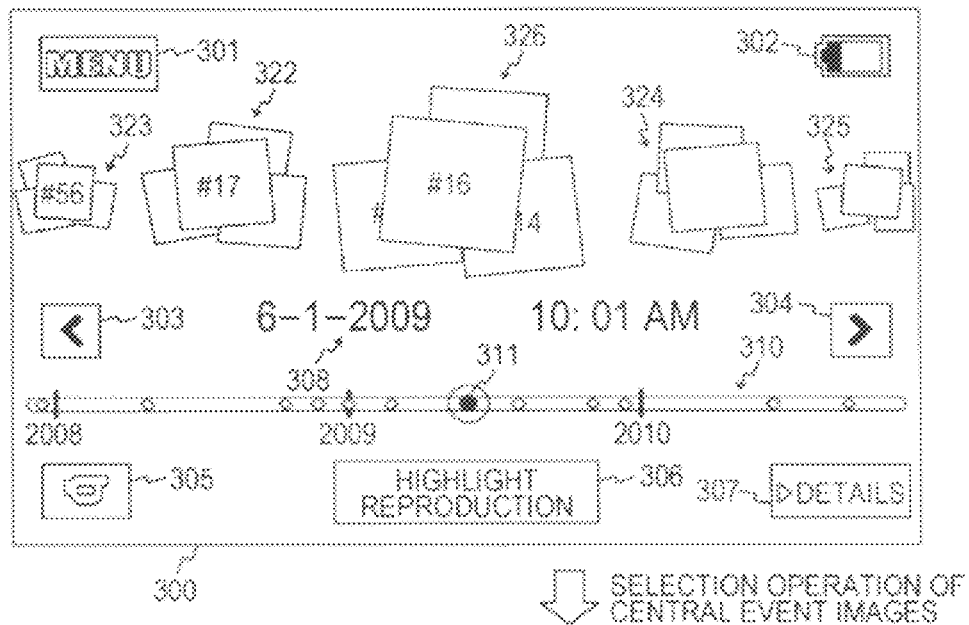
FIGS. 22A and 22B are diagrams illustrating a transition example of a display screen displayed by the display control unit according to the first embodiment of the present disclosure.
Figure 22B:
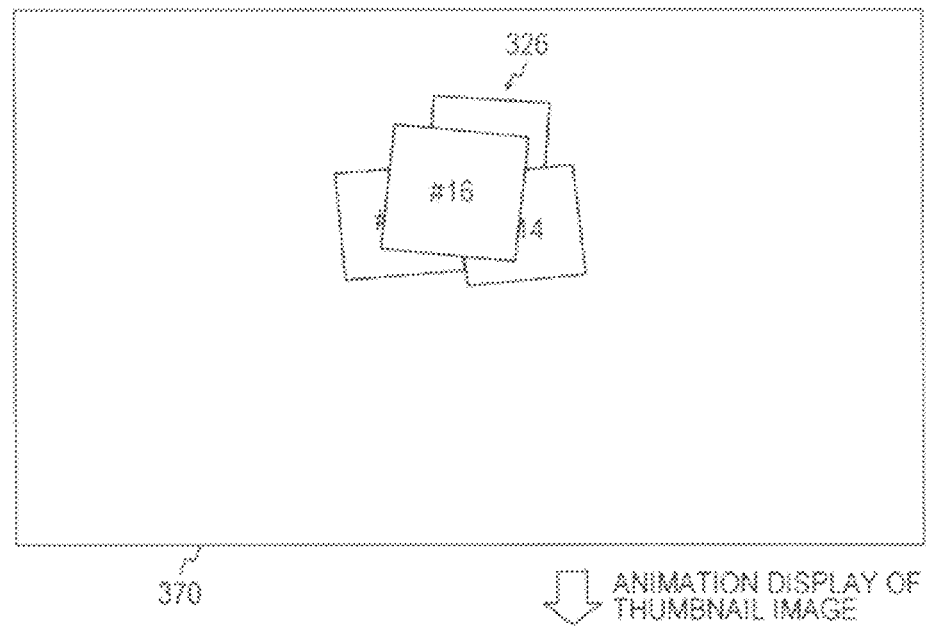
Figure 23A:
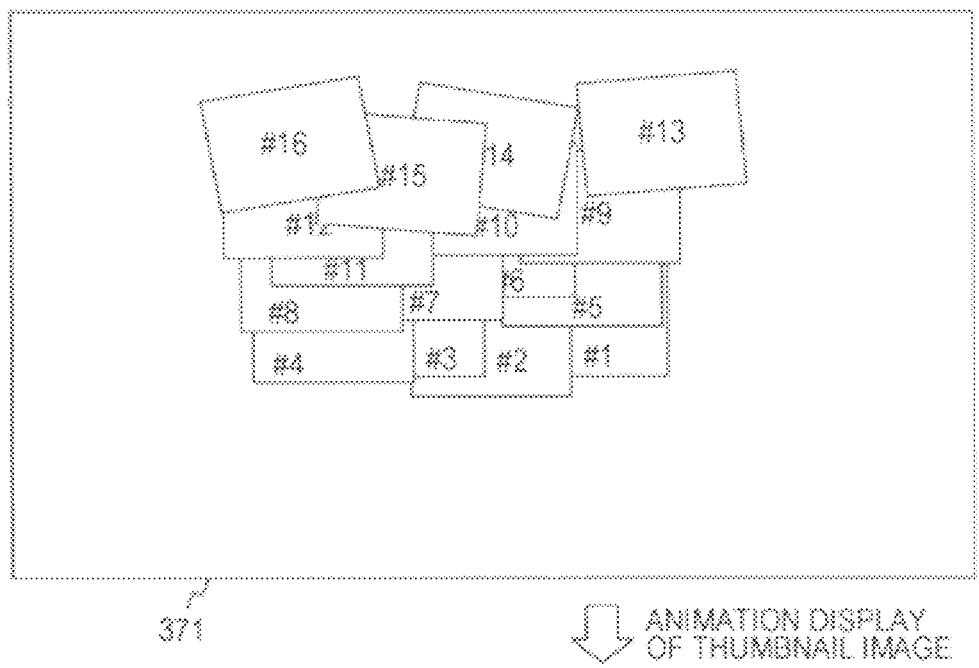
FIGS. 23A and 23B are diagrams illustrating a transition example of a display screen displayed by the display control unit according to the first embodiment of the present disclosure.
Figure 23B:
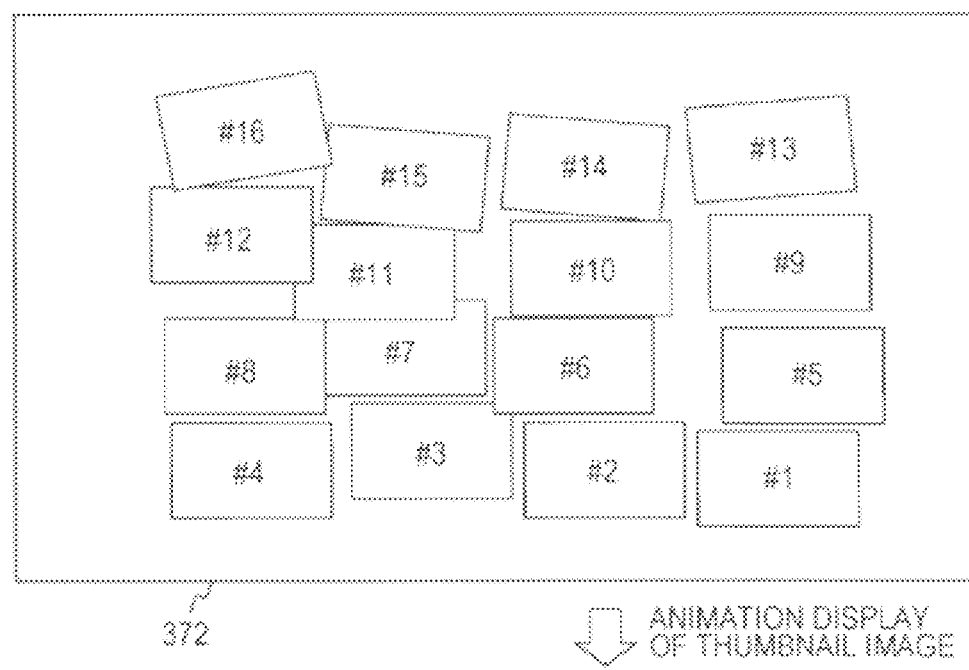
Figure 24A:
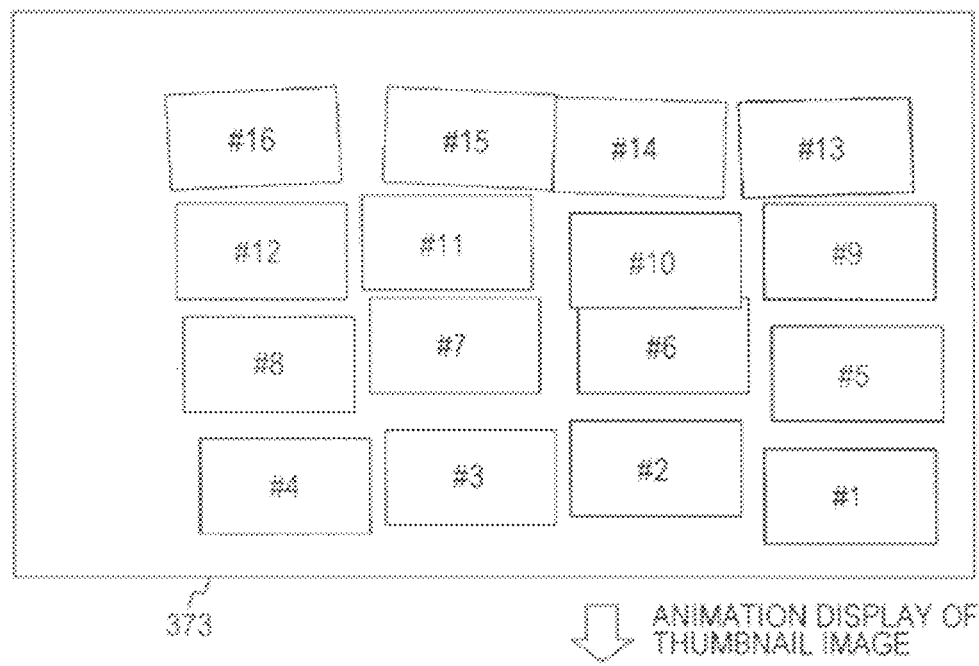
FIGS. 24A and 24B are diagrams illustrating a transition example of a display screen displayed by the display control unit according to the first embodiment of the present disclosure.
Figure 24B:
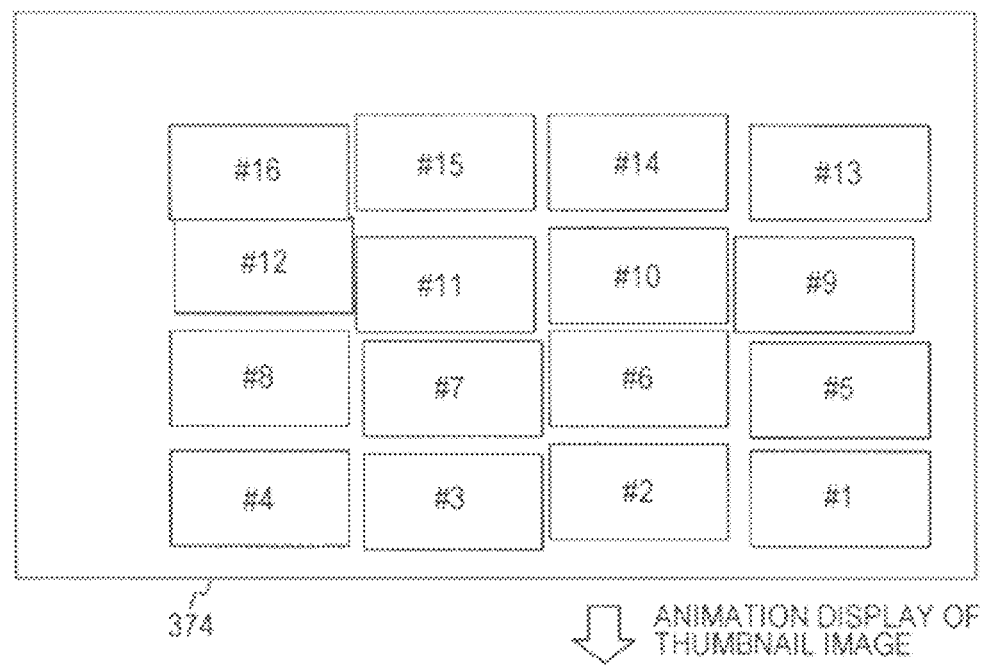
Figure 25A:
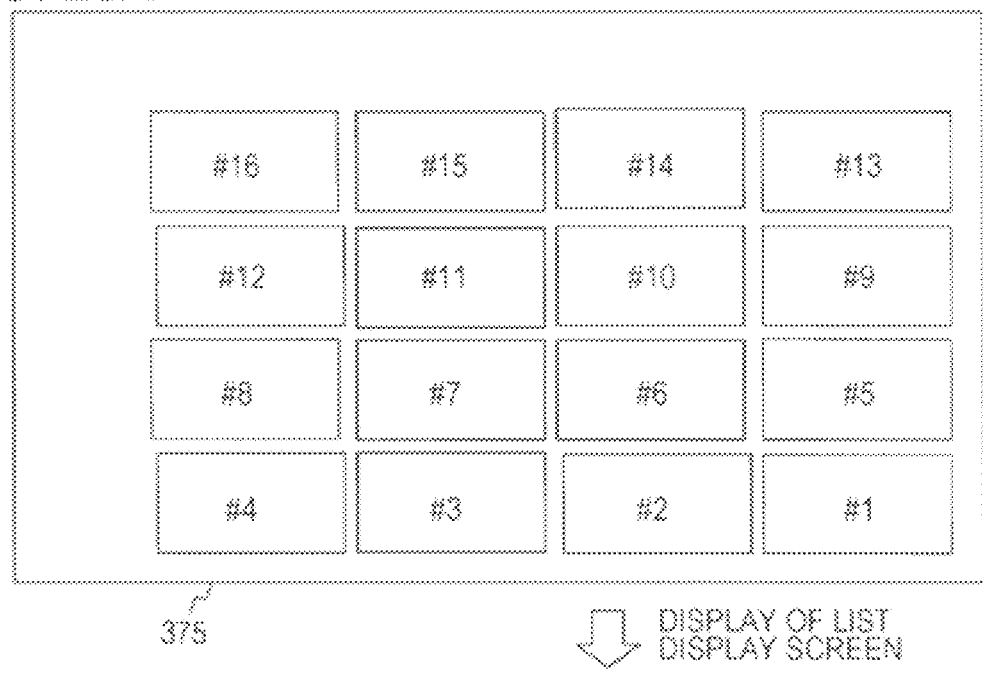
FIGS. 25A and 25B are diagrams illustrating a transition example of a display screen displayed by the display control unit according to the first embodiment of the present disclosure.
Figure 25B:
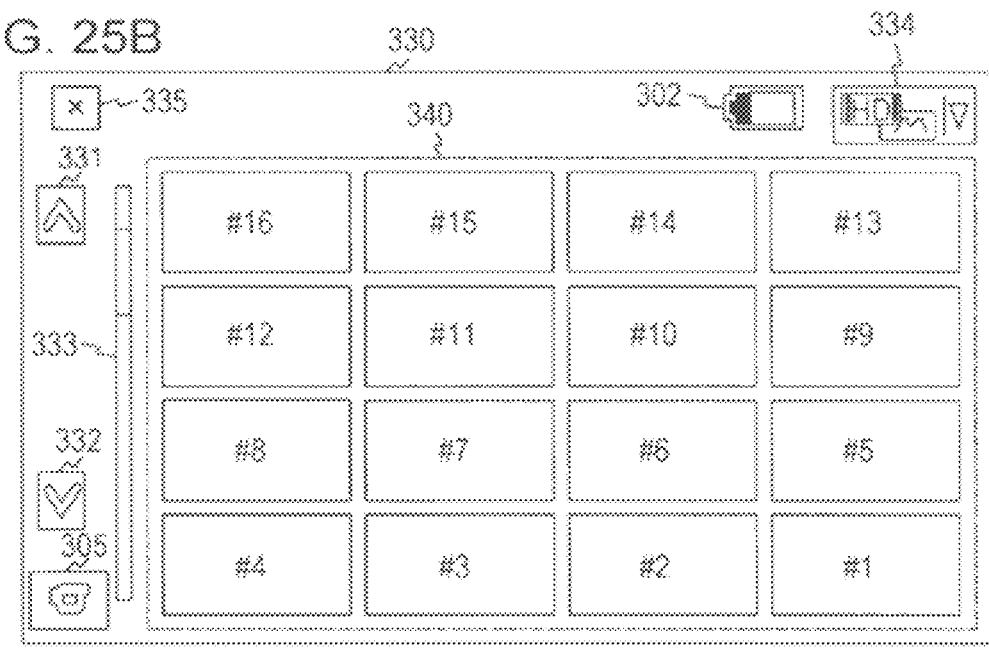

FIGS. 16A and 16B are diagrams illustrating a relationship between the parameters a, b and c and the time axis used when the thumbnail images are moved by the display control unit 250 in the first embodiment of the present disclosure.

FIG. 16A shows a graph indicating a relationship between the parameters a, b and c and the time axis. The graph shown in FIG. 16A has the transverse axis as the time axis (t) and the longitudinal axis as the axis indicating the parameters a, b and c. For example, in the graph shown in FIG. 16A, a starting time of the movement process of the thumbnail image is set to t=0, and a finishing time of the movement process of the thumbnail image is set to t=t1.

As shown in FIG. 16A, in a case of moving the thumbnail image using the parameter a, the thumbnail image is greatly changed at first, but the rate of change of the thumbnail image decreases with the passage of time. That is to say, the movement process is performed so as to reduce the movement distance per unit time. In addition, in a case of moving the thumbnail image using the parameter b, the rate of change of the image is constant with the passage of time. That is to say, the movement process is performed such that the movement velocity is constant with the passage of time. Further, in a case of moving the thumbnail image using the parameter c, the rate of change of the thumbnail image is small at first, but the rate of change of the thumbnail image increases with the passage of time. That is to say, the movement process is performed so as to increase the movement distance per unit time.

FIG. 16B shows relationships between the positions of the thumbnail images (positions on the display surface) and the parameters a, b and c used in the movement. Specifically, FIG. 16B shows coincidences (a, b, and c) indicating the parameters used for the respective thumbnail images, instead of the signs (#1 to #16) added to the inside of the rectangular shapes of the thumbnail images on the list display screen 330 shown in FIG. 5B.

As shown in FIG. 16B, the respective thumbnail images adjacent in a specific direction (horizontal direction and vertical direction) on the list display screen 330 use different parameters a, b and c. In addition, the example shown in FIG. 16B is only an example, and other patterns may be used. Further, a pattern may be changed each time a switching operation between the event display screen and the list display screen is performed.

As such, by using different parameters, the animation display can be performed so as to correlate the rate of change of the rotation speed of the thumbnail image per unit time with the rate of change of the movement speed of the thumbnail image per unit time between the movement source and the movement destination.

FIG. 15B schematically shows a transition example of the thumbnail image in a case of moving the thumbnail image disposed at the position of the rectangular shape 506 to the position of the rectangular shape 501.

FIG. 15B shows the rectangular shape 520 when the dotted lines denoting the thumbnail images and the like are removed in the rectangular shapes 500 and 505 shown in FIGS. 14A and 14B, and only the rectangular shapes 501 and 506 are disposed, in the same manner as FIG. 15A. In the rectangular shape 520 shown in FIG. 15B, a point of the top left corner, the length of one side, and a rotation angle of each of the rectangular shapes 501 and 506 are set to be the same as those in FIG. 15A. Further, in FIG. 15B, as movement trajectories from the rectangular shape 506 to the rectangular shape 501, movement trajectories of the respective vertices of the rectangular shape are denoted by arrows 521 to 524 of heavy lines.

First, a case will be described in which the position of the rectangular shape 506 is used as a reference position, and the animation process is performed by sequentially moving the thumbnail image starting from the reference position. Here, the point of the top left corner of the rectangular shape corresponding to the thumbnail image which is a target of the animation target is set to the coordinates (x, y), the length of a side of the rectangular shape corresponding to the x axis direction is set to w, the length of a side thereof corresponding to the y axis direction is set to h, and a rotation angle thereof with respect to the horizontal direction is set to θ. In this case, the position, the size, and the rotation angle of the image which is a target of the animation process are obtained by the following Equations 6 to 10.

$$x = x2 - (x2 - x1) \times a \quad \text{Equation 6}$$

$$y = y2 - (y2 - y1) \times a \quad \text{Equation 7}$$

$$w = w2 - (w2-w1) \times a \qquad \text{Equation 8}$$

$$h = h2 - + (h2-h1) \times a \qquad \text{Equation 9}$$

$$\theta = \theta 1 \times a \qquad \text{Equation 10}$$

Here, in the same manner as FIG. 15A, a is a parameter which varies with the passage of time, and, for example, the parameter a is sequentially determined depending on the curve on the graph shown in FIG. 16A.

In addition, in the same manner as FIG. 15A, different parameters are used for the respective thumbnail images adjacent in the specific direction on the list display screen. Further, relationships between the positions of the thumbnail images (positions on the display surface) and the parameters a, b and c used in the movement may be the same as those in FIG. 15A.

As such, when the thumbnail images adjacent on the Lifting step direction are moved, the thumbnail images can be displayed such that actual pictures overlapping each other can be dispersed with the hand or collected with the hand. Thereby, it is possible to provide a user with interesting animation display in such a way that actual pictures are dispersed with the hand or collected to overlap each other with the hand at the time of switching between the event display screen and the list display screen.

In addition, in the example shown in FIGS. 14A to 16B, although the example where the thumbnail image which is a movement target is moved along the straight line set in advance is shown, the thumbnail image may be moved to draw other trajectories. For example, the thumbnail image may be moved along a curve set in advance, or a straight line or a curve may be set for each position of a thumbnail image, and the thumbnail image may be moved along the line related to the setting.

Transition Example of Thumbnail Image

As described above, the image of which both end portions of the thumbnail image in the longer direction displayed on the list display screen are trimmed are displayed on the event display screen. For this reason, when the thumbnail image on the event display screen is transitioned to the thumbnail image on the list display screen, the animation display is performed while sequentially adding the trimmed images to the thumbnail images. On the other hand, when the thumbnail image on the list display screen is transitioned to the thumbnail image on the event display screen, the animation display is performed while sequentially removing images of both the end portions of the thumbnail image. This example is shown in FIGS. 17A and 17B.

FIGS. 17A and 17B are diagrams illustrating a transition example of the thumbnail image displayed by the display control unit 250 in the first embodiment of the present disclosure. In FIGS. 17A and 17B, for convenience of description, a case where enlargement and reduction in the thumbnail image are not performed will be described as an example.

FIG. 17A shows a transition example of a thumbnail image of which the aspect ratio is "16:9". In this example, a case where a thumbnail image 521 on the event display screen is transitioned to a thumbnail image 523 on the list display screen will be described as an example.

In the example shown in FIG. 17A, it is assumed that the length of a side of the thumbnail image 521 corresponding to the x axis direction is w10, the length of a side thereof in the y axis direction is h10, and a rotation angle thereof with respect to the horizontal direction is θ10. In addition, it is assumed that the thumbnail image 521 is an image obtained by trimming images of both end portions (images corresponding to regions W12) of the thumbnail image 523 in the longer direction.

As described above, the position of the thumbnail image 521 is used as a reference position, and animation display is performed while sequentially moving the thumbnail image from the reference position. In this case, the animation display (for example, the thumbnail image 522 to which the images corresponding to the regions W11 are added) is performed while a part of images (for example, images corresponding to the regions W11) trimmed from the thumbnail image 523 is sequentially added to the thumbnail image.

FIG. 17B shows a transition example of a thumbnail image of which the aspect ratio is "4:3". In this example, a case where a thumbnail image 531 on the event display screen is transitioned to a thumbnail image 533 on the list display screen will be described as an example.

In the example shown in FIG. 17B, in the same manner as FIG. 17A, it is assumed that the length of a side of the thumbnail image 531 corresponding to the x axis direction is w10, the length of a side thereof in the y axis direction is h10, and a rotation angle thereof with respect to the horizontal direction is θ10. In addition, the thumbnail image 531 is assumed to have the aspect ratio of "4:3". Further, the thumbnail image 533 is assumed as an image where predetermined images (black images in the regions W12) are added to both end portions thereof in the longer direction.

As described above, the position of the thumbnail image 531 is used as a reference position, and animation display is performed while sequentially moving the thumbnail image from the reference position. In this case, the thumbnail image 531 is an image having the aspect ratio of "4:3", and thus the trimmed images are relatively small. The trimmed images are, for example, images other than the black images of the images corresponding to the regions W12. In addition, the animation display is performed for the thumbnail image 531 while a part of the trimmed images (for example, images other than the black images of the images corresponding to the regions W12) are sequentially added to the thumbnail image. However, after all the trimmed images are added to the thumbnail image, predetermined images (for example, the black images in the regions W11) are sequentially added to the thumbnail image, thereby performing the animation display. For example, the thumbnail image 532 to which the images corresponding to the regions W11 are added is displayed by animation.

In addition, in a case where thumbnail images where the aspect ratios are mixed belong to one event, each thumbnail image is displayed by animation according to the aspect ratio.

As such, the display control unit 250 displays the thumbnail image included in the event display screen and the thumbnail image included in the list display screen as different sizes. In addition, the display control unit 250 performs the animation display while changing the size of a thumbnail image to be moved, such that the size of the thumbnail image included in one screen becomes the size of the thumbnail image included in the other screen. In addition, the display control unit 250 performs the animation display so as to correlate the ratio of a thumbnail image added to an original image per unit time with the rate of change of the movement speed of the thumbnail image per unit time, between the movement source and the movement destination during the movement. In a similar manner, the display control unit 250 performs the animation display while changing an angle of a thumbnail image such that the thumbnail image which is a movement target has an angle at the movement destination between the movement source and the movement destination during the movement.

Here, a transition example of a thumbnail image to be moved using Equations 1 to 5 will be described with reference to FIGS. 6A to 9B.

For example, the image holding unit 240 holds the event images 321 to 325 and thumbnail images related thereto displayed on the event display screen 300 shown in FIG. 5A. In addition, a case is assumed in which a selection operation for selecting the event images 321 on the event display screen 300 has been received by the operation reception unit 210. In this case, the display control unit 250 performs animation display while moving the thumbnail images (#1 to #16) held in the image holding unit 240. The display control unit 250 sequentially displays the thumbnail images (#1 to #16) which have been moved through the movement process, on the display unit 181.

For example, the animation process is performed until the thumbnail image (#1) overlapped at the upper side of the event images 321 is moved to the position of the thumbnail image (#1) on the list display screen 330. In other words, the thumbnail image (#1) is moved and sequentially displayed on the display unit 181 as denoted by the arrows 511 to 514 shown in FIG. 15A. In this case, the respective vertices of the moved thumbnail image (#1) are moved along the lines (the lines corresponding to the arrows 511 to 514) connecting the vertices of the rectangular shape 501 to the vertices of the rectangular shape 506. When the thumbnail image (#1) on the event display screen 300 is moved to the position of the thumbnail image (#1) on the list display screen 330, the display control unit 250 displays other images on the list display screen 330 on the display unit 181.

Transition Example from Event Display Screen to List Display Screen

FIGS. 18A to 21B are diagrams illustrating a transition example of the display screen displayed by the display control unit 250 in the first embodiment of the present disclosure. FIGS. 18A to 21B shows a transition example when a switching operation from the event display screen 300 to the list display screen 330 is performed. In addition, in the transition example shown in FIGS. 18A to 21B, an image is added to the inside of the rectangular shape indicating the thumbnail image instead of the sign added in the transition example shown in FIGS. 6A to 9B. The transition example shown in FIGS. 18A to 21B is substantially the same as the example shown in FIGS. 6A to 9B except for it, and thus detailed description thereof will be omitted.

In addition, a transition example from the list display screen 330 to the event display screen 300 (a transition example corresponding to FIGS. 10A to 13B (a transition example where an image is added)) is not shown.

Transition Example from Event Display Screen to List Display Screen

FIGS. 22A to 25B are diagrams illustrating a transition example of the display screen displayed by the display control unit 250 in the first embodiment of the present disclosure. FIGS. 22A to 25B show a modified example of the transition when a switching operation from the event display screen 300 to the list display screen 330 is performed. That is to say, in FIGS. 6A to 9B, and FIGS. 18A to 21B, the example has been described in which the thumbnail images (#1 to #4) displayed at the upper side (upper side in the gaze direction) of the event images 321 are disposed at the lowermost line of the thumbnail image display region 340 of the list display screen 330. FIGS. 22A to 25B show an example where the thumbnail images (#13 to #16) displayed at the upper side of event images 326 are disposed at the uppermost line of the thumbnail image display region 340 of the list display screen 330 (transition screens 370 to 375).

In addition, except that the movement destination of the thumbnail images displayed at the upper side of the event images is the uppermost line of the thumbnail image display region 340, FIGS. 22A to 25B are substantially the same as FIGS. 6A to 9B and FIGS. 18A to 21B, and thus detailed description thereof will be omitted.

In the first embodiment of the present disclosure, although the example has been described in which the thumbnail images displayed at the upper side of the event images are moved to the uppermost line or the lowermost line of the thumbnail image display region and are disposed, the thumbnail images may be moved to other lines and be disposed. For example, thumbnail images of content items (for example, a user setting, and an automatic setting based on a feature amount) representing an event may be displayed at the upper side of event images, and the thumbnail images may be moved to a predetermined position of the thumbnail image display region and be disposed. In this case, the thumbnail images displayed at the upper side of the event images may be moved to the same line and disposed, or the respective thumbnail images may be moved to different lines and be disposed.

Operation Example of Image Capturing Device

Next, an operation of the image capturing device 100 according to the first embodiment of the present disclosure will be described with reference to the drawings.

FIG. 26 is a flowchart illustrating an example of process procedures of a display control process performed by the image capturing device 100 according to the first embodiment of the present disclosure.

First, it is determined whether or not a setting operation of a content reproduction mode is performed (step S901), and, if the setting operation is not performed, the display control process finishes. If the setting operation of the content reproduction mode is performed (step S901), the display control unit 250 displays an event display screen on the display unit 181 (step S902).

Next, it is determined whether or not an event selection operation for selecting an event (event image) is performed in the event display screen (step S903). The event selection operation is an operation, for example, for selecting event images displayed at the central position on the event display screen. If the event selection operation is not performed (step S903), it is determined whether or not there is another operation input (step S904). In addition, if there is no other operation input (step S904), the flow returns to step S903, and if there is another operation input, each process according to the operation input is performed (step S905), and the flow returns to step S903.

In addition, if the event selection operation is performed (step S903), an animation process to the list display screen is performed (step S920). The animation process will be described with reference to FIG. 27.

Next, it is determined whether or not a selection operation of thumbnail images is performed in the list display screen (step S906), and if the selection operation of thumbnail images is not performed, the flow goes to step S910. On the other hand, if the selection operation of thumbnail images is performed (step S906), a content reproduction process of reproducing content items corresponding to the thumbnail images selected by the selection operation is performed (step S907). Thereafter, it is determined whether or not a finishing operation of the content reproduction is performed (step S908), and if the finishing operation of the content reproduction is not performed, the flow returns to step S907. On the other hand, if the finishing operation of the content reproduction is performed (step S908), the list display screen is displayed (step S909).

Next, it is determined whether or not a transition operation for instructing a transition to an event display screen (a transition operation to the event display screen) is performed (step S910), and if the transition operation is not performed, the flow returns to step S906. On the other hand, if the transition operation is performed (step S910), an animation process to the event display screen is performed (step S930). The animation process will be described in detail with reference to FIG. 28.

Thereafter, a finishing operation for finishing the content reproduction mode is performed (step S911), and if the finishing operation is not performed, the flow returns to step S903. On the other hand, if the finishing operation is not performed (step S911), the display control process ends. Further, steps S903, S910, S920 and S930 are an example of first display control procedures disclosed in claims. In addition, steps S920 and S930 are an example of second display control procedures disclosed in claims.

FIG. 27 is a flowchart illustrating the animation process to the list display screen (the process procedure in step S920 shown in FIG. 26) among the process procedures of the display control process performed by the image capturing device 100 according to the first embodiment of the present disclosure.

First, the display control unit 250 removes images other than a thumbnail image which is a movement target from the event display screen (step S921). The thumbnail image which is a movement target is a thumbnail image of a content item belonging to the event selected in step S903. Further, a background of the thumbnail image which is a movement target has, for example, specific color (for example, blue). Next, each of the parameters a, b and c are initialized to 0 (step S922). Thereafter, the display control unit 250 calculates coordinates, a size, and an angle used in a drawing process of the thumbnail image which is a movement target (step S923). Here, the coordinates, the size, and the angle are calculated using Equations 1 to 5.

Then, the display control unit 250 obtains the thumbnail image which is a movement target from the image holding unit 240, and draws the obtained thumbnail image based on the calculated coordinates, size, and angle (step S924). In other words, a movement process of the thumbnail image which a movement target is performed. Next, the display control unit 250 displays the drawn thumbnail image on the display unit 181 (step S925).

Then, it is determined whether or not the parameters a, b and c are equal to or more than 1 (step S926). That is to say, it is determined whether or not the drawn thumbnail image reaches a predetermined position on the list display screen. If the parameters are not equal to or more than 1 (step S926), the parameters a, b and c are changed (step S927), the flow returns to step S923. For example, the parameters a, b and c are changed depending on the graph shown in FIG. 16A. If the parameters a, b and c are equal to or more than 1 (step S926), the display control unit 250 displays the list display screen to which images other than the thumbnail image which is a movement target are added on the display unit 181 (step S928). Next, the animation process to the list display screen is completed.

FIG. 28 is a flowchart illustrating the animation process to the list display screen (the process procedure in step S930 shown in FIG. 26) among the process procedures of the display control process performed by the image capturing device 100 according to the first embodiment of the present disclosure.

First, the display control unit 250 removes images other than a thumbnail image which is a movement target from the event display screen (step S931). The thumbnail image which is a movement target is a thumbnail image of a content item belonging to the event related to a thumbnail image (content item) disposed at a predetermined position on the list display screen at the time of the transition operation. Further, a background of the thumbnail image which is a movement target has, for example, specific color (for example, blue). Next, each of the parameters a, b and c is initialized to 0 (step S932). Thereafter, the display control unit 250 calculates coordinates, a size, and an angle used in a drawing process of the thumbnail image which is a movement target (step S933). Here, the coordinates, the size, and the angle are calculated using Equations 6 to 10.

Then, the display control unit 250 obtains the thumbnail image which is a movement target from the image holding unit 240, and draws the obtained thumbnail image based on the calculated coordinates, size, and angle (step S934). In other words, a movement process of the thumbnail image which a movement target is performed. Next, the display control unit 250 displays the drawn thumbnail image on the display unit 181 (step S935).

Then, it is determined whether or not the parameters a, b and c are equal to or more than 1 (step S936). That is to say, it is determined whether or not the drawn thumbnail image reaches a predetermined position on the list display screen. If the parameters are not equal to or more than 1 (step S936), the parameters a, b and c are changed (step S937), the flow returns to step S933. For example, the parameters a, b and c are changed depending on the graph shown in FIG. 16A. If the parameters a, b and c are equal to or more than 1 (step S936), the display control unit 250 displays the list display screen to which images other than the thumbnail image which is a movement target are added on the display unit 181 (step S938). Next, the animation process to the list display screen is completed.

2. Modified Example

In the first embodiment of the present disclosure, the example has been described in which when a thumbnail image (index image) is moved, the movement transition is displayed by animation. However, when the movement transition is displayed by animation, the transition may be displayed by animation using other display forms. Therefore, a modified example of the first embodiment of the present disclosure will be described. A configuration of an image capturing device according to the modified example is substantially the same as the example shown in FIGS. 1 and 2. For this reason, parts common (or parts corresponding) to the first embodiment of the present disclosure are given the same reference numerals, a portion of the description thereof will be omitted.

Transition Example of Thumbnail Image During Switching Operation

FIGS. 29A and 29B are diagrams illustrating the display screen displayed by the display control unit 250 in the first embodiment of the present disclosure. FIGS. 29A and 29B show a portion of a transition example when a switching operation from the event display screen to the list display screen is performed.

FIG. 29A shows an event display screen 300 displayed by the display control unit 250. The event display screen 300 shown in FIG. 29A is the same as that shown in FIG. 6A. In addition, a display screen example displayed after a selection operation for selecting the event images 321 displayed on the event display screen 300 is shown in FIG. 29B.

FIG. 29B shows a transition screen 700 displayed by the display control unit 250. The transition screen 700 is a modified example of the transition screen 350 shown in FIG. 6B, and is a display screen displayed immediately after the selection operation for selecting the event images 321 in the event display screen 300 shown in FIG. 29B. Here, in the example shown in FIGS. 6A and 6B, the event images 321 having the same size as the event images 321 included in the event display screen 300 have been displayed on the transition screen 350. In the example shown in FIGS. 29A and 29B, images (event images 701) obtained by enlarging the event images 321 included in the event display screen 300 are displayed on the transition screen 700. The dotted rectangular shapes in the transition screen 700 indicate outlines of the event images 321 which have been displayed on the event display screen 300 in FIG. 29A.

As shown in FIG. 29B, the event images 701 to which the event images 321 are enlarged are displayed by animation immediately after the selection operation for selecting the event images 321 is performed, and thereby it is possible to easily recognize the event images having undergone the selection operation. In addition, the event images having undergone the selection operation can be made to be seen to a user so as to be virtually floated, and thus it is possible to show a fluffy feel. Thereby, it is possible to provide an animation display which gives such an impression that a user lifts up and scatters the thumbnail images related to the event images having undergone the selection operation with the hand.

In addition, the modified example is substantially the same as the first embodiment of the present disclosure except that the event image is enlarged and displayed immediately after the selection operation of the event image is performed. In other words, a thumbnail image (enlarged in the same manner as the event image) related to the event image which is enlarged and displayed is moved to a predetermined position on the list display screen through animation display. In this case, the thumbnail image which is a movement target is enlarged at the time of starting the movement, and thus is reduced during the movement so as to have a size on the list display screen.

In addition, an event image may be enlarged and displayed when the list display screen is switched to the event display screen as well. For example, as shown in FIGS. 10A to 13B, it is assumed that animation display is performed after the list display screen is switched to the event display screen. In this case, for example, after the transition screen 365 shown in FIG. 13A is displayed, enlarged images to which the event images 321 included in the transition screen 365 are enlarged are displayed on the transition screen through the animation display. Further, after the enlarged images of the event images 321 are displayed, the enlarged images are reduced through the animation display such that the event display screen 300 shown in FIG. 13B is displayed. Thereby, the event images disposed at the center can be made to be seen to a user so as to be virtually floated, and thus it is possible to show fluffy feel. In addition, it is possible to provide animation display which gives such an impression that a user collects and places the thumbnail images related to the event images to overlap each other with the hand.

Display Example of Fade-in and Fade-Out

Next, a display example by fade-in and fade-out will be described. For example, when switching occurs from the event display screen to the list display screen, animation display is performed such that thumbnail images which are not displayed at the upper side (upper side in the gaze direction) of the event images emerge from the rear side of the event images. In this case, a user may have a sense of discomfort due to the rapid emergence of the thumbnail images which are not displayed as the event images.

In addition, for example, when the list display screen is switched to the event display screen, animation display is performed such that the thumbnail images which are not displayed at the upper side (upper side in the gaze direction) of the event images are hidden on the rear side of the event images. In this case, a user may have a sense of discomfort because the thumbnail images are hidden in the rear side of the event images and thus are not seen.

Therefore, in this example, animation display is performed while the thumbnail images which are not displayed at the upper side of the event images are faded in or faded out. Here, the fade-in and fade-out indicate visual representation where, for example, a target image is sequentially changed with the passage of time. The fade-in process is a process in which, for example, a target image is set to a solid black image, the black of the target image is sequentially thinned with the passage of time, and finally a typical image is generated. The fade-in process can give such an impression that thumbnail images which are not seen gradually emerge. Thereby, there is no case where the user is surprised at rapid emergence of the thumbnail images, and thus the user can see the transition of the thumbnail images in a natural state. In addition, the fade-out process is a process in which, for example, a target image is sequentially made to be black with the passage of time, and finally a solid black image is generated. The fade-out process can give such an impression that thumbnail images which are seen gradually disappear. Thereby, it is possible for a user to see the transition of the thumbnail images in a natural state without feeling discomfort due to a case where the thumbnail images are not seen.

Figure 31:
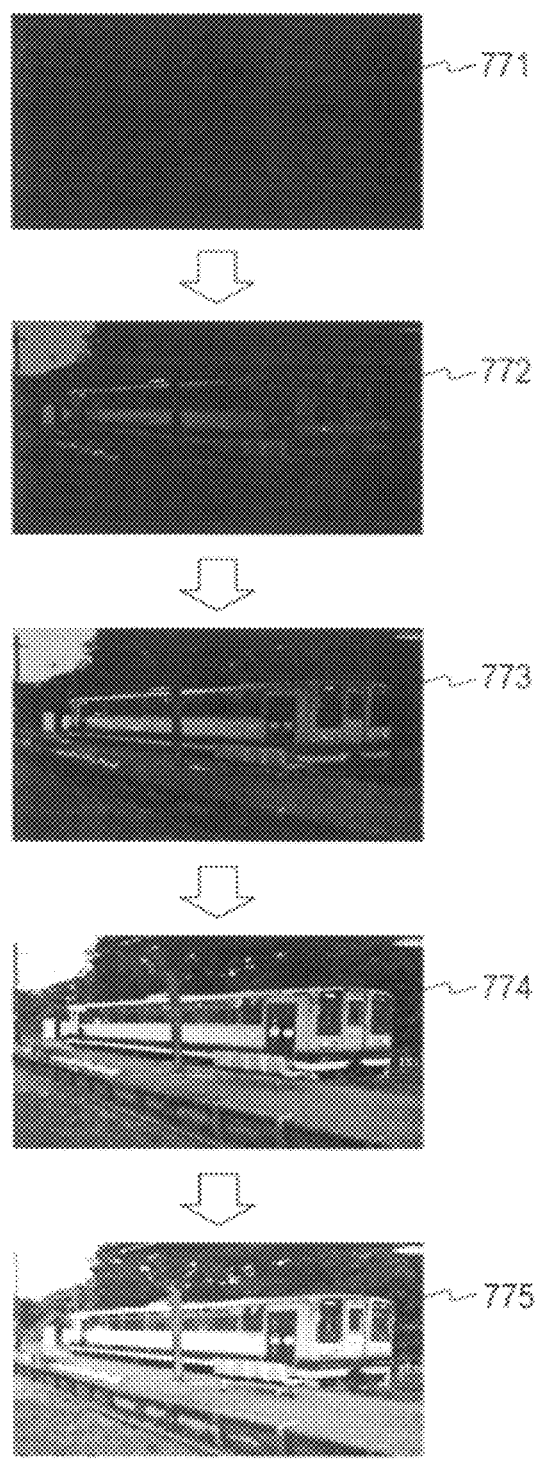
FIG. 31 is a schematic diagram illustrating a fade-in method of fading in a thumbnail image moved by the display control unit according to the modified example of the first embodiment of the present disclosure.

FIGS. 30A to 31 are schematic diagrams illustrating a fade-in method of fading in a thumbnail image moved by the display control unit 250 in the modified example of the first embodiment of the present disclosure.

FIGS. 30A to 30D shows a relationship between a thumbnail image 760 moved by the display control unit 250 and an α value used when the thumbnail image 760 is faded in, in a time series. The thumbnail image 760 is a thumbnail image stored in, for example, the content management information storage unit 280. A target image drawing region 750 is a region where the thumbnail image 760 is drawn.

Here, the α value is a numerical value indicating the transparency, and is a value where the transparency of RGB (red, green, and blue) is changed in a range of 0 to 1. For example, in a case where the α value is set to 0, a target image is opaque, and the transparency of the target image increases according to an increase in the numerical value. In addition, in a case where the α value is set to 1, the target image is perfectly transparent. In other words, when the transparency of an image is changed, it is possible to change to a desired transparency by changing the α value. In this example, a fade-in method will be described in which, in a case where a target image is repeatedly moved, the transparency of the target image decreases with the passage of time, and the fade-in is performed by synthesizing the image of which the transparency is changed with a black image by superimposition.

FIG. 30A shows a thumbnail image 760 and a target image drawing region 750 before the fade-in process is performed. Here, when the fade-in process is performed, the display control unit 250 changes a color of the target image drawing region 750 to black as shown in FIG. 30B. Next, the display control unit 250 synthesizes the thumbnail image 760 of $\alpha=1$ with the target image drawing region 750 in black by superimposition. As such, since the thumbnail image 760 is perfectly transparent at $\alpha=1$, the thumbnail image 760 drawn on the target image drawing region 750 is displayed in black on the display unit 181.

Next, as shown in FIG. 30C, the display control unit 250 sets the target image drawing region 750 to black, and the display control unit 250 synthesizes the thumbnail image 760 of $\alpha=a$ ($0<a<1$) with the target image drawing region 750 in black by superimposition. In addition, the display control unit 250 sequentially decreases a value of a, and repeatedly synthesizes the thumbnail image 760 of $\alpha=a$ ($0<a<1$) with the target image drawing region 750 in black by the superimposition. In this case, since the transparency of the target image decreases according to a decrease in the numerical value of $\alpha$, the thumbnail image 760 drawn on the target image drawing region 750 is gradually deviated from the black. Here, the parameter a may use, for example, a parameter a specified by the curve on the graph shown in FIG. 16A. In addition, although the parameter a is used in this example, the parameters (a, b and c) according to a thumbnail image which is a movement target may be used.

Next, as shown in FIG. 30D, the display control unit 250 sets the target image drawing region 750 to black, and the display control unit 250 synthesizes the thumbnail image 760 of $\alpha=0$ with the target image drawing region 750 in black. Here, since the thumbnail image 760 is opaque at $\alpha=0$, the thumbnail image 760 drawn on the target image drawing region 750 is displayed on the display unit 181 as it is. A transition of the thumbnail image 760 faded in by the display control unit 250 in this way is shown in FIG. 31.

FIG. 31 shows the transition of the image faded in by the display control unit 250 in a time series. Here, the thumbnail image 771 indicates an image when the thumbnail image 760 of $\alpha=1$ is synthesized with the target image drawing region 750 in black by superimposition. In addition, the thumbnail image 775 indicates an image when the thumbnail image 760 of $\alpha=0$ is synthesized with the target image drawing region 750 in black by superimposition. Further, the thumbnail images 772 to 774 indicate images when the thumbnail image 760 of $\alpha=a$ ($0<a<1$) is synthesized with the target image drawing region 750 in black by superimposition. As the thumbnail image proceeds from the thumbnail image 772 to the thumbnail image 774, the numerical value of $\alpha$ decreases.

In addition, the fade-out process can be performed by reversely changing the $\alpha$ value (that is, $\alpha=0 \rightarrow \alpha=1$) in the above-described fade-in process.

Display Example Through Change in Movement Speed and Rotation Speed

In the first embodiment of the present disclosure, the example has been described in which the movement process and the rotation process of a thumbnail image which is a movement target are performed in synchronization with each other using the parameters a, b and c. However, the rotation process of a thumbnail image may be completed before reaching a movement destination. In other words, the thumbnail image can be displayed by changing a relationship between the movement process and the rotation process. Therefore, in this example, a display example through change in the movement speed and the rotation speed will be described.

Figure 32A:
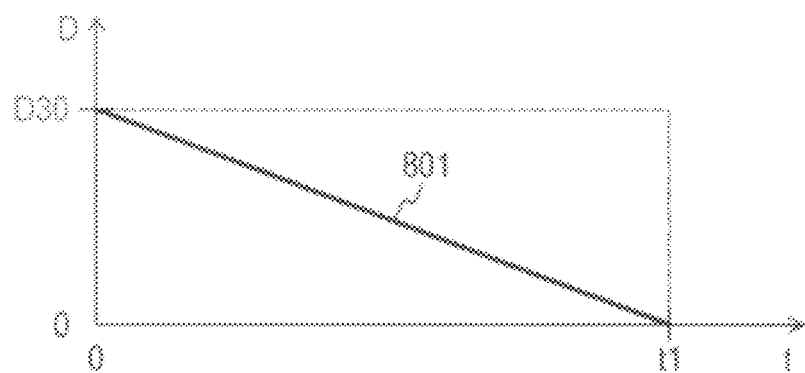
FIGS. 32A and 32B are diagrams illustrating a relationship between a movement transition and a rotation transition when a thumbnail image is moved by the display control unit according to the modified example of the first embodiment of the present disclosure.
Figure 32B:
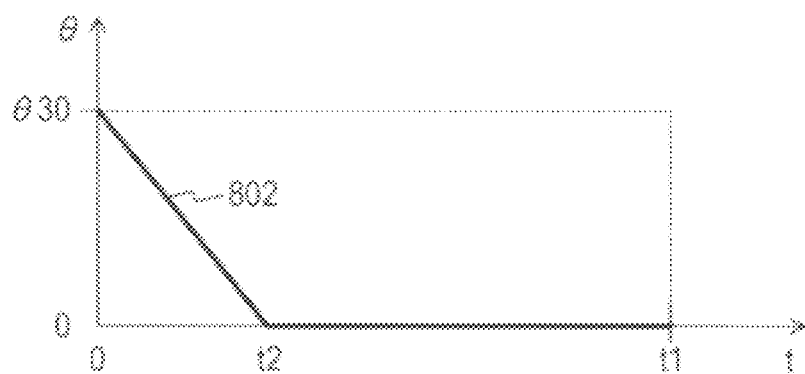

FIGS. 32A and 32B are diagrams illustrating a relationship between the movement transition and the rotation movement when a thumbnail image is moved by the display control unit 250 in the modified example of the first embodiment of the present disclosure.

FIG. 32A shows a graph illustrating a relationship between the movement distance of the thumbnail image and the time axis. In addition, FIG. 32B shows a graph illustrating a relationship between the rotation angle of the thumbnail image and the time axis.

The graph shown in FIG. 32A has the transverse axis as the time axis (t) and the longitudinal axis as the movement distance (D). In addition, the graph shown in FIG. 32B has the transverse axis as the time axis (t) and the longitudinal axis as the rotation angle ($\theta$). For example, in the graph shown in FIGS. 32A and 32B, a starting time of the movement process of the thumbnail image is set to $t=0$, and a finishing time of the movement process of the thumbnail image is set to $t=t1$. In addition, for convenience of description, the graphs shown in FIGS. 32A and 32B briefly show the relationship between the movement transition and the rotation transition of the thumbnail image using the straight lines 801 and 802 without taking into consideration of gaps between transitions by the parameters a, b and c.

As shown in FIG. 32A, when the thumbnail image is moved, the movement process is continuously performed from the starting time ($t=0$) of the movement process to the finishing time ($t=t1$) (the straight line 801). On the other hand, when the thumbnail image is rotated, as shown in FIG. 32B, the rotation process is performed such that the rotation is completed after a predetermined amount of time has elapsed ($t=t2$) from the starting time ($t=0$) of the rotation process (the straight line 802).

As such, the rotation process of the thumbnail image is completed relatively early, and thereby it is possible to provide a user early with the animation display of the thumbnail image in a state where the longer direction and the horizontal direction of the thumbnail image match each other. In addition, the animation display may be changed through a user's setting. Thereby, it is possible to provide animation display suitable for the user's taste. In addition, generally, since time is taken to perform the rotation process of an image, a load of the rotation process can be reduced and smooth animation display can be performed by completing the rotation process of the thumbnail image relatively early. In addition, in this example, although the transition example from the event display screen to the list display screen has been described, a timing for starting the rotation process may be delayed in a transition from the list display screen to the event display screen. Thereby, it is possible to provide the user for a long time with animation display of a thumbnail image in a state where the longer direction and the horizontal direction of the thumbnail image match each other. In addition, by delaying the starting of the rotation process, a load of the animation process can be reduced and smooth animation display can be performed.

Display Example of Displaying Boundary Between Events

The first embodiment of the present disclosure has shown the example where all the thumbnail images of the content items belonging to one event are displayed on the thumbnail image display region. However, it is expected that the number of thumbnail images of content items belonging to one event is small (for example, about five or six thumbnail images). Therefore, in this example, a display example of displaying a boundary between events with respect to thumbnail images on the list display screen.

Figure 33A:
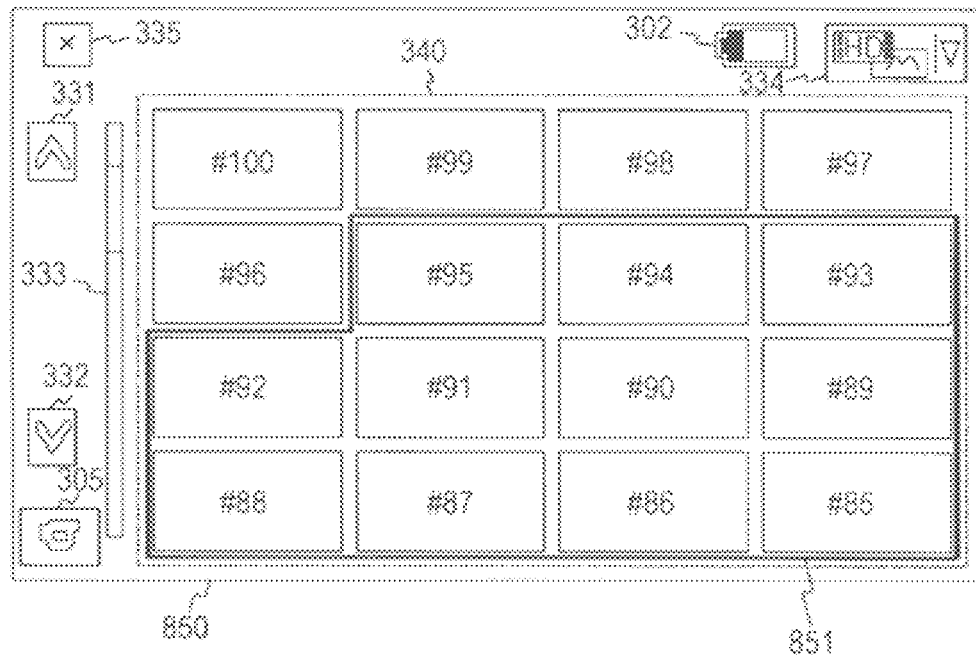
FIGS. 33A and 33B are diagrams illustrating an example of a list display screen displayed by the display control unit according to the first embodiment of the present disclosure.
Figure 33B:
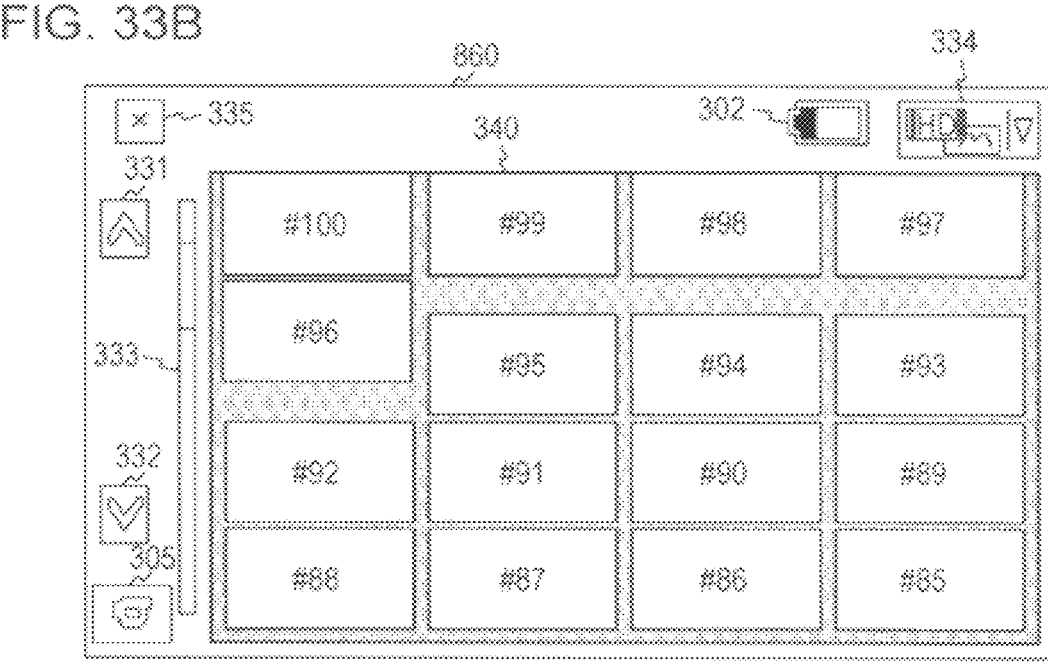

FIGS. 33A and 33B are diagrams illustrating an example of the list display screen displayed by the display control unit 250 in the first embodiment of the present disclosure. A list display screen 850 and a list display screen 860 shown in FIGS. 33A and 33B are substantially the same as the list display screen 330 shown in FIG. 5B except that thumbnail images (#85 to #100) are displayed and a boundary between events of the thumbnail images is displayed.

For example, it is assumed that the thumbnail images (#85 to #95) are thumbnail images of content items belonging to one event and the thumbnail images (#96 to #100) of content items belonging to the other event. In this case, a boundary between the events may be displayed on the thumbnail image display region 340 such that the thumbnail images can be grasped for each event.

For example, as shown in FIG. 33A, a boundary between the events may be displayed using a straight line 851. The straight line 851 may be displayed by giving, for example, a noticeable color such as blue or the like. In addition, for example, as shown in FIG. 33B, a boundary between the events may be displayed by enlarging the distance between the thumbnail images corresponding to the boundary between the events.

As such, even in a case where the number of the thumbnail images of content items belonging to one event is small, only the thumbnail images of the content items belonging to one event are movement targets. For example, it is assumed that a switching operation where the event display screen 850 is switched to the event display screen 300 is received. In this case, the display control unit 250 displays by animation only thumbnail images related to content items forming an event related to the thumbnail images disposed at a specific position among the thumbnail images included in the list display screen 850 at the time of receiving the switching operation. The specific position may be, for example, a bottom right position (a position of the thumbnail image (#85)) on the thumbnail image display region 340.

In addition, in a case where the number of thumbnail images of content items belonging to one event is relatively large (for example, thirty thumbnail images), all the thumbnail images may not be displayed on the thumbnail image display region 340. In this case, for example, only the thumbnail images (for example, sixteen thumbnail images) which are displayed on the thumbnail image display region 340 may be moved.

Although the thumbnail images are displayed in a list view in a 4×4 matrix on the thumbnail image display region in the first embodiment of the present disclosure, the thumbnail images may be displayed in a list view using other display forms (for example, in a 4×3 matrix). In addition, the event images on the event display screen may be displayed using other display forms (for example, arranged in the vertical direction, or arranged in a circular shape).

As described above, in the embodiment of the present disclosure, a display screen is not abruptly changed, but thumbnail images related to event images selected by a user are moved through animation display in the transition from the event display screen to the list display screen. Thereby, it is possible to easily grasp the correspondence relationship between thumbnail images related an event selected by a user and thumbnail images displayed on the list display screen. Particularly, in a case of selecting an event image using a touch panel, it is possible to easily confirm whether or not an event image desired by a user is correctly selected.

In addition, in the transition from the list display screen to the event display screen as well, a display screen is not abruptly changed, but thumbnail image are moved through animation display. Thereby, it is possible to easily grasp correspondence relationship between thumbnail images displayed on the list display screen and event images corresponding thereto. Particularly, it is possible to easily grasp to which event thumbnail images displayed in a list view belong.

As such, according to the embodiment of the present disclosure, it is possible to easily grasp corresponding positions between an event image and a thumbnail image in a GUI (Graphical User Interface) for a display transition performed between the event display screen and the list display screen. Therefore, it is possible to improve visibility when viewing content items. In addition, it is possible to easily grasp the correspondence relationship between images (thumbnail images) related to content items, displayed in a list view with content item units and images (event images) related to content items displayed with group units.

Further, the embodiment of the present disclosure is also applicable to a case of reproducing content items other than moving image content items and still image content items. For example, the embodiment of the present disclosure is applicable to a case of switching between a list display screen which displays an image related to a content item of audio data in a list view as an index image and a group display screen which displays group images of a group to which the content item belongs. In addition, the image related to the content item of the audio data may be, for example, a jacket image of music, and the group to which the content item belongs may be a group based on mood or tempo. The embodiment of the present disclosure is applicable to item buttons and the like displayed in a list view on a menu screen. For example, when an item button for displaying a menu screen of a lower-rank hierarchy is selected on a menu screen of a higher-rank hierarchy, movement to the menu screen of a lower-rank hierarchy may be performed through animation display.

In addition, the embodiment of the present disclosure is applicable to an electronic apparatus which can reproduce content items such as a mobile phone, a portable media player, and the like. Further, the embodiment of the present disclosure is applicable to an electronic apparatus which outputs content items and content management information related thereto to other display devices, and enables the display devices to display the content items.

In addition, the embodiment of the present disclosure is an example for implementing the present disclosure, and, as clearly described in the embodiment of the present disclosure, matters in the embodiment of the present disclosure respectively have correspondence relationships with matter specifying the disclosure in the claims. In a similar manner, matters specifying the disclosure in claims respectively have correspondence relationships with matters in the embodiment of the present disclosure. However, the present disclosure is not limited to the embodiment, but may be implemented through a variety of modifications of the embodiment within a scope not departing from the gist of the present disclosure.

The process procedures described in the embodiment of the present disclosure may be grasped as a method including a series of procedures, or may be grasped as a program enabling a computer to execute the above-described series of procedures or a recording medium storing the program. The recording medium may use, for example, a CD (Compact Disc), a MD (Mini Disc), a DVD (Digital Versatile Disc), a memory card, a Blu-ray Disc (registered trademark), and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
   circuitry configured to:
   control displaying of a list display screen, on a display, including a plurality of index images which are displayed in a matrix;
   control displaying of a group display screen, on the display, including a plurality of group images in predetermined positions and in a specific order, wherein a current group image is formed by a superimposition of a first part of the plurality of index images, and an angle of display of an index image is different with respect to the other index images in the group image;
   switch, in response to a switching operation, from the group display screen to an animation display screen;
   control an animation in the animation display screen on the display, the control including:
   a removal of the plurality of group images other than the current group image,
   a synthesis of another part of the plurality of index images so as to appear from behind the first part of the plurality of index images corresponding to the current group image, wherein an angle of display corresponding to a first synthesized index image is different from an angle of display corresponding to a second synthesized index image,
   a change in the angle of display of the plurality of index images, and
   a movement of the plurality of index images to predetermined positions of the matrix in the list display screen; and
   switch, in response to the animation, from the animation display screen to the list display screen.

2. The electronic apparatus according to claim 1, wherein the circuitry is configured to:
   move the plurality of index images such that rates of change of movement speeds per unit time of respective index images adjacent in a specific order on the animation display screen are different from each other, and
   move each of a first plurality of respective index images at a first rate of change of movement speed per unit time and to move each of a second plurality of the respective index images at a second rate of change of movement speed per unit time that is different from the first rate of change of movement speed per unit time in response to the switching operation.

3. The electronic apparatus according to claim 2, wherein the circuitry is configured to move each of a third plurality of index images at a third rate of change of movement speed per unit time that is different from both the first rate of change of movement speed per the unit time and the second rate of change of movement speed per the unit time, in response to the switching operation.

4. The electronic apparatus according to claim 2, wherein the circuitry is configured to move the plurality of index images such that rates of change of movement speeds per unit time of respective index images adjacent in a direction perpendicular to a specific direction on the animation display screen are different from each other, in the case of receiving the switching operation.

5. The electronic apparatus according to claim 1, wherein, in response to the switching operation for switching from the group display screen to the animation display screen, the circuitry is configured to move the plurality of index images which are displayed in an upper portion of the group display screen from the corresponding display positions to predetermined positions on the animation display screen, and move the plurality of index images which are not displayed in the upper portion of the group display screen from predetermined positions in the corresponding group display screen to predetermined positions on the animation display screen.

6. The electronic apparatus according to claim 1, wherein the circuitry is configured to display a screen where the plurality of index images corresponding to respective content items forming one group are continuously arranged side by side, as the animation display screen.

7. The electronic apparatus according to claim 1, wherein the circuitry is configured to display a screen where the plurality of index images are arranged side by side being the specific order, as the animation display screen, and display a screen where every index image is rotated by a predetermined angle and is disposed at predetermined positions on the display, as the group display screen.

8. The electronic apparatus according to claim 7, wherein the circuitry is configured to perform an animation display while changing an angle of a corresponding index image during a movement between a movement source and a movement destination such that the index image which is a rotation target has an angle at the movement destination.

9. The electronic apparatus according to claim 8, wherein the circuitry is configured to perform the animation display by correlating a rate of change of a rotation speed per unit time of the index image which is the rotation target with a rate of change of a movement speed per unit time of the corresponding index image between the movement source and the movement destination.

10. The electronic apparatus according to claim 1, wherein, in response to the switching operation for switching from the group display screen to the animation display screen, the circuitry is configured to display by animation only the plurality of index images related to one of the plurality of group images disposed at a specific position among the plurality of group images included in the group display screen, displayed at a time of receiving the switching operation.

11. The electronic apparatus according to claim 1, wherein the circuitry is configured to display an index image included in the group display screen and an index image included in the list display screen in different sizes, and perform an animation display while changing a size of the index image which is a movement target such that the size of the index image included in one screen has a size of the index image included in the other screen during a movement between a movement source and a movement destination in response to the switching operation.

12. The electronic apparatus according to claim 11, wherein the index image is in a substantially rectangular shape,
   wherein the index image included in the group display screen is a trim image of which both ends of a longer side of the index image are included in the animation display screen, and
   wherein, in response to the switching operation for switching from the group display screen to the animation display screen, the circuitry is configured to perform the animation display while adding an original image to the trim image between the movement source and the movement destination, and, in response to the switching operation for switching from the list display screen to the animation display screen, perform the animation display while removing both ends of the index image of the longer side between the movement source and the movement destination.

13. The electronic apparatus according to claim 12, wherein the circuitry is configured to perform the animation display by correlating a rate of change of an addition ratio per unit time of the original image with a rate of change of a movement speed per unit time of the corresponding index image between the movement source and the movement destination.

14. The electronic apparatus according to claim 1, wherein, in response to the switching operation for switching from the list display screen to the animation display screen, the circuitry is configured to display by an animation only the plurality of index images related to the respective content items forming a group related to the plurality of index images disposed at a specific position among the plurality of index images included in the list display screen, displayed at a time of receiving the switching operation.

15. The electronic apparatus according to claim 1, wherein one of a plurality of groups of group images located at a central position along one specific direction is displayed as larger than remaining groups of group images of the plurality of groups of group images positioned along the one specific direction.

16. The electronic apparatus according to claim 1, wherein the circuitry is configured to move each of a first plurality of respective images at a first rate of change of movement speed per a unit time and to move each of a second plurality of the respective images at a second rate of change of movement speed per the unit time that is different from the first rate of change of movement speed per the unit time, in response to the switching operation, and wherein one of the first rate of change of movement speed per the unit time and the second rate of change of movement speed per the unit time is assigned to a particular index image based upon a position of the particular index image relative to positions of the remaining plurality of index images.

17. The electronic apparatus according to claim 16, wherein the other of the first rate of change of movement speed per the unit time and the second rate of change of movement speed per unit time is assigned to the particular index image in response to a subsequent switching operation that is subsequent to the switching operation.

18. The electronic apparatus according to claim 1, wherein the circuitry is configured to move each of a first plurality of respective images at a first rate of change of movement speed per a unit time and to move each of a second plurality of the respective images at a second rate of change of movement speed per the unit time that is different from the first rate of change of movement speed per the unit time, in response to the switching operation, and wherein the first rate of change of movement speed per the unit time includes one that:
  reduces a movement distance per the unit time;
  keeps constant the movement distance per the unit time; or
  increases the movement distance per the unit time, and
  the second rate of change of movement speed per the unit time includes one, other than the first rate of change of movement speed per unit time, that:
  reduces the movement distance per the unit time;
  keeps constant the movement distance per the unit time; or
  increases the movement distance per the unit time.

19. The electronic apparatus according to claim 1, wherein the animation further includes change in an amount of occlusion of the synthesized index images with respect to the first part of the plurality of index images.

20. The electronic apparatus according to claim 1, wherein the animation further includes a synthesis of the first part of the plurality of index images that occurs into corresponding plurality of index images in the list display screen.

21. A display control method comprising:
  controlling displaying of a list display screen, on a display, including a plurality of index images which are displayed in a matrix;
  controlling displaying of a group display screen, on the display, including a plurality of group images in predetermined positions and in a specific order, wherein a current group image is formed by a superimposition of a first part of the plurality of index images, and an angle of display of an index image is different with respect to the other index images in the group image;
  switching, in response to a switching operation, from the group display screen to an animation display screen;
  controlling an animation in the animation display screen on the display, the control including:
    a removal of the plurality of group images other than the current group image,
    a synthesis of another part of the plurality of index images so as to appear from behind the first part of the plurality of index images corresponding to the current group image, wherein an angle of display corresponding to a first synthesized index image is different from an angle of display corresponding to a second synthesized index image,
    a change in the angle of display of the plurality of index images, and
    a movement of the plurality of index images to predetermined positions of the matrix in the list display screen: and
  switching, in response to the animation, from the animation display screen to the list display screen.

22. A non-transitory computer readable medium having stored thereon, a set of computer-executable instructions, for causing a computer to perform a method comprising:
  controlling displaying of a list display screen, on a display, including a plurality of index images which are displayed in a matrix;
  controlling displaying of a group display screen, on the display, including a plurality of group images in predetermined positions and in a specific order, wherein a current group image is formed by a superimposition of a first part of the plurality of index images, and an angle of display of an index image is different with respect to the other index images in the group image;
  switching, in response to a switching operation, from the group display screen to an animation display screen;
  controlling an animation in the animation display screen on the display, the control including:
    a removal of the plurality of group images other than the current group image,
    a synthesis of another part of the plurality of index images so as to appear from behind the first part of the plurality of index images corresponding to the current group image, wherein an angle of display corresponding to a first synthesized index image is different from an angle of display corresponding to a second synthesized index image,
a change in the angle of display of the plurality of index images, and
a movement of the plurality of index images to predetermined positions of the matrix in the list display screen; and
switch, in response to the animation, from the animation display screen to the list display screen.

23. An electronic apparatus comprising:
circuitry configured to:
control displaying of a list display screen, on a display, including plurality of index images which are displayed in a matrix,
control displaying of a group display screen, on the display, including plurality of group images in predetermined positions and in a specific order, wherein a current group image is formed by a superimposition of a first part of the plurality of index images, and an angle of display of an index image is different with respect to the other index images in the group image;
switch, in response to a switching operation, from the list display screen to an animation display screen;
control an animation in the animation display screen on the display, the control including:
an addition of the plurality of group images other than the current group image,
a disappearance of another part of the plurality of index images so as to disappear behind the first part of the plurality of index images corresponding to the current group image, wherein an angle of display corresponding to a first synthesized index image is different from an angle of display corresponding to a second synthesized index image,
a change in the angle of display of each of the plurality of index images, and
a movement of the plurality of index images to predetermined positions of the matrix in the group display screen; and
switch, in response to the animation, from the animation display screen to the group display screen.

24. The electronic apparatus according to claim 23, wherein the animation further includes change in an amount of occlusion of the synthesized index images with respect to the first part of the plurality of index images.

* * * * *